(12) United States Patent
Oku et al.

(10) Patent No.: US 10,431,830 B2
(45) Date of Patent: Oct. 1, 2019

(54) CURRENT COLLECTOR FOR BATTERY AND BATTERY USING SAME

(71) Applicants: KANEKA CORPORATION, Osaka-shi, Osaka (JP); NISSAN MOTOR CO., LTD., Yokohama-shi, Kanagawa (JP)

(72) Inventors: Satoshi Oku, Settsu (JP); Yusuke Kato, Settsu (JP); Akiko Waki, Settsu (JP); Takashi Kikuchi, Settsu (JP); Takashi Ito, Settsu (JP); Masahiro Kojima, Settsu (JP); Gentaro Kano, Yokohama (JP); Shiho Inoue, Yokohama (JP); Yasuyuki Tanaka, Yokohama (JP); Norihisa Waki, Yokohama (JP); Yuji Muroya, Yokohama (JP); Kazuki Miyatake, Yokohama (JP); Yoshio Shimoida, Yokohama (JP); Keisuke Wakabayashi, Yokohama (JP); Tomohisa Matsuno, Yokohama (JP); Seiji Ishimoto, Yokohama (JP)

(73) Assignees: KANEKA CORPORATION, Osaka-shi (JP); NISSAN MOTOR CO., LTD., Yokohama-shi (JP)

( * ) Notice: Subject to any disclaimer, the term of this patent is extended or adjusted under 35 U.S.C. 154(b) by 151 days.

(21) Appl. No.: 14/423,770

(22) PCT Filed: Aug. 29, 2013

(86) PCT No.: PCT/JP2013/073102
§ 371 (c)(1),
(2) Date: Feb. 25, 2015

(87) PCT Pub. No.: WO2014/034758
PCT Pub. Date: Mar. 6, 2014

(65) Prior Publication Data
US 2015/0318555 A1    Nov. 5, 2015

(30) Foreign Application Priority Data

Aug. 30, 2012   (JP) .................................. 2012-190342
Aug. 30, 2012   (JP) .................................. 2012-190343
(Continued)

(51) Int. Cl.
*H01M 4/66* (2006.01)
*H01M 10/0525* (2010.01)
(Continued)

(52) U.S. Cl.
CPC ............... *H01M 4/668* (2013.01); *B32B 7/02* (2013.01); *B32B 15/08* (2013.01); *B32B 15/085* (2013.01);
(Continued)

(58) Field of Classification Search
CPC .............................. H01M 4/665; H01M 4/667
See application file for complete search history.

(56) References Cited

U.S. PATENT DOCUMENTS

| | | | | |
|---|---|---|---|---|
| 2010/0291442 A1* | 11/2010 | Wang | ................... | H01M 4/0404 429/231.95 |
| 2011/0123862 A1* | 5/2011 | Nam | ................... | H01M 4/0421 429/209 |

(Continued)

FOREIGN PATENT DOCUMENTS

| | | |
|---|---|---|
| JP | 2000-200619 A | 7/2000 |
| JP | 2008-207404 A | 9/2008 |

(Continued)

OTHER PUBLICATIONS

International Search Report dated Dec. 3, 2013, issued in corresponding application No. PCT/JP2013/073102.

*Primary Examiner* — Christopher P Domone
(74) *Attorney, Agent, or Firm* — Westerman, Hattori, Daniels & Adrian, LLP

(57) ABSTRACT

A current collector for a battery includes: a layer (1) formed from an electrically conductive material and at least one of (a) a polymer compound having an alicyclic structure, (b) a saturated hydrocarbon polymer compound having a hydroxyl group, (c) a phenoxy resin and an epoxy resin, and (d) an amine having an amine equivalent of 120 g/eq or less and an epoxy resin; a layer (2) which is formed on at least one surface of the layer (1); and a layer (3) formed from an electrically conductive material. The current collector for a battery has stability to an equilibrium potential environment in a negative electrode, a low electric resistance, a blocking property to solvent in electrolytic solution, and a blocking property to a component in an electrolyte. In addition, the current collector for a battery has a high capacity retention rate, and battery durability is improved.

24 Claims, 1 Drawing Sheet

(30) Foreign Application Priority Data

| Nov. 14, 2012 | (JP) | 2012-249957 |
|---|---|---|
| Nov. 14, 2012 | (JP) | 2012-249958 |
| Nov. 14, 2012 | (JP) | 2012-249959 |
| Nov. 14, 2012 | (JP) | 2012-249960 |
| Nov. 14, 2012 | (JP) | 2012-249961 |
| Nov. 14, 2012 | (JP) | 2012-249962 |

(51) Int. Cl.

| B32B 15/085 | (2006.01) |
|---|---|
| B32B 27/18 | (2006.01) |
| B32B 7/02 | (2019.01) |
| B32B 15/08 | (2006.01) |
| B32B 15/088 | (2006.01) |
| B32B 15/092 | (2006.01) |
| B32B 27/28 | (2006.01) |
| B32B 27/30 | (2006.01) |
| B32B 27/36 | (2006.01) |
| H01M 10/052 | (2010.01) |

(52) U.S. Cl.
CPC .......... *B32B 15/088* (2013.01); *B32B 15/092* (2013.01); *B32B 27/18* (2013.01); *B32B 27/281* (2013.01); *B32B 27/283* (2013.01); *B32B 27/288* (2013.01); *B32B 27/306* (2013.01); *B32B 27/36* (2013.01); *B32B 27/365* (2013.01); *H01M 4/661* (2013.01); *H01M 4/667* (2013.01); *B32B 2264/105* (2013.01); *B32B 2264/108* (2013.01); *B32B 2307/202* (2013.01); *B32B 2457/10* (2013.01); *H01M 10/052* (2013.01); *H01M 10/0525* (2013.01)

(56) References Cited

U.S. PATENT DOCUMENTS

| 2012/0156546 A1* | 6/2012 | Amano | C08G 59/4014 |
| | | | 429/149 |
| 2012/0189912 A1* | 7/2012 | Honda | H01M 4/667 |
| | | | 429/211 |
| 2013/0157129 A1* | 6/2013 | Uemura | C09D 5/24 |
| | | | 429/211 |
| 2013/0295432 A1* | 11/2013 | Inoue | H01M 4/668 |
| | | | 429/149 |

FOREIGN PATENT DOCUMENTS

| JP | 2010-92664 A | | 4/2010 |
|---|---|---|---|
| JP | 2010-257628 A | | 11/2010 |
| JP | 2011-8981 A | | 1/2011 |
| JP | 2011-501383 A | | 1/2011 |
| JP | 2011-93297 A | | 5/2011 |
| JP | 2013-26192 A | | 2/2013 |
| WO | 2009/054987 A1 | | 4/2009 |
| WO | WO2011092938 | * | 8/2011 |
| WO | 2012/161180 A1 | | 11/2012 |
| WO | 2012/161181 A1 | | 11/2012 |

* cited by examiner

[Fig. 1]
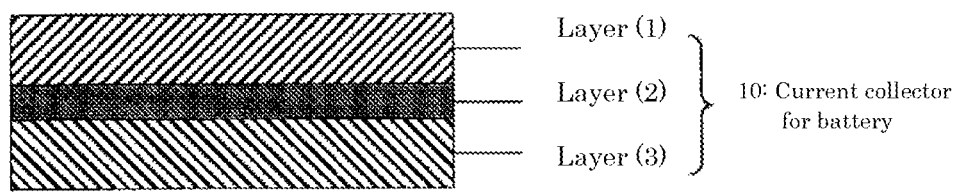
[Fig. 2]
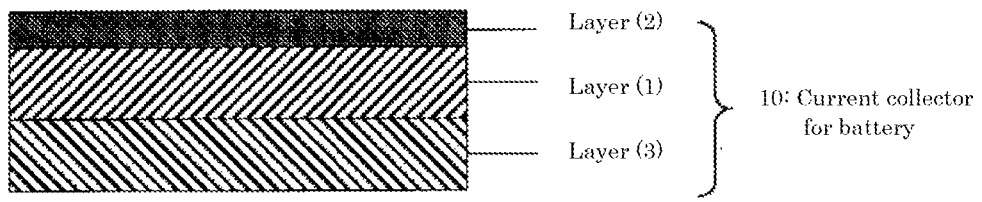
[Fig. 3]
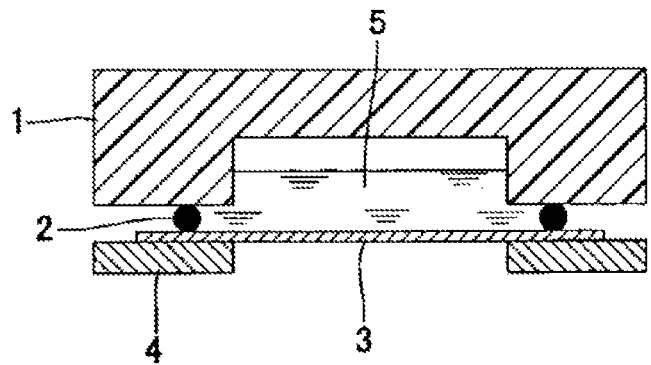

CURRENT COLLECTOR FOR BATTERY AND BATTERY USING SAME

TECHNICAL FIELD

The present invention relates to a current collector for a battery, and a battery using the same.

BACKGROUND ART

Recently, it been desired to be small and to have a high power density as a power source for vehicles and cell phones for secondary batteries, in order to protect the environment. For that reason, the development of various members has been promoted in various secondary batteries including a lithium ion battery having an active material with a high power density.

A current collector, which is one of the members, is typically formed using a metal foil. For example, in Patent Document 1, it is attempted to improve the balance between the conductivity and the brittleness by using a current collector formed of a conductive resin including carbon and two or more kinds of polyolefin copolymers in a redox flow type secondary battery.

CITATION LIST

Patent Literatures

Patent Document 1: JP-A No. 2000-200619

SUMMARY OF INVENTION

Technical Problem

In the lithium ion battery, it is required to have stability for a current collector, which is brought into contact with an electrode, in an equilibrium potential environment between an active material used in the electrode and a lithium ion. Especially, the equilibrium potential environment between a negative electrode active material and a lithium ion is a severe environment for polymer materials. Furthermore, when an electrolytic solution component is flown out of the system, the performance of a battery is deteriorated, and thus it is also necessary that in the current collector, components included in the electrolytic solution is not permeated.

For those reasons, in order to attempt to improve the power density of a battery, a polymer material having both of stability to the equilibrium potential environment in the negative electrode and blocking property to a solvent in the electrolytic solution is desired.

The object of the present invention is to provide a current collector for a battery having a stability to an equilibrium potential environment in a negative electrode, a low electric resistance, a blocking property to a solvent in an electrolytic solution and a blocking property to a component in the electrolytic solution, and a high capacity retention rate.

Solution to Problem

In view of the circumstance described above, the present inventors have promoted the research and development for realizing a current collector capable of improving the power density of the battery. As a result, both of the stability to the equilibrium potential environment in the negative electrode and the blocking property to the solvent in the electrolytic solution can be realized by using a specific polymer material for the current collector. They have found that, however, in order to realize a desired battery performance, it is necessary to inhibit decrease in the capacity retention rate while the electric resistance is kept at a low level.

As a result of the present inventors' further repeated painstaking studies, they have succeeded to solve the problems described above by providing a metal thin film layer or a layer formed from an electrically conductive material including a polymer material and electrically conductive carbon particles on at least one surface of a layer including a specific polymer material, in a multi-layer current collector having a layer formed from an electrically conductive material including a polymer material and electrically conductive particles; and they have completed the present invention.

A first aspect of the present invention relates to a current collector for a battery including:

(1) a layer (1) formed from an electrically conductive material including a polymer material 1 including at least one compound selected from the group consisting of the following (a) to (d), electrically conductive particles 1, (a) a polymer compound having an alicyclic structure (b) a saturated hydrocarbon polymer compound having a hydroxyl group (c) a phenoxy resin and an epoxy resin, and (d) an amine having an amine equivalent of 120 g/eq or less and an epoxy resin (provided that, a blending ratio of the epoxy resin and the amine is 1.0 or more in terms of a ratio of the number of active hydrogen atoms in the amine to the number of functional groups in the epoxy resin);

(2) a layer (2) which is formed on at least one surface of the layer (1), and which is a metal thin film layer or the layer (2) formed from an electrically conductive material including a polymer material 2 and an electrically conductive carbon particles 2; and (3) a layer (3) formed from an electrically conductive material including a polymer material 3 and electrically conductive particles.

In a preferable embodiment, the polymer material 2 includes at least owe compound selected from the group consisting of an elastomer, a modified polyolefin, an ethylene-vinyl acetate copolymer, a polyamide, a polyimide, and a polyamide imide.

In a preferably embodiment, the polymer material 3 has a durability to a positive electrode potential.

In a preferable embodiment, the polymer compound (a) having an alicyclic structure has structural units derived from a cyclic olefin in its backbone.

In a preferable embodiment, the polymer compound (a) having an alicyclic structure has an alicyclic condensed ring structure.

In a preferable embodiment, the polymer compound (a) having an alicyclic structure is a norbornene polymer and/or a hydrogenated product thereof.

In a preferable embodiment, the saturated hydrocarbon polymer compound (b) having a hydroxyl group is a vinyl alcohol (co)polymer having, as a main component, structural units of vinyl alcohol.

In a preferable embodiment, the epoxy resin (c) has an epoxy equivalent of 500 g/eq or less.

In a preferable embodiment, the electrically conductive particle 1 is an electrically conductive carbon particle.

In a preferable embodiment, the electrically conductive particle 1 is an electrically conductive particle including a metal element.

In a preferable embodiment, the electrically conductive particle 1 is a platy electrically conductive particle having a metal element and an aspect ratio of 5 or more.

In a more preferable embodiment, the metal element is at least one element selected from the group consisting of platinum, gold, silver, copper, nickel, chromium, zirconium, and titanium.

In a preferable embodiment, the layer (2) is disposed between the layer (1) and layer (3).

In a preferable embodiment, the layer (1) is a surface layer, and an abundance of the metal elements on at least one surface of the surface layers is 0.5% or more in terms of an atomic ratio to the total elements.

In a preferable embodiment, the layer (1) is a surface layer, and the electrically conductive particles including the metal element are exposed by removing the polymer, on at least one of the surface layers.

In a preferable embodiment, a surface of the surface layer is subjected to any one of a corona treatment, a plasma treatment, a blast treatment, a polishing treatment, brushing treatment, and an ion beam treatment, thereby removing the polymer.

In a preferable embodiment, the layer (1) has the following area A and area B.

Area A:
An area which is located, on one surface of the layer (1) and includes the electrically conductive carbon particles, or which includes the electrically conductive particles including the metal element, the concentration thereof being higher than that in the area B.

Area B:
An area which has the electrically conductive particles including the metal element.

In a preferable embodiment, the metal thin film layer of the layer (2) is formed from at least one metal element selected from the group consisting of copper, nickel, chromium, titanium, platinum, iron, aluminum, zirconium, gold, and silver, or any one of an alloy, an oxide, a carbide, a nitride, a silicide, a boride, and a phosphide thereof.

In a preferable embodiment, the metal thin film layer of the layer (2) is formed by a physical deposition and/or a chemical deposition.

In a preferable embodiment, the metal thin film layer of the layer (2) has a thickness of less than 1 μm.

In a preferable embodiment, the current collector has the metal thin film layer of the layer (2) on at least one surface thereof.

In a preferable embodiment, the layer (1) includes the electrically conductive particles 1 and the polymer material 1 in a weight ratio of electrically conductive particles 1:polymer material 1 within a range of 1:99 to 99:1.

In a preferable embodiment, the polymer material 3 is at least one compound selected from the group consisting of polyvinyl acetate, polyamide, polyamide imide, polyimide, polycarbonate, polyethylene terephthalate, polybutylene terephthalate, cyclic polyolefin, polyphenylene sulfide, polytetrafluoroethylene, polyether ether ketone, silicone, nylon, vinylon, polyethylene, polypropylene, and polyphenylene ether.

In a preferable embodiment, the layer (3) includes the polymer material 3 and the electrically conductive particles in a weight ratio of the polymer material 3:electrically conductive particles within a range of 1:99 to 99:1.

In a preferable embodiment, the electrically conductive particles in the layer (3) include electrically conductive carbon particles.

In a preferable embodiment, the electrically conductive carbon particles 2 included in the layer (2) has a higher content than that of the electrically conductive carbon particles included in the layer (3).

In a preferable embodiment, the electrically conductive carbon particles 2 are included in the layer (2) in a content of 20 parts by weight or more based on 100 parts by weight of the polymer material 2.

In a preferable embodiment, the layer (1) to the layer (3) are laminated in order of the layer (2), the layer (1), and the layer (3).

In a preferable embodiment, the current collector for a battery has a thickness of 1 to 100 μm.

In a preferable embodiment, an electric resistance per unit area in a thickness direction is 10 $\Omega \cdot cm^2$ or less.

In a preferable embodiment, a surface resistivity is 100Ω/□ or less.

A second aspect of the present invention relates to a battery including the current collector for a battery as described above.

In a preferable embodiment, the battery is a bipolar battery.

In a preferable embodiment, the metal thin film layer of the layer (2) in the current collector for a battery is brought into contact with the negative electrode active material layer.

Advantageous Effects of Invention

The current collector of the present invention for a battery has a stability to the equilibrium potential environment in the negative electrode, a low electric resistance, a blocking property to a solvent in an electrolytic solution, and a blocking property to a component in an electrolyte. In addition, the current collector of the present invention for a battery has a high capacity retention rate, and thus a battery durability is improved. When the current collector of the present invention for a battery is used, it is possible to obtain a battery which realises both of a weight reduction and a long-term reliability.

BRIEF DESCRIPTION OF THE DRAWING

FIG. 1 is a cross-sectional view showing one embodiment of a current collector of the present invention for a battery.

FIG. 2 is a cross-sectional view showing another embodiment of a current collector of the present invention for a battery.

FIG. 3 is a schematic view illustrating measurement of a blocking property to a solvent in an electrolytic solution in Examples of the present invention.

DESCRIPTION OF EMBODIMENTS

Embodiments of the present invention are enumerated as below, but the present invention is not limited to these embodiments.

The current collector of the present invention for a battery (hereinafter referred to also simply as a "current collector") includes:

(1) a layer (1) formed from an electrically conductive material including a polymer material 1 including at least one compound selected from the group consisting of following (a) to (d), and electrically conductive particles 1, (a) a polymer compound having an alicyclic structure (b) a saturated hydrocarbon polymer compound having a hydroxyl group (c) a phenoxy resin and an epoxy resin, and (d) an amine having an amine equivalent of 120 g/eq or less and an epoxy resin (provided that, a blending ratio of the epoxy resin and the amine is 1.0 or more in terms of a ratio of the number of active hydrogen atoms in the amine to the number of functional groups in the epoxy resin);

(2) a layer (2) which is formed on at least one surface of the layer (1), and which is a metal thin film layer or the layer (2) formed from an electrically conductive material including a polymer material 2 and an electrically conductive carbon particles 2; and (3) a layer (3) formed from an electrically conductive material including a polymer material 3 and electrically conductive particles.

Layer (1)

First, the layer (1) will be explained.

The layer (1), the polymer layer, includes at least one polymer material 1 selected from the group consisting of following (a) to (d):

(a) a polymer compound having an alicyclic structure
(b) a saturated hydrocarbon polymer compound having a hydroxyl group
(c) a phenoxy resin and an epoxy resin, and
(d) an amine having an amine equivalent of 120 g/eq or less and an epoxy resin (provided that a blending ratio of the epoxy resin and the amine is 1.0 or more in terms of a ratio of the number of active hydrogen atoms in the amine to the number of functional groups in the epoxy resin)

The polymer materials 1 have a durability to a negative electrode potential, and are excellent in a blocking property to a solvent in an electrolytic solution.

In the present invention, the phrase "to have the durability to the negative electrode potential (the stability to the equilibrium potential environment in the negative electrode)" means to have the durability to the equilibrium potential environment between the negative electrode active material and the lithium ion. Specifically, it means that materials are not decomposed in an environment of +0 V to +2 V to an equilibrium potential between a metal lithium and a lithium ion.

The durability to the negative electrode potential can be measured by an electrochemical technique. Specifically, using an electrochemical cell, a lithium metal is used as a counter electrode and the current collector of the present invention is used as a working electrode. In such a condition, when a constant current is applied from the working electrode to the counter electrode, it can be judged that the durability is excellent if a potential difference between the working electrode and the counter electrode reaches a desired value between +0 V to +2 V within a given period of time. If the potential difference does not reach the desired value, then decomposition or the like occurs and it can be judged that the current collector has no durability. In a case where a current collector has no durability to the negative electrode potential, the current collector is deteriorated by charging when it is applied to a battery, and thus the life of the battery is shortened.

In the present invention, the blocking property to the solvent in the electrolytic solution means a degree of a permeation weight of the solvent in the electrolytic solution used in a lithium ion battery, and if the solvent is hardly permeated, then it can be judged that the blocking property to the solvent in the electrolytic solution is excellent. The blocking property can be evaluated, for example, by measuring a permeation amount of the solvent in the electrolytic solution in a given period of time, in a condition in which a solvent (for example, a carbonate solvent or the like) of the electrolytic solution used in the lithium ion battery is brought into contact with one side of the current collector and dry air is brought into contact with the other side thereof, but the evaluation methods are not particularly limited thereto. Specifically, in a case where the current collector brought into contact with the carbonate solvent has an area of 16.6 cm$^2$, when a permeation amount of the solvent is 100 mg or less at 25° C. after 2 weeks, then it can be said to have the blocking property to the solvent in the electrolytic solution. The permeation amount is preferably 50 mg or less and more preferably 10 mg or less. When the blocking property to the solvent in the electrolytic solution is poor, electric discharge ends without applying current toward the outside due to side reactions caused by movement of solvated ions through the current collector to the outside thereof when it is applied to a bipolar battery.

The polymer compound (a) having an alicyclic structure will be explained.

The alicyclic structure is classified into a monocyclic structure and a condensed ring structure. The condensed ring structure is a cyclic structure in which each ring shares two or more atoms in the two or more cyclic structures. The condensed ring structure is preferable in terms of the mechanical strength and the blocking property to the solvent in the electrolytic solution.

The alicyclic structure can be classified into a saturated cyclic hydrocarbon (cycloalkane) structure, an unsaturated cyclic hydrocarbon (a cycloalkene or cycloalkyne) structure from the bonding form between carbon atoms, and the cycloalkane structure and the cycloalkene structure are preferable in terms of the mechanical strength and the heat resistance, and especially the cycloalkane structure is most preferable.

The number of carbon atoms forming the alicyclic structure is not particularly limited, and preferably from 4 to 30, more preferably from 5 to 20, and still more preferably from 5 to 15. When the number of the carbon atoms are within the range described above, the properties of the mechanical strength, the heat resistance, and the formability are well-balanced.

The alicyclic structure may exist in the backbone or at the side chains. It is preferable that alicyclic structure exists in the backbone from the viewpoint of the mechanical strength, the heat resistance, and the like, and it is more preferable that the structural units derived from the cycloalkane exist on the backbone.

Repeating units including the alicyclic structure (structural units derived from a monomer having the alicyclic structure) are included in the polymer compound including the alicyclic structure in a content of preferably 50% by weight or more and more preferably 70% by weight or more. The content of the repeating units including the alicyclic structure in the polymer including the alicyclic structure, which is within the range described above, is preferable from the viewpoint of the blocking property to the solvent in the electrolytic solution and the heat resistance. As for a remaining structure other than the repeating units including the alicyclic structure in the polymer including the alicyclic structure, is preferably a saturated hydrocarbon structure from the viewpoint of the durability to the negative electrode potential and the heat resistance, but is not particularly limited thereto.

Examples of the polymer compound having an alicyclic structure may specifically include (i) norbornene polymers, (ii) monocyclic olefin polymers, (iii) cyclic conjugated diene polymers, (iv) vinyl alicyclic hydrocarbon polymers, hydrogenated products of (i) to (iv), and the like.

(i) Norbornene Polymer

The norbornene polymer may include ring-opened polymers of a norbornene monomer, ring-opened copolymers of a norbornene monomer with another monomer capable of ring-opening copolymerization therewith, hydrogenated products thereof, addition polymers of a norbornene monomer, addition copolymers of a norbornene monomer with another monomer, copolymerizable therewith, and the like.

In the hydrogenated product of the ring-opened polymer of the norbornene monomer and the hydrogenated product of the ring-opened copolymer of the norbornene monomer with another monomer capable of ring-opening copolymerization therewith, it is preferable that a hydrogenation ratio is 99% or more, because of the high long-term stability and the excellent durability to the negative electrode potential.

The norbornene monomer may include alicyclic compounds such as bicyclo[2.2.1]hept-2-ene (common name: norbornene), tricyclo[4.3.0,12,5]deca-3,7-diene (common name: dicyclopentadiene), 7,8-benzotricyclo[4.3.0.12,5] deca-3-ene (common name: methanotetrahydrofluorene, which is also called as 1,4-methano-1,4,4a,9a-tetrahydrofluorene), tetracyclo[4.4.0.12,5.17,10]dodeca-3-ene (a common name: tetracyclododecene), and those compounds having a substituent (an alkyl group, an alkylene group, an alkylidene group, an alkoxycarbonyl group, or the like). The norbornene monomers may be used alone or as a mixture of two or more kinds.

The ring-opened polymers of the norbornene monomer or the ring-opened copolymers of the norbornene monomer with the other monomer capable of ring-opening copolymerization therewith can be obtained by the polymerization of the monomer component in the presence of a ring-opening polymerization catalyst. As the ring-opening polymerization catalyst, for example, a catalyst including a halide of a metal such as ruthenium, rhodium, palladium, osmium, iridium, or platinum, a nitrate or an acetyl acetone compound, and a reducing agent; or a catalyst including a halide of a metal such as titanium, vanadium, zirconium, tungsten, or molybdenum, or an acetyl acetone compound, and an organoaluminum compound may be used. The polymerization reaction is performed in a solvent or in the absence of a solvent usually at a polymerization temperature of −50° C. to 100° C. in a polymerization pressure of 0 to 5 MPa. The other monomer capable of ring-opening copolymerization with the norbornene monomer may include, but is not limited to, for example, monocyclic olefin monomers such as cyclohexene, cycloheptene, cyclooctene, and the like.

The hydrogenated product of the ring-opened polymer of the norbornene monomer can be usually obtained by adding a hydrogenation catalyst to a polymerization solution including the ring-opened polymer, and hydrogenating the carbon-carbon unsaturated bonds. The hydrogenation catalyst is not particularly limited, and a heterogeneous catalyst or a homogeneous catalyst is usually used.

The norbornene monomer or the addition (co)polymer of the norbornene monomer with the other monomer copolymerizable therewith can be obtained, for example, by (co) polymerization of the monomer component in a solvent or in absence of a solvent in the presence of a catalyst including a titanium, zirconium, or vanadium compound and an organoaluminum compound usually at a polymerization temperature of −50° C. to 100° C. in a polymerization pressure of 0 to 5 MPa.

As the other monomer copolymerizable with the norbornene monomer, for example, α-olefins having 2 to 20 carbon atoms such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene; cyclic olefins such as cyclobutene, cyclopentene, cyclohexene, 3,4-dimethyl cyclopentene, 3-methyl cyclohexene, 2-(2-methylbutyl)-1-cyclohexene, cyclooctene, and 3a,5,6,7a-tetrahydro-4,7-methano-1H-indene; non-conjugated dienes such as 1,4-hexadiene, 4-methyl-1,4-hexadiene, and 5-methyl-1,4-hexadiene, 1,7-octadiene, and the like, may be used, but it is not limited thereto. Of these, α-olefins, especially ethylene, are preferable from the viewpoint of the heat resistance, and the like.

The other monomers copolymerizable with the norbornene monomer may be used alone or as a mixture of two or more kinds. When the norbornene monomer is addition copolymerized with the other monomer copolymerizable therewith, a ratio of the structural units derived from the norbornene monomer to the structural units derived from the other copolymerizable monomer in the addition copolymer is appropriately selected so that the weight ratio thereof is within a range of preferably 30:70 to 99:1, more preferably 50:50 to 97:3, and still more preferably 70:30 to 95:5. When the ratio is within the range described above, the blocking property to the solvent in the electrolytic solution and the mechanical strength are excellent.

The polymer obtained by the ring-opening polymerization may include ring-opened polymer hydrogenated products of the norbornene monomer such as ZEONEX (a registered trademark: manufactured by Zeon Corporation), ZEONOR (a registered trademark: manufactured by Zeon Corporation), and ARTON (a registered trademark: JSR Corporation), and the addition polymer may include addition polymers of the norbornene monomer with ethylene such as APEL (a registered trademark: manufactured by Mitsui Chemicals, Inc.), and TOPAS (a registered trademark: manufactured by Polyplastics Co., Ltd.).

From the point of the blocking property to the electrolytic solution, the norbornene polymers and/or the hydrogenated products thereof are preferable, and it is more preferable to use at least one polymer selected from the group consisting of the ring-opened polymers of the norbornene monomer, the hydrogenated products thereof, the addition polymers of the norbornene monomer, and the addition polymers of the norbornene monomer and the vinyl monomer. The ring-opened polymers of the norbornene monomer, having no polar group (registered trademarks; ZEONEX and ZEONOR, manufactured by Zeon Corporation) are particularly preferable, in terms of the durability to the negative electrode potential and the long-term stability.

(ii) Monocyclic Olefin Polymer

As the monocyclic olefin polymer, for example, addition polymers of a monocyclic olefin monomer such as cyclohexene, cycloheptene, or cyclooctene may be used.

(iii) Cyclic Conjugated Diene Polymer

As the cyclic conjugated diene polymer, for example, polymers obtained by 1,2- or 1,4-addition polymerization of a cyclic conjugated diene monomer such as cyclopentadiene or cyclohexadiene, and hydrogenated products thereof may be used.

(iv) Vinyl Alicyclic Hydrocarbon Polymer

The vinyl alicyclic hydrocarbon polymer may include, for example, polymers of a vinyl alicyclic hydrocarbon monomer such as vinyl cyclohexene or vinyl cyclohexan and hydrogenated products thereof; polymers of an aromatic vinyl monomer such as styrene or α-methyl styrene in which the aromatic moiety is hydrogenated, and the like. Any of the vinyl alicyclic hydrocarbon polymers, the copolymers, such as a random-copolymer and a block copolymer, of the aromatic vinyl monomer with the other monomer copolymerizable with the monomer, and the hydrogenated products thereof may be used. The block copolymer may include, but is not particularly limited to, diblock copolymers, triblock copolymers, multi-block copolymers having more than three block moieties, gradient block copolymers, and the like.

The molecular weight of the polymer compound having an alicyclic structure is appropriately selected, and the weight average molecular weight, Mw, measured by a gel permeation chromatography in a cyclohexane solution (a toluene solution in a case where the polymer resin is not dissolved) is within the range of preferably 5,000 to 1,000,000, more preferably 8,000 to 800,000, and still more preferably 10,000 to 5000,000 in terms of polyisoprene or polystyrene. When the molecular weight is within the range described above, the mechanical strength of the molded article and the molding processability are well-balanced.

The saturated hydrocarbon polymer compound (b) having a hydroxyl group, used in the layer (1) in the present invention will be explained.

The saturated hydrocarbon polymer compound having a hydroxyl group, used in the present invention, is not particularly limited, and is preferably a vinyl alcohol copolymer having, as a main component, structural units of vinyl alcohol. Here, the "vinyl alcohol (co)polymer" refers to "a vinyl alcohol polymer and/or a vinyl alcohol copolymer."

In the present invention, the "structural unit of vinyl alcohol" refers to a linear saturated aliphatic structure in which a double bonding moiety, in the vinyl alcohol as a monomer unit, is linked, and the remaining hydroxyl group acts as a functional group. The "vinyl alcohol (co)polymer" refers to a polymer having structural units of vinyl alcohol. Examples thereof may include polyvinyl alcohol, copolymers of vinyl alcohol with another unsaturated monomer having a carbon-carbon bonding, and the like. The unsaturated monomer having a carbon-carbon bonding is not particularly limited, and ethylene, 1-cyclohexene, and analogues thereof, which turn out a saturated aliphatic hydrocarbon backbone after the polymerization, are preferable from the viewpoint of the durability to a negative electrode potential.

It is preferable that the saturated hydrocarbon polymer compound having a hydroxyl group in the present invention has, as a main component, the structural units of vinyl alcohol. In the resin structure, the phase "has, as a main component," means that a degree of hydrolysis (mol %), showing a content of the "structural units of vinyl alcohol," is 50 mol % or more. The degree of hydrolysis is not particularly limited, and it is within a range of preferably 70 to 100 mol %, more preferably 90 to 100 mol %, and particularly preferably 98 to 100 mol %. In polyvinyl alcohol resins having a low degree of hydrolysis, a content of acetyl groups, which are intermediates during purification, is increased, and bad influence may sometimes be exerted on the durability to a negative electrode potential. Examples thereof may specifically include, as an available commercial product, N-type GOHSENOL N-300 (manufactured by Nippon Synthetic Chemical Industry Co., Ltd., a degree of hydrolysis of 98.0 to 99.0 mol % and a viscosity of 25 to 30 mPa·s), NH-18 (manufactured by Nippon Synthetic Chemical Industry Co., Ltd., a degree of hydrolysis of 98.0 to 99.0 mol % and a viscosity of 25 to 30 mPa·s), NH-20 (manufactured by Nippon Synthetic Chemical Industry Co., Ltd., a degree of hydrolysis of 98.5 to 99.4 mol % and a viscosity of 35 to 43 mPa·s), NH-26 (manufactured by Nippon Synthetic Chemical Industry Co., Ltd., a degree of hydrolysis of 99.4 mol % or more and a viscosity of 60 to 68 mPa·s), NM-14 (manufactured by Nippon Synthetic Chemical Industry Co., Ltd., a degree of hydrolysis of 99.0 mol % or more, and a viscosity of 20.5 to 24.5 mPa·s), NM-11 (manufactured by Nippon Synthetic Chemical Industry Co., Ltd., a degree of hydrolysis of 99.0 mol % or more and a viscosity of 13 to 16 mPa·s), NL-05 (manufactured by Nippon Synthetic Chemical Industry Co., Ltd., a degree of hydrolysis of 99.0 mol % or more and a viscosity of 4.6 to 6.0 mPa·s), EVAL, which is a copolymer of vinyl alcohol with ethylene (manufactured by Kuraray Co., Ltd., a degree of hydrolysis of 99.4% or more), and the like.

The phenoxy resin and the epoxy resin (c), used in the layer (1) in the present invention, will be explained.

As the phenoxy resin, any known phenoxy resin may be used, and examples thereof may include, for example, products from a bisphenol and epihalohydrin, products obtained by an addition polymerization of an epoxy resin of phenol and a bisphenol. The bisphenols, which are used as a starting material of the phenoxy resin, may typically include 2,2-bis(4-hydroxyphenyl)propane, bis(4-hydroxyphenyl)methane, bis(4-hydroxyphenyl)sulfone, bis(4-hydroxyphenyl)sulfide, 3,4,5,6-dibenzo-1,2-oxaphosphane-2-oxidehydroquinone, and the like. The phenoxy resin can be easily produced in a known method by controlling a reaction molar ratio of the bisphenol and the epoxy resin thereof, or the epihalohydrin. Alternatively, when the multiple bisphenols described above are combined, copolymer phenoxy resins can be similarly obtained.

The phenoxy resin has a weight average molecular weight of preferably 80,000 or more, more preferably 40,000 or more, and still more preferably 50,000 or more. When, the molecular weight is less than 30,000, the blocking property to the solvent in the electrolytic solution may sometimes be insufficient, when it is cured with the epoxy resin. The upper limit thereof is preferably 80,000 from the viewpoint of flexibility in selection of a usable solvent and easiness in handling with the epoxy resin.

The phenoxy resin has a hydroxy equivalent within a range of preferably 100 to 500 g/eq, more preferably 150 to 450 g/eq, particularly preferably 200 to 400 g/eq. When the hydroxyl equivalent is less than 100 g/eq, a degree of shrinkage on curing may become high because of many reaction points with the epoxy resin. On the other hand, when the hydroxyl equivalent is within a range of 100 to 500 g/eq, the adhesion between the layers is excellent when a multi-layer is produced.

When either the weight average molecular weight or the hydroxyl equivalent of the phenoxy resin is within the preferable range described above, a film having the blocking property to the solvent in the electrolytic solution or the adhesion between the layers can be easily obtained therefrom. A case where both of the weight average molecular weight and the hydroxyl equivalent are within the preferably ranges described above is more preferable, because of the excellent blocking property to the solvent in the electrolytic solution and adhesion between the layers. Available commercial products of the usable phenoxy resin may include, for example, YP-50S (manufactured by Nippon Steel & Sumikin Chemical Co., Ltd., a weight average molecular weight of 50,000 to 70,000), YP-70 (manufactured by Nippon Steel & Sumikin Chemical Co., Ltd., a weight average molecular weight of 50,000 to 60,000), YPB-43C (manufactured by Nippon Steel & Sumikin Chemical Co., Ltd., a weight average molecular weight of 60,000 or more), FX-316 (manufactured by Nippon Steel & Sumikin Chemical Co., Ltd., a weight average molecular weight of 40,000 to 60,000), and the like.

Any epoxy resin may be used so long as it is a compound having two or more epoxy groups per molecule, and it is not necessary to be a polyether. Known epoxy resins can be used, and examples thereof may include polyether type epoxy resins, polyfunctional epoxy resins, dimer acid type epoxy resins, alicyclic epoxy resins, aromatic amino epoxy resins, and the like. Of these, the polyether type epoxy resins, the polyfunctional epoxy resins, the alicyclic epoxy resins, and the aromatic amino epoxy resin are preferably used from the viewpoint of the blocking property to the solvent in the electrolytic solution.

The polyether type epoxy resin is produced by reacting a monomer epoxy compound, typically epihalohydrin, with a bisphenol to obtain a glycidyl ether. The bisphenols, used as a starting material of the epoxy resin, may typically include 2,2-bis(4-hydroxyphenyl)propane, bis(4-hdyroxyphenyl)methane, bis(4-hydroxyphenyl)sulfone, bis(4-hydroxyphenyl)sulfide, 3,4,5,6-dibenzo-1,2-oxaphosphan-2-oxidehydroquinone, and the like. The available commercial products of the polyether type epoxy resin, produced from the bisphenols, may include, for example, jER 828 (manufactured by Mitsubishi Chemical Corporation, an average molecular weight of 370 and an epoxy equivalent of 184 to 194 g/eq), jER 1004AF (manufactured by Mitsubishi Chemical Corporation, an average molecular weight of 1650, and an epoxy equivalent of 875 to 975 g/eq), jER 806 (manufactured by Mitsubishi Chemical Corporation, an epoxy equivalent of 160 to 170 g/eq), jER YX 4000 (manufactured by Mitsubishi Chemical Corporation, an epoxy equivalent of 180 to 192 g/eq), and the like. Available commercial products of the polyfunctional epoxy resin may include, for example, jER 152 (manufactured by Mitsubishi Chemical Corporation, an epoxy equivalent of 176 to 178 g/eq), jER 157 S70 (manufactured by Mitsubishi Chemical Corporation, an epoxy equivalent of 200 to 220 g/eq), jER 1032 H60 (manufactured by Mitsubishi Chemical Corporation, an epoxy equivalent of 163 to 174 g/eq), and the like. Available commercial products of the dimer acid type epoxy resin may include, for example, jER 871 (manufactured by Mitsubishi Chemical Corporation, an epoxy equivalent of 390 to 470 g/eq), jER 872 (manufactured by Mitsubishi Chemical Corporation an epoxy equivalent of 600 to 700 g/eq), and the like. Available commercial products of the aromatic amino epoxy resin may include, for example, jER 604 (manufactured by Mitsubishi Chemical Corporation, an epoxy equivalent of 110 to 130 g/eq), jER 630 (manufactured by Mitsubishi Chemical Corporation, an epoxy equivalent of 90 to 105 g/eq), and the like.

The epoxy resin has a number average molecular weight of preferably 5,000 or less, and more preferably 3,000 or less and still more preferably 1,000 or less from the viewpoint of the blocking property to the solvent in the electrolytic solution. When the number average molecular weight is more than 5,000, the molecular weight between crosslinking points with the phenoxy resin may be increased, thus resulting in the poor blocking property to the solvent in the electrolytic solution.

From the viewpoint of the blocking property to the solvent in the electrolytic solution, the epoxy resin has an epoxy equivalent of preferably 500 g/eq or less, more preferably 400 g/eq or less, and particularly preferably 300 g/eq or less. When the epoxy equivalent is more than 500 g/eq, the crosslinking density with the phenoxy resin may be reduced.

When either of the number average molecular weight or the epoxy equivalent of the epoxy resin is within the preferably range described above, a film having the blocking property to the solvent in the electrolytic solution can be easily obtained. A case where both of the number average molecular weight and the epoxy equivalent are within the preferably ranges described above is more preferable, because of the excellent blocking property to the solvent in the electrolytic solution.

The blending ratio of the phenoxy resin to the epoxy resin is preferably from 0.5 to 2.0 equivalents of the epoxy groups in the epoxy resin per equivalent of the hydroxyl groups in the phenoxy resin, more preferably from 0.7 to 1.5 equivalents, and particularly preferably from 0.9 to 1.2 equivalents. When the ratio is less than 0.5 equivalents, the crosslinking density of the phenoxy resin with the epoxy resin may be reduced. On the other hand, when the ratio is more than 2.0 equivalents, it may become unstable to the equilibrium potential environment in the negative electrode due to unreacted epoxy groups.

It is possible to suitably use a curing accelerator having a catalytic activity to accelerate a curing reaction. The curing accelerators may include, for example, tertiary amine compounds, alkali metal compounds, organophosphate compounds, quarternary ammonium salts, cyclic amines, imidazoles, and the like. They may be used alone or as a mixture of two or more kinds. Of these, the tertiary amine compounds can be particularly preferably used, in view of the higher stability to the equilibrium potential environment in the negative electrode.

As the tertiary amine compound, for example, 2,4,6-tris(dimethylaminomethyl)phenol, triethyl amine, tri-n-propyl amine, tri-n-butyl amine, triethanol amine, and benzyl dimethyl amine can be particularly preferably used. They may be used alone or as a mixture of two or more kinds, as similarly above.

The curing accelerator may be added in an amount of about 0.01 to 5% by weight in the reaction solid matter. When the amount is less than 0.01% by weight, the effects as the catalyst may not be sometimes obtained. On the other hand, when it is more than 5% by weight, the function as the catalyst can be already enough obtained, and there may be no effects obtained by the further increase of the amount.

The amine having an amine equivalent of 120 g/eq or less and the epoxy resin (d), used in the layer (1) in the present invention, will be explained.

The epoxy resin is a compound having two or more epoxy groups in one molecule, and capable of giving a three-dimensional cured product with an appropriate curing agent. As the epoxy resin, compounds having two or more epoxy groups in one molecule may be used, and typical examples thereof may include glycidyl ether-type epoxy resins.

The glycidyl ether-type epoxy resin is prepared by reacting a monomer epoxy compound, typically epihalohydrin, and an alcohol with a phenol, typically a bisphenol, to obtain a glycidyl ether. Examples thereof may include, for example, dihydric phenols such as bisphenol A, bisphenol F, bisphenol S, fluorene bisphenol, 4,4'-biphenol, 2,2'-biphenol, hydroquinone, and resorcin; and glycidyl-etherificated compounds of a tri- or more-hydric phenol such as tri-(4-hydroxyphenyl)methane, 1,1,2,2-tetrakis(4-hydroxyphenyl)ethane, a novolak resins of phenol, cresol, or naphthol, and aralkyl resins of phenol, cresol, or naphthol.

In addition to the glycidyl ether-type epoxy resin, the following resins may also be preferably used: glycidyl amine-type epoxy resins obtained by glycidylation of an amine such as diaminophenyl methane, diaminodiphenyl sulfone, aniline, toluidine, aminophenol, aminocresol, metal-xylylene diamine, 1,3-bisaminomethyl cyclohexane, or alkyl-substituted hydantoin: hydrogenated epoxy resins such as hydrogenated bisphenol A-type epoxy resins, hydrogenated bisphenol F-type epoxy resins hydrogenated biphenol-type epoxy resins, hydrogenated phenol novolak-type epoxy resins, hydrogenated cresol novolak-type epoxy resins, hydrogenated bisphenol A-type novolak resins, hydrogenated naphthalene diol-type epoxy resins, and hydrogenated phenol dicyclopentadiene novolak-type epoxy resins; alicyclic epoxy resins obtained by epoxylation of an olefin such as 3,4-epoxycyclohexylmethyl-3'-4'-epoxycyclohexane carboxylate, 1,2-epoxy-vinylcyclohexene, bis(3,4-epoxycyclohexylmethyl)adipate, 1-epoxyethyl-3,4-epoxycyclohexane, limonene diepoxide, 3,4-epoxycyclohexyl methanol, dicylopentadiene diepoxide. The epoxy resins may be used alone or as a mixture of two or more kinds.

The epoxy resin has a number average molecular weight of preferably 5,000 or less, more preferably 3000 or less, and particularly preferably 1,000 or less. When the number average molecular weight is 5,000 or less, a distance between the cross-linking points with the amine narrows, and thus the blocking property to the solvent in the electrolytic solution tends to be better.

The epoxy resin has an epoxy equivalent of preferably 1000 g/eq or less, more preferably 500 g/eq or less, and particularly preferably 300 g/eq or less. When the epoxy equivalent is 1000 g/eq or less, the number of the crosslinking points with the amine is increased, and the blocking property to the solvent in the electrolytic solution tends to be better.

Any amine may be used so long as it has an amine equivalent of 120 g/eq or less, and the kind of the amine is not limited. Known amines, which are usually used of a curing agent for an epoxy resin, may be used, and aliphatic polyamines alicyclic polyamines, and aromatic polyamines are preferable, from the viewpoint of the adhesiveness and the solvent resistance. The aliphatic polyamine may include specifically diethylene triamine (DETA, an amine equivalent of 20.7 g/eq), triethylene tetramine (TETA, an amine equivalent of 24.4 g/eq), tetraethylenepentamine (an amine equivalent of 27.1 g/eq), m-xylene diamine (an amine equivalent of 34.1 g/eq), trimethyl hexamethylene diamine (an amine equivalent of 39.6 g/eq), 2-methyl pentamethylene diamine (an amine equivalent of 29.0 g/eq), diethyl aminopropyl amine (an amine equivalent of 65.0 g/eq), and the like. The alicyclic polyamine may include specifically isophorone diamine (an amine equivalent of 42.6 g/eq), 1,3-bisaminomethyl cyclohexane (an amine equivalent of 35.5 g/eq), bis(4-aminocyclohexyl)methane (an amine equivalent of 52.5 g/eq), norbornene diamine (an amine equivalent of 38.6 g/eq), 1,2-diaminocyclohexane (an amine equivalent of 28.5 g/eq), Laromin C-260 (an amine equivalent of 59.5 g/eq), and the like. The aromatic polyamine may include specifically diaminodiphenyl methane (an amine equivalent of 49.6 g/eq), meta-phenylene diamine (an amine equivalent of 31.0 g/eq), diaminodiphenyl sulfone (an amine equivalent of 62.1 g/eq), and the like. They may be used alone or as a mixture of two or more kinds. The aliphatic polyamines are more preferable, and TETA and DETA are particularly preferable, from the viewpoint of the improvement of the blocking property to the solvent.

The amine has an equivalent of 120 g/eq or less, and the amine equivalent is preferably 100 g/eq or less and more preferably 80 g/eq or less, from the viewpoint of the improvement of the blocking property to the solvent.

As for the blending ratio of the amine to the epoxy resin, a ratio of the number of active hydrogen atoms in the amine to the number of the functional groups (the number of epoxy groups) in the epoxy resin is 1.0 or more, and preferably 1.1 or more and more preferably 1.2 or more from the viewpoint of the improvement of the durability to the negative electrode. On the other hand, when the ratio is or more, the strength of the current collector may sometimes be reduced.

The electrically conductive particles, included in the current collector of the present invention for a battery, will be explained. In the present invention, the electrically conductive particles refer to an electrically conductive particulate solid.

The electrically conductive particles 1, included in the layer (1), are not particularly limited, and electrically conductive carbon particles and electrically conductive particles including a metal element are preferable from the viewpoint of the electrical conductivity.

The electrically conductive carbon particles have a very wide potential window, are stable to both of the positive electrode potential and the negative electrode potential in a wide range, and have the excellent electrical conductivity. In addition, because the electrically conductive carbon particles are very light, the increase of the mass of the current collector is minimized. Furthermore, the electrically conductive carbon particles are often used as a conductive assistant for an electrode, and thus the contact resistance becomes very low even if it is brought into contact with a conductive assistant, because they are the same material.

The electrically conductive carbon particles are specifically exemplified by carbon black such as acetylene black or Ketjen black, graphite, graphene, carbon nanotube, and the like. Among the electrically conductive carbon particles, the carbon black is particularly preferable in terms of the excellent electrical conductivity. As the available commercial product thereof, #3950 B (manufactured by Mitsubishi Chemical Corporation), Black Pearls 2000 (manufactured by Cabot Japan K. K.), Printex XE2B (manufactured by Evonik Degussa Japan Co., Ltd.), Ketjen black EC-600JD (manufactured by Lion Corporation), ECP-600JD (manufactured by Lion Corporation), EC-300J (manufactured by Lion Corporation), and ECP (manufactured by Lion Corporation) can be preferably used.

The electrically conductive particles can be used in the form of a generally called "filler-type electrically conductive resin composition," which has been practicalized, besides in the form of the particles as described above. In addition, for example particles of an electrically conductive polymer such as polypyrrole or polyaniline can also be used.

It is also preferable to use electrically conductive particles including a metal element as the electrically conductive particles 1 used in the layer (1) in the current collector of the present invention for a battery. The polymer materials (a) to (d) used in the layer (1) have the stability to the equilibrium potential environment in the negative electrode, and the blocking property to the solvent in the electrolytic solution. When the electrically conductive carbon particles are added to the polymer materials as the electrically conductive particles, however, lithium ions in the electrolytic solution permeate the electrically conductive carbon particles and thus the battery performance may sometimes be reduced. On the other hand, the electrically conductive particles including a metal element can improve the blocking property to the component (ions) included in the electrolytic solution, and thus the battery performance can be further improved, whereby the long-term stability of the battery can be attained.

In the present invention, the phrase "the blocking property to the component included in the electrolytic solution is excellent" means that the permeation of the components included in the electrolytic solution in the lithium ion battery is difficult. Evaluation methods of the blocking property to the component included at electrolytic solution are not particularly limited, and the evaluation can be performed by measuring a distribution of lithium elements on a cross-section of the current collector for a battery, which has been exposed to a predetermined potential environment, according to an electrochemical technique. Specifically, using an electrochemical cell, a lithium metal is used as a counter electrode and the current collector of the present invention for a battery is used as a working electrode. In such a condition, current is controlled continuously for one week so that a potential different between the working electrode and the counter electrode is kept at a desired value between +0 to +2 V, and then an existence distribution of the lithium elements on the cross-section of the current collector for a battery is measured. A penetration depth of the lithium element from the surface of the current collector for a battery is preferably 5 μm or less, more preferably 3 μm or less, and still more preferably 1 μm or less. When the current collector having the excellent blocking property to the component included in the electrolytic solution is applied to a battery, a side-reaction caused by movement of the components included in the electrolytic solution through the layer (1) to layers other than the layer (1), or an over-voltage caused by reduction of the amount of the components included in the electrolytic solution can be inhibited, whereby the deterioration of the battery is inhibited.

The electrically conductive particles including a metal element refers to a material having the electrical conductivity, having no conductivity to ions used as a charge transfer medium, and including one or more kinds of metal elements. The electrically conductive particles including a metal element are not particularly limited, and simple substances of metal element, alloy, and ceramics such as a metal oxide, a metal carbide, a metal nitride, a metal silicide, a metal boride, and a metal phosphide are preferable from the viewpoint of the long-term stability of the current collector, and simple substances of metal element are more preferable from the viewpoint of the electrical conductivity. The electrically conductive particles including a metal element may be a composite material. As the contact resistance with an active material can be reduced, a pure substance of metal element is preferable.

The metal element is not particularly limited, and materials capable of standing the applied negative electrode potential are preferable. Platinum, gold, silver, copper, tin, bismuth, zinc, iron, nickel, palladium, chromium, indium, antimony, aluminum, germanium, silicone, beryllium, tungsten, molybdenum, manganese, tantalum, titanium, neodymium, magnesium, and zirconium are preferable; and platinum, gold, silver, copper, nickel, chromium, zirconium, and titanium are more preferable, because they have the excellent durability to the applied negative electrode potential. The alloy of metal element may include SUS, nichrome, constantan, nickel silver, and the like.

As the electrically conductive particles 1 including a metal element, electrically conductive particles of ceramic can also be used. The electrically conductive particles 1 of ceramic are not particularly limited, and preferably include an oxide, carbide, nitride, silicide, boride, or phosphide of a metal selected from platinum, gold, silver, copper, tin, bismuth, zinc, iron, nickel, palladium, aluminum, chromium, indium, antimony, germanium, titanium, zirconium, silicone, beryllium, tungsten, molybdenum, manganese, tantalum, neodymium, and magnesium. Especially, it is more preferable to include at least a carbide, nitride, silicide, boride, or phosphide of a metal selected from the group consisting of gold, silver, copper, nickel, chromium, titanium, and zirconium, because of the electrical conductivity and the durability to the applied negative electrode potential. Preferable examples thereof can be exemplified by TiC, ZrC, WC, and TaC as the carbide; TiN and ZrN as the nitride; $TiSi_2$, $ZrSi_2$, $MoSi_2$, and $WSi_2$ as the silicide; $TiB_2$ and $ZrB_2$ as the boride; and NiP as the phosphide.

The shape of the electrically conductive particles 1 including a metal element is not particularly limited, and dendritic, needle-like, platy, flaky, and squamous shapes are preferable, because of the excellent electrical conductivity of the current collector.

A particle size of the electrically conductive particles including a metal element is not particularly limited, and an average particle size is preferably from 0.05 to 100 μm, more preferably from 0.1 to 75 μm, still more preferably from 0.1 to 50 μm, and particularly preferably from 0.5 to 25 μm. When the average particle size is less than 0.05 μm, the electric resistance tends to be increased due to the interface resistance of the electrically conductive particles including a metal element. On the other hand, when it is more than 100 μm, there are possibilities in which the smoothness is seriously impaired or the mechanical properties are seriously reduced. The average particle size of the electrically conductive particles can be measured by a laser diffraction particle size distribution.

The electrically conductive particles 1 including a metal element have more preferably a platy shape (platy electrically conductive particles) having an aspect ratio of 5 or more. In the present invention, the aspect ratio refers to a value of the maximum diameter/the minimum diameter of one electrically conductive particle 1. In the platy electrically conductive particles, the minimum diameter is generally called as a thickness. The aspect ratio can be obtained by observing a particulate powder with a scanning electron microscope (S-4800 manufactured by Hitachi, Ltd.) at a magnification of 30,000 to 100,000, measuring a thickness (the minimum diameter) and the maximum diameter of each of 10 particles arbitrarily selected, calculating a value of the maximum diameter/the thickness, and calculating an arithmetic average. The average thickness can also be obtained by calculating an arithmetic average of thicknesses, which are measured in the same manner above. The aspect ratio of the electrically conductive particles used in the present invention is preferably 5 or more and more preferably 10 or more. When the aspect ratio is 5 or more, electrically conductive particles are easily orientated inside the current collector, and a current collector having the excellent surface smoothness can be easily obtained. The average thickness is within a range of preferably 0.5 to 50 μm and more preferably 1 to 30 μm. When the thickness is within the range described above, the obtained current collector is secured to have the strength in addition to the surface smoothness, and can be easily handled.

As the platy electrically conductive particles 1, particles produced in a known method may be used. For example, it is possible to produce platy particles having an aspect ratio of 5 or more by treating approximately spherical particles having an aspect ratio of less than 5 using a ball mill, a roll mill, a stamp mill, or the like. The approximately sperical particles, to which the treatment described above can be subjected, can be exemplified by nickel particles (a trademark: Ni255 manufactured by Fakuda Metal Foil & Powder Co., Ltd.) or copper particles (a trademark: MAC-25K manufactured by Mitsui Mining & Smelting Co., Ltd.).

Here, the surface smoothness can be measured by using a laser microscope. The maximum height Rz (in accordance with JIS 2001) is preferably 10 μm or less and more preferably 7.5 μm or less. When the Rz value is more than 10 μm, a mass or density of an electrode active material, which will be formed, becomes uneven due to the influence of the unevenness of the current collector, and the quality of the battery may sometimes be unstable.

When the platy electrically conductive particles are used, an effect to inhibit warping of films can be exerted, because there is the layer (3) in addition to the layer (1). Such a case may include, for example, cases in which as the layer (3), an aromatic polyimide, polyamide imide, aromatic polyamide, polyphenylene ether, or polyphenylene sulfide is used, and the effect can be effectively exerted in the case of using the aromatic polyimide. Here, a degree of warping of the current collector can be evaluated by cutting a 5 cm-square from a part of the collector, absolutely drying it, and measuring a lifting distance of the current collector when it is left to stand on a horizontal plane in a low moisture environment having a dew point of −30° C. or lower. It is preferable that the current collector does not spontaneously round one or more circles, and the lifting distance is 1 cm or less when it is left to stand, and the lifting distance is more preferably 7 mm or less and most preferably 5 mm or less. When the current collector rounds one or more circles, or the lifting distance thereof is 1 cm or more, the handling may sometimes be difficult.

For the layer (1) in the current collector of the present invention for a battery, one kind of the electrically conductive particles may be used or they may be used in a combination of two or more kinds thereof.

The distribution of the electrically conductive particles 1 may be uniform or ununiform in the layer (1), and the particles distribution may be varied inside the layer. Multiple kinds of the electrically conductive particles may be used, and the distribution of the electrically conductive particles may be varied inside the layer.

A mixing ratio of the electrically conductive particles 1 to the polymer material 1 in the layer (1) is within a range of preferably the electrically conductive particles 1: the polymer material 1 of 1:99 to 99:1 by weight, more preferably the electrically conductive particles 1: the polymer material 1 of 1:99 to 50:50 by weight, a still more preferably 5:95 to 40:60 by weight. When the polymer material 1 is within the range described above, the electrical conductivity is maintained, the functions as the current collector are not impaired, the strength as the current collector is enough, and the handling is easy.

Platy inorganic particles may be added to the layer (1) in the present invention, to adjust a linear expansion coefficient to that of the layer (3) and reduce the warping. As the platy inorganic particles, any known platy inorganic particles can be used regardless of natural or synthetic particles. The platy inorganic particle may have an insulation property or may be electrically conductive. When the insulating platy inorganic particles are used, an advantage arises in which a battery is not broken by an overcurrent flowing in an in-plane direction of the current collector upon short circuit, because the electric resistance in the in-plane direction can be appropriately controlled, different from the platy electrically conductive inorganic particles.

The platy inorganic particles may include, for example, squamous or flaky mica, sericite, illite, talc, kaolinite, montmorillonite, smectite, vermiculite, platy or flaky titanium dioxide, potassium titanate, lithium titanate, boehmite, alumina, and the like. Of these, the platy or flaky talc, kaolinite, mica, titanium dioxide, and alumina are preferably, and the talc, kaolinite, and mica are most preferable. In the present invention, the platy particles also include the particles other than platy particles including the flaky particles, the squamous particles, and the like.

The platy inorganic particles may be subjected to a surface treatment with a coupling agent or the like. The mechanical strength and the battery performance of the current collector of the present invention can be improved by the surface treatment with the coupling agent or the like. The coupling agent is not particularly limited, and generally used coupling agents such as silane, titanate, or aluminate coupling agents may be used. Conventional dry or wet surface treatments may be used as the surface treatment.

Commercially available platy inorganic particles may include, as the platy insulating inorganic particles, mica such as A series (Yamaguchi Mica Co., Ltd.), B series (Yamaguchi Mica Co., Ltd.), C series (Yamaguchi Mica Co., Ltd.), SJ series (Yamaguchi Mica Co., Ltd.), L-plier series (Yamaguchi Mica Co., Ltd.), MICALET series (Yamaguchi Mica Co., Ltd.), Y series (Yamaguchi Mica Co., Ltd.), SA series (Yamaguchi Mica Co., Ltd.), EX series (Yamaguchi Mica Co., Ltd.), or CT series (Yamaguchi Mica Co., Ltd.); kaolinite such as RC-1 (Takehara Kagaku Kogyo Co., Ltd.), Glomax LL (Takehara Kagaku Kogyo Co., Ltd.), Satintone W (Takehara Kagaku Kogyo Co., Ltd.), Satintone No. 5 (Takehara Kagaku Kogyo Co., Ltd.), or NN kaolin clay (Takehara Kagaku Kogyo Co., Ltd.); talc such as MICRO ACE (Nippon Talc Co., Ltd.), NANO ACE (Nippon Talc Co., Ltd.), J/M series (Fuji Talc Industrial Co., Ltd), M/M series (Fuji Talc Industrial Co., Ltd.), R/M series (Fuji Talc Industrial Co., Ltd.), RCP series (Fuji Talc Industrial Co., Ltd.), FT series (Fuji Talc Industrial Co., Ltd.), MF series (Fuji Talc Industrial Co., Ltd.), PS series (Asada Milling Co., Ltd.), SW series (Asada Milling Co., Ltd.), or JET series (Asada Milling Co., Ltd.), and the like.

When the platy inorganic particles are blended, the platy inorganic particles are included in an amount within a range of preferably 1 to 200 parts by weight, more preferably 10 to 150 parts by weight, and most preferably 15 to 100 parts, based on 100 parts by weight of the polymer material. When the amount is within the range described above, the strength of the layer (1) is secured and it can be easily handled.

Layer (2)

The current collector of the present invention for a battery has the metal, thin film layer or the layer (2) formed from the electrically conductive material including the polymer material 2 and the electrically conductive carbon particles 2 on at least one surface of the layer (1).

Metal Thin Film Layer of Layer (2)

A method for forming the metal thin film layer of the layer (2) is not particularly limited, and it is preferably formed in a physical film formation and/or a chemical film formation. Known, industrially available methods can be applied to the physical film formation and/or the chemical film formation, and examples thereof may specifically include metal vapor deposition, metal thermal spraying, and metal plating. Of these, the metal vapor deposition can be particularly preferably applied thereto, because the electrical conductivity layer can be uniformly formed and it is easy to control the thickness.

The metal vapor deposition method may include, for example, physical vapor deposition methods (PVD methods such as a sputtering method, a vacuum deposition method, and an ion plating method) which are one of the physical film formations, and chemical vapor deposition methods (CVD methods such as a plasma CVD method) which is one of the chemical film formations, and the like. In particular, the sputtering method and the vacuum deposition method can be preferably applied thereto, because a uniform electrical conductivity layer can be easily obtained. For forming the electrical conductivity layer, either one of the physical film formation and/or the chemical film formation may be utilized, or both of them may be used, for example the chemical film formation is first utilized and then the physical film formation is utilized.

The sputtering method is a method in which a material including a pre-determined metal species or ceramic species, which is desired to be deposited as a thin film, is set as a target in a vacuum chamber; a rare gas element (sputtering gas, typically argon), which is ionised and accelerated by application and discharging of a high voltage, is brought into collision against the target or the sputtering gas ions are directly brought into collision against the target using an ion gun to hear target atoms out; and the target atoms, which are beaten out from the target surface, are accumulated on a substrate (for example, the layer (3) or the layer (1)), thereby forming a thin film. Such a sputtering method may include DC sputtering, high frequency sputtering, magnetron sputtering, ion beam sputtering, and the like, according to the method for ionizing the sputtering gas. In the present invention, any of the sputtering methods described above may be used for forming the metal thin film layer.

According to the vacuum deposition method, a material for vapor deposition, which is desired to be deposited as a thin film is evaporated or sublimated by heating in a vacuum container, and the substance is stuck to the substrate surface, thereby forming a thin film. Heating is performed by a resistance heating, electron beam heating, high frequency induction heating, or laser heating method, depending on the kind of the material for vapor deposition or the substrate.

The formation of the metal thin film layer according to such a sputtering or vacuum deposition method is performed using a batch process system or continuous process system commercial vacuum deposition device, which is generally used. Such a vacuum deposition device may be sometimes provided with a function, which can perform an additional treatment such as air ashing treatment in the same vacuum chamber. In such a case, for example, the substrate can be preferably subjected to the ashing treatment with argon or the like before the vapor deposition, because an effect capable of washing out oil adhering to the substrate can be observed if the ashing treatment is performed for about 1 to 5 minutes.

An internal stress of the metal thin film layer, formed according to the sputtering method or the vacuum deposition method, is largely dependent upon the sputtering condition or the vacuum deposition, in particular, the pressure condition of the sputtering gas in case of the sputtering. For that reason, in order to form metal thin film layer having a pre-determined film thickness, the internal stress is controlled by adjusting a pressure condition of the sputtering gas. The threshold of the pressure of the sputtering gas is varied depending on the metal species which turns out the target, but in a case where the film having a constant film thickness is formed, typically in a case where argon gas is used as the sputtering gas, when the sputtering gas pressure is increased to a certain value (threshold) or more, the internal stress in the thin film formed by the sputtering tends to become a tensile stress. It is considered that this tendency is caused because it is easy to greatly scatter the target particles (ions) due to the increased degree (probability) of collision of the target particles against the sputtering gas particles (ions) if the sputtering gas pressure is high, and thus an oblique incidence component to the substrate is increased. On the contrary, when the sputtering gas pressure is decreased, the internal stress tends to become a compressive stress. It can be considered that this tendency is caused because an average free path of the target particles (ions) are prolonged, and more target particles having a high energy are included in particles which reach the substrate if the sputtering as pressure is low, and the target particles penetrate the thin film formed by the sputtering to form a dense film.

As for the sputtering gas pressure condition as described above, for example, when a copper metal thin film layer is formed by a sputtering vapor deposition using argon gas as the sputtering gas, preferable sputtering gas pressure condition is 0.25 Pa or more, using argon gas as the sputtering gas and setting the film forming rate at 0.1 nm/sec to 10 nm/sec. When such a sputtering gas pressure condition is used, the preferable metal thin film layer such that the film has a tensile stress when the temperature thereof is returned to room temperature, can be formed. When the nickel metal thin film layer is formed in the same condition as above, the sputtering gas pressure is also preferably 0.25 Pa or more.

The metal element forming the metal thin film layer of the layer (2) is not particularly limited, and it is preferable to include at least one metal selected from the group consisting of platinum, gold, silver, copper, tin, bismuth, zinc, iron, nickel, palladium, aluminum, chromium, indium, antimony, germanium, titanium, zirconium, silicone, beryllium, tungsten, molybdenum, manganese, tantalum, neodymium, and magnesium, from the viewpoint of the electrical conductivity.

It is more preferable that the metal thin film layer, which is used as the layer (2), includes at least one metal selected from the group consisting of platinum, gold, silver, copper, iron, nickel, aluminum, chromium, titanium, and zirconium, in terms of the adhesion with the electrode, the improvement of the electrical contact, the inhibition of formation of a coating layer with a high resistance in a case of using the electrically conductive carbon particles, or the excellent adhesion between the layers. As the state of the metal forming the metal thin film layer, simple substances of metal are particularly preferable from the viewpoint of the electrical conductivity and the adhesion between the layers, but alloy including the metal as listed above may be used. Preferable alloy can be specifically exemplified by SUS, nichrome, constantan, nickel silver, and the like.

It is more preferable that the metal thin film layer, which is used as the layer (2), includes at least one compound selected from the group consisting of oxides, carbides, nitrides, silicides, borides, and phosphides of metals. It is preferable that as the metal, at least one metal selected from the group consisting of platinum, gold, silver, copper, iron, nickel, aluminum, chromium, titanium, and zirconium is included. Preferable examples thereof can be exemplifed by TiC, ZrC, WC, and TaC as the carbide; TiN and ZrN as the nitride; $TiSi_2$, $ZrSi_2$, $MoSi_2$, and $WSi_2$ as the silicide; $TiB_2$ and $ZrB_2$ as the boride; and NiP as the phosphide.

When multiple kinds of metals are used, the alloy may be used as the target, or a known method such as multi-source vapor deposition (sputtering) may be used. A metal thin film layer having a multi-layer structure may also be formed performing treatments multiple times changing a kind of the metal.

The metal thin film layer, which is used as the layer (2), may be in the state of one layer including one kind selected from the group listed above, or may be metal thin film layer including multiple layers including two or more kinds thereof.

In the present invention, the thickness of the layer (2) of the metal thin film layer is not particularly limited, and is preferably less than 1 µm, more preferably 0.001 µm or more and less than 1 µm, still more preferably 0.002 µm or more and less than 1 µm, further more preferably 0.01 µm or more and less than 1 µm, and particularly preferably 0.02 µm or more and less than 0.5 µm. When the metal thin film layer has a thickness of less than 1 µm, the film is produced in an appropriate treatment time when the metal vapor deposition method (the sputtering method, or the vacuum deposition method), which is the preferable forming method, is used, and thus the mass production can be preferably realized while the productivity is not reduced.

Electrically Conductive Material for Layer (2)

Next, the layer (2) formed from the electrically conductive material including the polymer material 2 and the electrically conductive carbon particles 2 will be explained.

The polymer material 2 in the layer (2) is not particularly limited. The polymer material 2 has preferably adhesiveness with the layer (1) and/or the layer (3), because of the excellent handling during the battery assembly. Elastomers, modified polyolefin, ethylene-vinyl acetate copolymers, polyamide, polyimide, and polyamide imide are preferable, the elastomer, modified polyolefin, and ethylene-vinyl acetate copolymer are more preferable, and the elastomer and ethylene-vinyl acetate copolymers are still more preferable, because they show the high adhesiveness with the layer (1) and the layer (3). These resins may be need alone or as a mixture of two or more kinds.

When the polymer material having the adhesiveness with the layer (2) is used, the adhesion between the layers of the current collector of the present invention for a battery is improved. Here, the term "between the layers" specifically refers to between the layer (1) and the layer (2), between the layer (2) and the layer (3), and between the layer (1) and the layer (3). The adhesion can be measured by performing a T peeling test, and it is preferably 0.05 N/mm or more, more preferably 0.1 N/mm or more, and still more preferably 0.2 N/mm or more. When the peel strength is less than 0.05 N/mm, the adhesion between the layers may not sometimes be maintained for a long period of time.

The elastomer used as the polymer material 2 is not particularly limited, and can be exemplified by thermosetting elastomers such as natural rubber, styrene-butadiene rubber, butadiene rubber, isobutylene rubber, isoprene rubber, acrylonitrile-butadiene rubber, chloroprene rubber, ethylene-propylene rubber, ethylene-propylene terpolymer, butyl rubber, acrylic rubber, chlorosulfonated polyethylene, urethane rubber, silicone rubber, and fluororubber; and thermoplastic elastomer such as styrene elastomers, olefin elastomers, ester elastomers, urethane elastomers, vinyl chloride elastomers, and aramid elastomers. Of these, the urethane rubber, polyisobutylene rubber, butyl rubber, and styrene elastomers are preferable, because they relax a stress caused by a distortion arising upon lamination, the styrene elastomers are more preferable, and especially modified styrene elastomer are particularly preferable. The modified styrene elastomer, obtained by modifying styrene elastomers such as a styrene-butadiene-styrene block copolymer (SBS), a styrene-isoprene-styrene block copolymer (SIS), a styrene-ethylene-butylene-styrene block copolymer (SEBS), a styrene-ethylene-propylene-styrene block copolymer (SEPS), a styrene-ethylene-ethylene-propylene-styrene block copolymer (SEEPS), or a styrene-butadiene-styrene block copolymer (SBBS), modified with maleic acid or amine can be used. Of these, the amine-modified SEBS is preferable because of the low water absorption. An available commercial product of the modified styrene elastomer, which can be used in the present invention, may include acid-modified SEBS (Kraton FG series manufactured by Kraton Polymers Japan Ltd.), SEEPS having terminal hydroxyl groups (SEPTON HG-252 manufactured by Kuraray Co., Ltd.), modified SEBS (TAFTEC M series, Asahi Kasei Corporation), amine modified SEBS (f-Dynaron 8630P manufactured by JSR Corporation), and the like.

The modified polyolefin used as the polymer material 2 refers to a polyolefin which is obtained by graft-polymerization of an olefin polymer compound such as polyethylene or polypropylene with an ethylenically unsaturated compound (such as a vinyl compound or an unsaturated carboxylic acid) in the presence of a radical generating agent such as an organic peroxide, in which polar functional groups having the adhesiveness are introduced into side chains of the olefin polymer compound. The modified polyolefin used in the present invention is not particularly limited, and examples thereof may include polyolefins modified with an acid such as maleic acid anhydride (acid-modified polyolefins), and the like. The available commercial product thereof can be exemplified by ADMER (manufactured by Mitsui Chemicals, Inc.), MODIC (manufactured by Mitsubishi Chemical Corporation), Melthene (manufactured by Tosoh Corporation), Auroren (manufactured by Nippon Paper Chemicals Co., Ltd.), HARDLEN series (manufactured by Toyobo Co., Ltd.), UNISTOLE P, R, or H series (manufactured by Mitsui Chemicals, Inc.), Arrow Base (manufactured by Unitika Ltd.), and the like. Of these, solution type modified polyolefins such as Auroren, UNISTOLE, and HARDLEN, and emulsion type modified polyolefins such as Arrow Base are preferable, because of easy film thinning.

The ethylene-vinyl acetate copolymer used as the polymer material 2 is not particularly limited, and known copolymers can be used. Specifically, it is suitable to use copolymers having preferably about 3 to 40% by weight and more preferably about 14 to 40% by weight of vinyl acetate units, based on the weight of the ethylene-vinyl acetate copolymer. Available commercial products of the ethylene-vinyl acetate copolymer, which can be used in the present invention, may include Suntec-EVA (Asahi Kasei Corporation), UBE polyethylene EVA (Ube-Maruzen Polyethylene Co., Ltd.) X, EVATATE (Sumitomo Chemical Co., Ltd.), Novatec EVA (Japan Polyethylene Corporation), EVAFLEX (Dupont-Mitsui Polychemicals Co., Ltd.), and the like.

The polymer material 3 may be added with another polymer compound, a silane coupling agent, a tackifier, a plasticizer, and the like, in order to improve the adhesiveness.

Next, the electrically conductive carbon particles 2 included in the layer (2) will be explained.

The electrically conductive carbon particles 2 are not particularly limited so long as they are particles of a material having the electrical conductivity, and specifically may include carbon black such as acetylene black or Ketjen black, graphite, graphene, carbon nanotube, and the like. Of these, the carbon black is particularly preferable because of the excellent electrical conductivity, and as the available commercial product, #3950 B manufactured by Mitsubishi Chemical Corporation), Black Pearls 2000 (manufactured by Cabot Japan K, K.), Printex XE2B (manufactured by Evonik Degussa Japan Co., Ltd.), Ketjen black EC-600JD (manufactured by Lion Corporation), ECP-600JD (manufactured by Lion Corporation), EC-300J (manufactured by Lion Corporation), and ECP (manufactured by Lion Corporation) can be preferably used.

It is also possible to make a condition in which the electrolyte is difficult to penetrate into voids of the current collector by subjecting the surface of the electrically conductive carbon particles 2 to a hydrophobic treatment to reduce the conformability of the electrolyte.

The content of the electrically conductive carbon particles 2 is preferably 20 parts by weight or more, more preferably 50 parts by weight or more, and still more preferably 80 parts by weight or more, based on 100 parts by weight of the polymer material 2, because of the excellent electrical conductivity per unit volume in a thickness direction of the current collector. The content of the electrically conductive carbon particles 2 is preferably 10,000 parts by weight or less and more preferably 1,000 parts by weight or less, based on 100 parts by weight of the polymer material 2, because of the excellent peel strength between the layers. In the current collector of the present invention, it is preferable to adjust the content of the electrically conductive carbon particles so that the content of the electrically conductive carbon particles in the layer (2) is higher than the content of the electrically conductive carbon particles in the layer (3).

Layer (3)

The polymer material 3 in the layer (3) is not particularly limited, and may include, for example, polyethylene, polypropylene, polystyrene, polyvinyl acetate, polyvinyl chloride, polyvinyl alcohol, polyamide, polyamide imide, polyimide, polyacetal, polycarbonate, polyphenylene ether, polyethylene terephthalate, polybutylene terephthalate, cyclic polyolefin, polyphenylene sulfide, polytetrafluorethylene, polysulfone, polyether sulfone, polyether ether ketone, silicone resin, nylon, vinylon, polyester, epoxy resin, phenoxy resin, melamine resin, and the like. Of these, polyvinyl acetate, polyamide, polyamide imide, polyimide, polycarbonate, polyethylene terephthalate, polybutylene terephthalate, cyclic polyolefin, polyphenylene sulfide, polytetrafluorethylene, polyether ether ketone, silicone, nylon, vinylon, polyethylene, polypropylene, and polyphenylene ether are preferable because they have the durability in the positive electrode potential (the stability to the equilibrium potential environment in the positive electrode). They may be used alone or as a mixture of two or more kinds.

In the present invention, the phrase "to have the durability to the positive electrode potential (the stability to the equilibrium potential environment in the positive electrode)" means to have durability to the equilibrium potential environment between the positive electrode active material and the lithium ion. In usual, it means that decomposition of a material does not occur in an environment of +4 V to +5V to the equilibrium potential between the metal lithium and the lithium ion. The durability to the positive electrode potential can be measured by an electrochemical technique. Specifically, using an electrochemical cell, a lithium metal is used as a counter electrode and the current collector of the present invention is used as a working electrode. In such a situation, when a current flowing from the counter electrode to the working electrode after one day is ½ or less of a current flowing after one minute in a condition in which the potential of the working electrode to the counter electrode is controlled to a desired potential difference between +4 V to +5 V, then it can be said to have the durability to the positive electrode potential. The current flowing from the counter electrode to the working electrode after one day is preferably ⅕, and particularly preferably ¹⁄₁₀, of the current flowing after one minute.

Among the polymer materials 3, showing the durability to the positive electrode potential, described above, the aromatic polyimide, the aliphatic polyimide, the polyamide imide, the polyamide, the polyethylene, the polypropylene, the silicone, the polyphenylene ether, the nylon, the polybutylene terephthalate, the polyphenylene sulfide, and polyether ether ketone are preferable, because they are excellent in the durability to the positive electrode potential, and further excellent in the resistance to solvents including an electrolyte solvent used in the lithium ion battery and solvents used during the electrode production. The aromatic polyimide, aliphatic polyimide, polyamide imide, polyamide, polyphenylene ether, nylon, polybutylene terephthalate, polyphenylene sulfide, and polyether ether ketone are preferable, in terms of the excellent blocking property to the solvent in the electrolytic solution. When the blocking property to the solvent in the electrolytic solution is excellent, it is possible to inhibit side-reactions caused by movement of solvated ions through the layer (3) to layers other than the layer (3) when it is applied to a bipolar battery, and thus a loss of an electrical quantity caused by charging and discharging can be reduced. Of these, the aromatic polyimide, polyamide imide, and polyamide are more preferable, and the aromatic polyimide is particularly preferable.

Known polyamides and polyamide imides can be used without any limitation, so long as they are obtained by reaction of at least one acid compound selected from dicarboxylic acids, reactive acid derivatives of dicarboxylic acid, tricarboxylic acids, and reactive acid derivatives of tricarboxylic acid, with a diamine.

The dicarboxylic acid or the reactive acid derivative thereof may include, for example, aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, cyclohexane dicarboxylic acid, and dimer acid; aromatic dicarboxylic acids such as phthalic acid, isophthalic acid, terephthalic acid, naphthalene dicarboxylic acid, oxydibenzoic acid, 4,4'-diphenylether dicarboxylic acid, 4,4'-diphenylsulfone dicarboxylic acid, and 4,4'-diphenyl dicarboxylic acid; and reactive acid derivatives thereof, and the like.

The tricarboxylic acid or the reactive acid derivative thereof may include, for example, trimellitic acid, 3,3,4'-benzophenone tricarboxylic acid, 2,3,4'-diphenyl tricarboxylic acid, 2,3,6-pyridine tricarboxylic acid, 3,4,4'-benzanilide tricarboxylic acid, 1,4,5-naphthalene tricarboxylic acid, 2'-methoxy-3,4,4'-diphenylether tricarboxylic acid, 2'-chlorobenzanilide-3,4,4'-tricarboxylic acid, and the like.

The molecular structure of the aromatic polyimide is not particularly limited, so long as it uses an aromatic tetracarboxylic acid dianhydide and an aromatic diamine. The aromatic polyimide is produced using a polyamide acid as a precursor. Any known production method of the polyamide acid can be used, and it is usually produced by dissolving the aromatic tetracarboxylic acid dianhydride and the aromatic diamine in an organic solvent in substantially equal mole amounts to each other, and stirring the aromatic tetracarboxylic acid dianhydride and the aromatic diamine in a controlled temperature condition until the polymerization thereof is completed. The solution of the polyamide acid is usually obtained in a concentration of 5 to 35 wt % and preferably 10 to 30 wt %. When the concentration is within the range described above, an appropriate molecular weight and solution viscosity are obtained.

Any known polymerization method and the combinations thereof may be used. The characteristic in the polymerization method of the polyamide acid is an addition order of monomers, and various physical properties of the obtained polyimide can be controlled by controlling the addition order of the monomers. In the present invention, accordingly the polymerization of the polyamide acid may be performed in any addition order of the monomers.

Here, the polyamide acid solution, which is a precursor of polyimide and which can be used in the present invention, will be explained.

The appropriate aromatic tetracarboxylic acid dianhydride, which can be used in the present invention, may include pryomellitic acid dianhydride, 2,3,6,7-naphthalene tetracarboxylic acid dianhydride, 3,3',4,4'-biphenyltetracarboxylic acid dianhydride, 2,3,4',4'-biphenyltetracarboxylic acid dianhydride, 1,2,5,6-naphthalene tetracarboxylic acid dianhydride, 2,2',3,3'-biphenyltetracarboxylic acid dianhydride, 3,3',4,4'-benzophenone tetracarboxylic acid dianhydride, 4,4'-oxydiphthalic acid dianhydride, 2,2-bis(3,4-dicarboxyphenyl)propane dianhydride, 3,4,9,10-perylene tetracarboxylic acid dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, 3,4'-oxydiphthalic acid dianhydride, bis(3,4-dicarboxyphenyl)sulfone dianhydride, p-phenylene bis(trimellitic acid monoester acid anhydride), ethylene bis(trimellitic acid monoester acid anhydride), bisphenol-A bis(trimellitic acid monoester acid anhydride), and analogues thereof. They may be preferably used alone or as a mixture in any ratio.

Of these aromatic tetracarboxylic acid dianhydrides, pyromellitic acid dianhydride, 3,3',4,4'-benzophenone tetracarboxylic acid dianhydride, 4,4'-oxydiphthalic acid dianhydride, 3,3',4,4'-biphenyl tetracarboxylic acid dianhydride are particularly preferable because they are industrially easily obtainable. They may be used alone, or it is possible to use them in an appropriate combination of two or more kinds.

The appropriate aromatic diamine, which can be used in the polyamide acid composition, may include 4,4'-diaminodiphenyl propane, 4,4'-diaminodiphenyl methane, benzidine, 3,3'-dichlorobenzidine, 3,3'-dimethyl benzidine, 2,2'-dimethyl benzidine, 3,3'-dimethoxybenzidine, 2,2'-dimethoxybenzidine, 4,4'-diaminodiphenyl sulfide, 3,3'-diaminodiphenyl sulfone, 4,4'-diaminodiphenyl sulfone, 4,4'-oxydianiline, 3,3'-oxydianiline, 3,4'-oxydianiline, 1,5-diaminoaphthalene, 4,4'-diaminodiphenyl diethyl silane, 4,4'-diaminodiphenyl silane, 4,4'-diaminodiphenyl ethyl phosphine oxide, 4,4'-diaminodiphenyl N-methyl amine, 4,4'-diaminodiphenyl N-phenyl amine, 1,4-diaminobenzene (p-phenylene diamine), 1,3-diaminobenzene, 1,2-diaminobenzene, bis{4-(4-aminophenoxy)phenyl}sulfone, bis{4-(4-aminophenoxy)phenyl}propane, bis{4-(3-aminophenoxy)phenyl}sulfone, 4,4'-bis(4-aminophenoxy)biphenyl, 4,4'-bis(3-aminophenoxy)biphenyl, 1,3-bis(3-aminophenoxy)benzene, 1,3-bis(4-aminophenoxy)benzene, 3,3'-diaminobenzophenone, 4,4'-diaminobenzophenone, and analogues thereof, and the like.

Of these aromatic diamines, in particular, 4,4'-diaminodiphenyl propane, 4,4'-diaminodiphenyl methane, 4,4'-diaminodiphenyl sulfone, 4,4'-oxydianiline, 3,3'-oxydianiline, 3,4'-oxydianiline, 1,5-diaminonaphthalene, 4,4'-diaminodiphenyl silane, 4,4'-diaminodiphenyl ethyl phosphine oxide, 4,4'-diaminodiphenyl N-methyl amine, 4,4'-diaminodiphenyl N-phenyl amine, 1,4-diaminobenzene (p-phenylene diamine), 1,3-diaminobenzene, 1,2-diaminobenzene, bis{4-(4-aminophenoxy)phenyl}sulfone, bis{4-(4-aminophenoxy)phenyl}propane, bis{4-(3-aminophenoxy)phenyl}sulfone, 4,4'-bis(4-aminophenoxy)biphenyl, 4,4'-bis(3-aminophenoxy)biphenyl, 1,3-bis(3-aminophenoxy)benzene, 1,3-bis(4-aminophenoxy)benzene, 3,3'-diaminobenzophenone, and 4,4'-diaminobenzophenone are industrially easily obtainable. It is preferable to use at least one kind of compound selected from those, and it is also possible to use them in an appropriate combination.

As a preferable solvent for synthesizing the polyamide acid, any solvent may be used so long as it dissolve the polyamide acid. Examples thereof may include amide solvents including N,N-dimethyl formamide, N,N-dimethyl acetamide, N-methyl-2-pyrrolidone, and the like, and the N,N-dimethyl formamide and N,N-dimethyl acetamide can be particularly preferably used.

The electrically conductive particles included in the layer (3) are not particularly limited, and materials capable of standing the applied positive electrode potential are preferable, and aluminum particles, SUS particles, electrically conductive carbon particles, silver particles, gold particles, copper particles, titanium particles, and alloy particles are preferable. Of these, the aluminum particles, SUS particles, and electrically conductive carbon particles are more preferable because they are stable in the positive electrode potential environment, and the electrically conductive carbon particles are particularly preferable.

The electrically conductive carbon particles included in the layer (3) are specifically exemplified by carbon black such as acetylene black or Ketjen black, graphite, graphene, carbon nanotube, and the like. Of these, the carbon black is particularly preferable because of the excellent electrical conductivity, and specifically, #3950 B (manufactured by Mitsubishi Chemical Corporation), Black Pearls 2000 (manufactured by Cabot Japan K. K), Printer XE 2B (manufactured by Evonik Degussa Japan Co., Ltd.), Ketjen black EC-600JD (manufactured by Lion Corporation), ECP-600JD (manufactured by Lion Corporation), EC-300J (manufactured by Lion Corporation), and ECP (manufactured by Lion Corporation) can be preferably used.

For the layer (3), one kind of the electrically conductive particles may be used or they may be used in a combination of two or more kinds.

The distribution of the electrically conductive particles may be uniform or ununiform in the layer (3), and the particle distribution may be varied inside the layer (3). Multiple kinds of the electrically conductive particles may be used, and the distribution of the electrically conductive particles may be varied inside the layer (3).

A mixing ratio of the polymer material 3 to the electrically conductive particles is preferably the polymer material 3: the electrically conductive particles of 1:99 to 99:1 by weight and more preferably 60:40 to 95:5 by weight. When the polymer material 2 is within the range described above, the electrical conductivity is maintained, the functions as the current collector are not impaired, the strength is enough, and the handling is easy.

As the electrically conductive particles included in the layer (3), electrical conductivity polymer particles and a generally called "filler-type electrically conductive resin composition," which ahs been practicalized, can also be used, in addition to the particles described above.

Filler of Electrically Conductive Material

A filler may be included in each layer formed from the polymer material in the current collector of the present invention for a battery, for the purpose of improving various properties such as slippage property, sliding property, thermal conductivity, electrical conductivity, corona resistance, loop stiffness, and curling property. Any filler may be used as the filler.

The particle size of the filler is not particularly limited, because it is determined depending on the properties to be improved and the kind of the filler added. The average particle size thereof is preferably from 0.05 to 100 µm, more preferably 0.1 to 75 µm, still more preferably 0.1 to 50 µm, and particularly preferably 0.1 to 25 µm. When the particle size is less than 0.05 µm, there is a tendency in which it is difficult to show the improvement effects. On the other hand, when it is more than 100 µm, the surface nature may possibly be significantly impaired, or the mechanical properties may possibly be significantly reduced. An addition amount of the filler is not particularly limited, and may be determined depending on the property to be improved, the particle size of the filler, and the like.

The addition amount of the filler is preferably from 0.01 to 200 parts by weight, more preferably from 0.01 to 100 parts by weight, and still more preferably from 0.02 to 80 parts by weight, based on 100 parts by weight of the polymer material. When the addition amount of the filler is less than 0.01 parts by weight, it may be sometimes difficult to show the improvement effects by the filler. On the other hand, when it is more than 200 parts by weight, the mechanical properties of the film may possibly be significantly impaired.

As a shape of the filler, non-spherical particles such as platy inorganic particles, flaky inorganic particles, and squamous particles are preferable, because a necessary amount for improving the physical properties such as the curling property can be reduced.

As the non-spherical particles, a known on-spherical inorganic substance can be used regardless of natural or synthetic particles. Examples thereof may include squamous or flaky mica, sericite, illite, talc, kaolinite, montmorillonite, smectite, vermiculite, platy or flaky titanium dioxide, potassium titanate, lithium titanate, boehmite, alumina, and the like. Of these, the talc, kaolinite, and mica are preferable, and the talc is most preferable.

The non-spherical particles have an aspect ratio (a long diameter of a non-spherical particle/a thickness of a non-spherical inorganic particle, hereinafter which is referred to as simply "aspect ratio") of preferably 5 or more and more preferably 10 or more. When the aspect ratio is less than 5, the improvement effect of the curling property may sometimes be low. The long diameter of the non-spherical particle is preferably from 0.1 to 100 µm and more preferably from 0.2 to 50 µm. When the long diameter of the non-spherical particle is within the range described above, the addition amount of parts of the non-spherical particles can be preferably reduced.

The non-spherical particles may be subjected to a surface treatment with a coupling agent, or the like. The mechanical strength and the battery performance of the current collector can be improved by the surface treatment with the coupling agent or the like. The coupling agent is not particularly limited, and generally used coupling agents such as silane, titanate, or aluminate coupling agents may be used. Conventional dry or wet surface treatments may be used as the surface treatment.

In the current collector of the present invention for a battery, the layers (1) to (3) formed from the electrically conductive material may be blended with another polymer or various additives if necessary, so far as the effects of the present invention are not impaired. For example, it is possible to add an elastomer from the viewpoint of the improvement of the softness of the current collector. The elastomer is not particularly limited, and can be exemplified by thermosetting elastomers such as natural rubber, styrene butadiene rubber, butadiene rubber, isoprene rubber, acrylonitrile butadiene rubber, chloroprene rubber, ethylene propylene rubber, ethylene propylene terpolymer, butyl rubber, acrylic rubber, chlorosulfonated polyethylene, urethane rubber, silicone rubber, and fluororubber; and thermoplastic elastomers such as styrene elastomer, olefin elastomer, ester elastomer, urethane elastomer, vinyl chloride elastomer, and aramid elastomer.

Structure of Current Collector for Battery

The current collector of the present invention for a battery is characterized by a structure in which the layer (2) is formed on at least one surface of the layer (1). Owing to this structure, the increase of the electric resistance of the current collector can be suppressed, and the collector can have the high capacity retention rate.

The current collector of the present invention for a battery has preferably a layer in which the electrically conductive carbon particles are dispersed as the electrically conductive particles, from the viewpoint of the cost and the weight reduction of current collector. On the other hand, the electrically conductive carbon particles have a tendency to let a component (ions) included in the electrolytic solution penetrate, and thus it is preferable to use the particles including the metal element when it is desired to inhibit such a penetration.

When the particles including the metal element are used in either or both of the layer (1) and the layer (3) as the electrically conductive particles, the adhesion between the layers may be insufficient or the electrical contact resistance between the electrically conductive particles between the layers may sometimes be increased, thus resulting in the significant reduction of the performance of the battery. The current collector of the present invention for a battery, accordingly, has preferably a structure in which the layer (2) is disposed on a surface of the layer (1) facing the layer (3).

In such a structure, when the layer (2) is a layer formed from the electrically conductive material including the polymer material 2 and the electrically conductive carbon particles 2, it is effective to adjust the content of the electrically conductive carbon particles so that the content of the electrically conductive carbon particles in the layer (2) is higher than the content of the electrically conductive carbon particles in the layer (3).

When the electrically conductive particles including a metal element are used for the layer (1), Li deposition may occur due to the insufficient adhesion between the layer (1) and the electrode, the insufficient electrical contact of the layer (1) surface to the negative electrode active material, and in-plane variation in the reaction of the active material, thus resulting in the reduced battery performance. The current collector of the present invention for a battery accordingly, has preferably a structure in which the metal thin film layer, or the layer (2) formed from the electrically conductive material including the polymer material 2 and the electrically conductive carbon particles 2 is disposed on the negative electrode side surface of the layer (1).

On the other hand, even if the layer (1) is disposed on the surface layer of the current collector, the problems of the Li deposition caused by the insufficient electrical contact to the negative electrode active material and the in-plane variation in the reaction of the active material, thus resulting in the reduced battery performance, can be solved by improving the tendency in which it is difficult to expose the electrically conductive particles including a metal element on the surface of the layer (1) to the surface. In a case where the electrically conductive particles including a metal element are exposed on at least one surface of the layer (1), the electrical contact to the active material is improved when the surface is located on the surface of the surface layer of the current collector and the electrically conductive particles including a metal element are exposed. Specifically, an abundance of the metal elements on the surface of the current collector surface layer formed of the layer (1) is preferably 0.5% or more in terms of an atomic ratio to the total elements and more preferably 1% or more. The larger the abundance of the metal element on the surface of the surface layer, the more excellent the electrical contact of the electrode to the active material when the current collector is applied to a battery. Here, the phrase the "abundance of the metal element on the surface of the surface layer" is a value obtained by dividing the number of atoms of the metal element by the sum of the atoms of the total elements when the surface is subjected to an elementary analysis according to an X-ray photoelectron spectroscopy (X-ray photoelectron spectroscope device (Quantum 2000 manufactured by Ulvac-Phi, Inc., X-ray source: Alkα, an output of 25 W)).

When the layer (1) is formed from the electrically conductive material including the polymer material 1 and the electrically conductive particles 1 including a metal element, the electrically conductive particles 1 including a metal element are scarcely exposed on the surface of the polymer layer of the layer (1). For that reason, it is preferable for the surface of the layer (1) that the polymer material of the surface layer is removed until the electrically conductive particles 1 are exposed. A method of removing the polymer material is not particularly limited, and can be exemplified by a corona treatment, a plasma treatment, a blast treatment, a polishing treatment, a brushing treatment, an ion beam treatment, and the like. The blast treatment, polishing treatment, and brushing treatment are more preferably because damage due to the treatment is less.

The current collector of the present invention also has another preferable mode in which the layer (1) has the following area A and area B.

First, the area A will be explained.

In the current collector of the present invention, it is preferable that the layer (1) has an area including the electrically conductive carbon particles (hereinafter sometimes referred to as the "area A1") or an area which includes the electrically conductive particles including a metal element and has a higher concentration thereof than the concentration in an area B (hereinafter sometimes referred to as the "area A2") on one surface thereof.

The area A1 is sufficient so long as it includes electrically conductive carbon particles, and the content of the electrically conductive carbon particles in the area A1 is preferably 1 to 99% by weight, more preferably from 2 to 99% by weight, still more preferably from 5 to 90% by weight, and more preferably from 20 to 85% by weight, from the viewpoint of the electrical contact of the electrode active material to the layer (1) and the strength of the area A1. The electrically conductive carbon particles may be uniformly dispersed in the area A1, may be uniformly dispersed, or may be in the state of a concentration gradient.

The area A2 refers to an area in which the concentration of the electrically conductive particles including a metal element is higher than the concentration of the electrically conductive particles including a metal element in the area B. Specifically the concentration is preferably 1.1 times or more, more preferably 1.2 times or more, and still more preferably 1.5 times or more, to the concentration of the electrically conductive particles including a metal element in the area B.

The area A2 having a higher concentration of the electrically conductive particles includes preferably the electrically conductive particles including a metal element in a weight ratio within a range of the electrically conductive particles: the polymer material of 5:95 to 99.5:0.5, from the viewpoint of the electrical conductivity.

The electrically conductive particles including a metal element used in the area A2 may be the same as or different from the electrically conductive particles including a metal element used in the area B.

The area A (A1 or A2) may be located on one surface of the layer (1) and it is preferable that the entire surface of the one surface of the layer (1) is covered with the area A from the viewpoint of the uniformization of the resistance. The area A is located preferably on the surface of the current collector, because of the excellent electrical contact of the electrode active material to the layer (1).

Subsequently, the area B will be explained.

The layer (1) has preferably the area B including the electrically conductive particles including a metal element. When the layer (1) includes the area B, the blocking property to the component (ions) included in the electrolytic solution can be improved.

In the layer (1), it is preferable that the area B exists on the other surface of the layer (1) where the area A does not exist. For example, it is preferable that the area A1 or the area A2 and the area B form a laminate. When the polymer material 1 included in the area A1 or the area A2 and the polymer material 1 included in the area B are the same kind or are compatible to each other, a clear interface of the layer may not exist.

In the area B, the content ratio of the polymer material 1 and the electrically conductive particles is preferably the polymer material 1: the electrically conductive particles including a metal element of 1:99 to 99:1 by weight, more preferably 50:50 to 99:1 by weight, still more preferably 60:40 to 98:2 by weight, and most preferably 70:30 to 95:5 by weight. When the polymer material 1 included in the content within the range described above, the electrical conductivity is maintained, the function as the current collector is not impaired, the strength is enough, and the handling is easy.

When the electrically conductive carbon particles are used in the layer (1) which is brought into contact with the negative electrode, the battery performance may sometimes be reduced due to the insufficient adhesion with the electrode and formation of the coating layer with a high resistance on the negative electrode side. The current collector of the present invention for a battery, accordingly, has preferably a structure in which the layer (2) formed from the metal thin film is disposed on the surface of the layer (1) on the negative electrode side.

One embodiment of the current collector of the present invention for a battery is exemplified by a mode in which the layer (2) is disposed between the layer (1) and the layer (3). The current collector 10 for a battery has preferably a structure in which, as shown in FIG. 1, the layer (1) formed from the electrically conductive material including the polymer material 1 and the electrically conductive particles 1; the metal thin film layer or the layer (2) formed from the electrically conductive material including the polymer material 2 and the electrically conductive carbon particles 2; and the layer (3) formed from the electrically conductive material including the polymer material 3 and the electrically conductive particles are laminated in this order.

In the embodiment in which the layer (2) formed from the metal thin film layer is disposed between the layer (1) including the polymer material 1 and the electrically conductive particles 1, and the layer (3) formed from the electrically conductive material including the polymer material 3 and the electrically conductive particles, the layer (2) formed from the metal thin film layer, existing between the layer (1) and the layer (3), improves the adhesion between the electrically conductive particles in the layer (1) and the layer (3), thus resulting in the reduced electrical contact resistance, and the formation of a film having a high resistance can be inhibited.

In addition, in the mode in which the layer (1) including the polymer material 1 and the electrically conductive particles 1, which is located on the surface, has an abundance of the metal element in the surface of the surface layer of 0.5% or more, based on the total elements in terms of the atomic ratio, in the mode in which the surface of the surface layer is in the state in which the polymer material is removed from the surface and the electrically conductive particles including a metal element are exposed, and in the mode in which the surface of the surface layer is in the state in which the polymer material is removed from the surface by subjecting to any of the corona treatment, plasma treatment, blast treatment, polishing treatment, brushing treatment, and ion beam treatment, the adhesion to the electrode (negative electrode) is improved, the good electrical contact between the current collector surface and the negative electrode active material can be maintained, and the electrical conductivity in the plane direction of the current collector surface can be improved; as a result, the in-plane variation in the reaction of the active material can also be solved.

Another embodiment of the current collector of the present invention for a battery may include a mode in which the layer (1) to the layer (3) are laminated in order of the layer (2), the layer (1), and the layer (3). The current collector 10 for a battery has a structure, as shown in FIG. 2, in which the metal thin film layer or the layer (2) formed from the electrically conductive material including the polymer material 2 and the electrically conductive carbon particles 2; the layer (1) formed from the electrically conductive material including the polymer material 1 and the electrically conductive particles 1; and the layer (3) formed from the electrically conductive material including the polymer material 3 and the electrically conductive particles are laminated in this order. In such an embodiment, the layer (2) may be further included between the layer (1) and the layer (3).

In the current collector 10 for a battery in which the layer (2) formed from the metal thin film layer is formed on the surface of the current collector and the layer (1) to the layer (3) are laminated in order of the layer (2), the layer (1), and the layer (3), as shown in FIG. 2, the adhesion to the negative electrode is improved, the good electrical contact can be maintained between the current collector surface and the negative electrode active material, and the formation of the layer having a high resistance can be inhibited, when the metal thin film layer of the layer (2) exists on the surface so that it is brought into contact with the negative electrode. Furthermore, when the layer (1) including the polymer material 1 and the electrically conductive particles 1, which is located between the layers, includes electrically conductive particles 1 including a metal element, the electrical conductivity in the plane direction of the current collector surface is improved. In addition to the improvement of the adhesion to the negative electrode by the metal thin film layer of the layer (2), and thus the in-plane variation in the reaction of the active material can be solved.

In the current collector for a battery according to the present invention, layer (2) is the metal thin film layer, or is formed from the electrically conductive material including the polymer material 2 and the electrically conductive carbon particles 2. A method of forming the current collector of the present invention for a battery will be explained below, separating each structure of the layer (2).

Method (1) of Forming Current Collector

A method for forming the current collector of the present invention in which the layer (2) formed from the electrically conductive material will be explained.

In this case, all of the layer (1) to the layer (3) are formed from the electrically conductive material including the polymer material and the electrically conductive particles. A method of forming each layer in the current collector for a battery may include, for example, the following methods. Examples may include:

(A): A method in which first, a film, which turns out the layer (3), is formed; then a layer of the electrically conductive material of the layer (2), which is dissolved or melted, is formed on the layer (3) and, if necessary, it is dried and cured; and a layer of the electrically conductive material of the layer (1), which is dissolved or melted, is formed on the layer (2) and, if necessary, it is dried and cured.

(B): A method in which first, a film, which turns out the layer (1), is formed; then a layer of the electrically conductive material of the layer (2), which is dissolved or melted, is formed on the layer (1) and, if necessary, it is dried and cured; and a layer of the electrically conductive material of the layer (3), which is dissolved or melted, is formed on the layer (2) and, if necessary, it is dried and cured.

(C): A method in which a film, which turns out the layer (3), is formed; and the electrically conductive material of the layer (1), which is dissolved or melted, and the electrically conductive material of the layer (2), which is dissolved or melted, are coated on the layer (3) by a co-extrusion method and, if necessary, it is dried and cured.

(D): A method in which first, a film, which turns out the layer (1), is formed; and the electrically conductive material of the layer (2), which is dissolved or melted, and the electrically conductive material of the layer (3), which is dissolved or melted, are coated on the layer (1) by a co-extrusion method, and if necessary, it is dried and cured.

(E): A method in which a layer of the electrically conductive material of the layer (1) is formed on one surface of a film, which turns out the layer (2), by a coating or extrusion method or the like, and if necessary, it is subjected to solvent-drying and curing; and then a layer of the electrically conductive material of the layer (3) is formed on a surface of the layer (2) on which the layer (1) is not formed by a coating or extrusion method or the like and, if necessary, it is subjected to solvent-drying and curing.

(F): A method in which an electrical conductivity film of the layer (1) formed from the electrically conductive material, a film of the layer (2) formed from the electrically conductive material, and a film of the layer (3) formed from the electrically conductive material are separately produced, and they are bonded to each other by thermocompression, or the like, to obtain a multi-layer.

It is possible to combine them. In order to improve the adhesion, it is also possible that the surface of each is appropriately subjected to the corona treatment, plasma treatment, or the like.

It is preferable that, before the film formation of each layer, the components of the polymer material (polymer components) and the electrically conductive particles are converted into a complex.

The complex of the polymer components and the electrically conductive particles can be produced in a known, industrially utilizable method, and the method is not particularly limited. The method may include, for example, the following methods:

(i) A method in which the electrically conductive particles are converted into a complex and dispersed in a state in which the polymer components are melted.

(ii) A method in which the electrically conductive particles ace converted into a complex and dispersed in a state in which the polymer components are dissolved in a solvent.

(iii) A method in which the electrically conductive particles are converted into a complex and dispersed at the same time of the polymerisation reaction of starting materials of the polymer components.

(iv) A method in which precursors of the polymer components and the electrically conductive particles are converted into a complex and dispersed.

In the formation of the current collector of the present invention, it is preferable that the electrically conductive particles are converted into a complex and dispersed in the state in which the polymer components are melted or dissolved in a solvent, from the viewpoint of the production stability. In addition, it is also possible to use a dispersant, a thickener, or the like, within a range in which physical properties of the films are not influenced, in order to sufficiently disperse the electrically conductive particles or stabilize the dispersion state. As the solvent dispersing the electrically conductive particles, solvents capable of dissolving or dispersing the polymer material used, or the starting material or precursor thereof may appropriately selected, and are not particularly limited. They can be exemplified by cyclohexane, methyl cyclohexane, ethyl cyclohexane, cyclohexanone, ethyl ether, tetrahydrofuran, xylene, pentane, hexane, octane, toluene, N,N-dimethyl formamide, N,N-dimethyl acetamide, N-methyl 2-pyrrolidone, and the like.

When the polymer material of the layer (1) includes the polymer compound (a) having an alicyclic structure, a method in which a dispersion solution of the electrically conductive material including the polymer material 1 and the electrically conductive particles 1 is coated and dried can be particularly preferably used in the method (a) described above, from the viewpoint of the production stability of the current collector. A known, industrially utilizable method can be applied to the coating, and the method is not particularly limited. The drying time and temperature can be appropriately set, and are not particularly limited. In usual, a stepwise drying, in which drying is performed first at a low temperature such as about room temperature, and subsequently at a high temperature, is preferable. When the drying temperature is too low, the drying may sometimes be insufficient, and when it is too high, the film decomposition may sometimes occur during the drying. When only the drying at a high temperature is applied, a defect in which voids are generated by rapid vaporization of a large amount of a solvent remaining may undesirably arise.

When the (b) saturated hydrocarbon polymer compound having a hydroxyl group is used as the polymer material 1, a method in which a dispersion solution of the electrically conductive material including the polymer material 1 and the electrically conductive particles 1 can be particularly preferably used in the method (A) described above, from the viewpoint of the productivity. A known, industrially utilizable method can be applied to the coating, and the method is not particularly limited. The drying time and temperature can be appropriately set, and are not particularly limited. In usual, a stepwise drying, in which drying is performed first at a low temperature such as about room temperature, and subsequently at a high temperature of 100 to 150° C., is preferable. When the drying temperature is too low, the drying may sometimes be insufficient, and when it is too high, the film decomposition may sometimes occur during the drying. When only the drying at a high temperature is applied, a defect in which voids are generated by rapid vaporization of a large amount of a solvent remaining may undesirably arise.

When the polymer material 1 includes the phenoxy resin and the epoxy resin (c), or the amine and the epoxy resin (d), the method (A) described above can be preferably used from the viewpoint of the productivity. A known, industrially utilizable method can be applied to the formation of the coating film, and the method is not particularly limited. The curing time and temperature can be appropriate set, and are not particularly limited. For example, when (d) the amine and epoxy resin are included, the curing of the polymer material 1 is promoted at a temperature of about 20 to 80° C., which is equal to or lower than a boiling point of a dispersion solvent of the electrically conductive material, for about 1 to 60 minutes, and then electrically conductive material is cured at a temperature of about 80 to 300° C., which is equal to or higher than the boiling point, over 1 to 600 minutes. When (c) the phenoxy resin and the epoxy resin are included, the curing of the polymer material 1 is promoted at a temperature of about 30 to 80° C., which is equal to or lower than a boiling point of a dispersion solvent of the electrically conductive material, for about 1 to 60 minutes, and then electrically conductive material is cured at a temperature of about 80 to 200° C., which is equal to or higher than the boiling point, over 1 to 120 minutes. When the curing time is too short, undesirably, the curing may sometimes be insufficient. On the contrary, when it is too long, the electrically conductive material, which has been once cured, may sometimes be decomposed. When the curing temperature is too low, it may be difficult to exhibit the effect of promoting the curing in a short time. On the contrary, when it is too high, the electrically conductive material, which has been once cured, may sometimes be decomposed.

As the solvent used for conversion into the complex or dispersion, a solvent capable of dissolving or dispersing the polymer component may be appropriately selected.

When the polymer compound (a) having an alicyclic structure is used, the solvent can be exemplified by cyclohexane, methyl cyclohexane, ethyl cyclohexane, cyclohexanone, ethyl ether, tetrahydrofuran (THF), xylene, pentane, hexane, octane, and toluene.

When the saturated hydrocarbon polymer compound (b) having a hydroxyl group is used, it is preferable to use polar solvents, and the solvent can be exemplified by pure water, N,N-dimethyl formamide, dimethyl sulfoxide, and the like.

When the curable ream of the material including (c) the phenoxy resin and the epoxy resin is used, or the curable resin of (d) the amine having an amine equivalent of 120 g/eq or less and the epoxy resin (provided that a blending ratio of the epoxy resin and the amine is 1.0 or more at terms of a ratio of the number of active hydrogen atoms in the amine to the number of functional groups in the epoxy resin) is used, the solvent is not particularly limited, so long as it can dissolve or disperse the epoxy resin, and it can be exemplified by acetone, methyl ethyl ketone, toluene, xylene, methyl isobutyl ketone, ethyl acetate, ethyleneglycol monomethyl ether, N,N-dimethyl formamide, N,N-dimethyl acetamide, methanol, ethanol, and cyclohexanone.

It is preferable to use a ball mill, a bead mill, a sand mill, a colloid mill, a jet mill, a roller mill, a planetary centrifugal mixer, a thin film rotating high-speed mixer, a homogenizer, or the like, for the conversion into a complex and the dispersion. A diameter of media is preferably 10 mm or less. In order to improve the handling of the complex or the solution of the complex in subsequent film formation steps, the dispersion is preferably performed so that the resulting product is in a liquid state having the fluidity by means of the method using the head mill, the ball mill, the planetary centrifugal mixer, the thin film rotating high-speed mixer, the homogenizer, or the like.

When an adhesive resin is used as the polymer material, it is preferable to use a solvent casting method. Specifically the adhesive resin is dissolved or dispersed in a solvent, which is coated on the layer (3), the layer (1), or the layer (2), and it is dried. An amount of the adhesive resin used can be reduced to a minimum requirement amount by using the solvent casting method. The solvent used for the conversion into a complex or the dispersion is not particularly limited, so long as it can dissolve or disperse the adhesive resin, and can be exemplified by cyclohexane, methyl cyclohexane, ethyl cyclohexane, decahydronaphthalene, trimethyl benzene, toluene, cyclohexanone, ethyl ether, THF, xylene, pentane, hexane, octane, xylene, acetone, methyl ethyl ketone, methyl isobutyl ketone, and cyclopentanone. They may be used as a mixture of two kinds or more.

A method of coating the solution or dispersion, of the adhesive resin is not particularly limited, and it is possible to use various methods including wire bar coater method, a roll coater method, a dye coating method, a screen printing method, and the like. The drying mode, the drying temperature, and the drying time are decided depending on the kind and the amount of the solvent used, and it is preferable to appropriately control them so that no abnormalities occur on the appearance of the coating surface of the adhesive resin during the drying, and an amount of remaining solvent is 0.2% by weight or less.

The case where the film including the aromatic polyimide and the electrically conductive carbon particles, which is one of the preferable modes of the layer (3), is formed, may include, for example, a case where polyamide acid solution in which the electrically conductive carbon particles are dispersed is formed into a polyimide film. Specifically, the polyamide acid solution in which the electrically conductive carbon particles are dispersed is coated on a substrate such as a metal drum or a metal belt by a cast-coating it to form a film; drying it at a temperature from room temperature to about 200° C. to obtain a dried, self-supporting film; fixing it on a metal frame; and heating it so that a final temperature thereof reaches about 400° C. to 600° C., thereby obtaining a polyimide film. At that time, it is necessary that the polyamide acid structure is converted into the polyimide structure by a chemical reaction. For such an imidation method, there are heating imidation, and chemical imidation using a dehydrating agent or a catalyst. Any method may be adopted. The imidation occurs more easily as the thermocuring temperature is increased, and thus the curing speed can be increased. The curing temperature is, accordingly, preferably higher, in terms of the productivity. However, when the temperature is too high, the thermal decomposition may possibly be occurred. On the other hand, when the heating temperature is too low, the proceeding of imidation is inhibited even in a chemical curing, and the time necessary for a curing step is prolonged.

The imidation time may be a time sufficient for substantial completion of the imidation and drying, and is not primarily limited. In general, it is determined within a range of about 1 to 600 seconds.

When the filler is included in either of the layer (1) to layer (3), the method of conversion into a complex and dispersion described above can be similarly applied, and the filler may be added at the time when the electrically conductive particles are converted into a complex and dispersed.

When the layer (1) to the layer (3) are formed into a film, the film formation can be performed in a known, industrially utilizable method, and the method is not particularly limited. Examples thereof may include a method in which a complex of the polymer material and the electrically conductive particles is melt-formed, a method in which a dispersion solution of a complex of the polymer material 3 and the electrically conductive particles is coated on a substrate and dried, and if necessary, cured, and the like.

As a method of coating the dispersion solution, a known method can be appropriately adopted such as a die coating method, a spraying method, roll-coating method, a rotary coating method, bar-coating method, an ink jet method, a screen printing method, a slit coating method, or the like.

A method of melt-forming may include melt-extrusion methods such as a method using a T-dye and a blow-extrusion, a calendaring method, a hot pressing method, an injection forming method, and the like.

The film formed in the method described above may be used as it is with no stretching, or may be stretched, for example, monoaxially or biaxially.

Method (2) of Forming Current Collector

Next, a method of forming the current collector of the present invention in which the layer (2) is formed from the metal thin film layer will be explained.

As the current collector in which the layer (2) is formed from the metal thin film layer, the following embodiments can be adopted: the embodiment in which, as shown in FIG. 1, the current collector 10 for a battery is formed by laminating the layer (1) formed from the electrically conductive material including the polymer material 1 and the electrically conductive particles 1, the layer (2) formed from the metal thin film layer, and the layer (3) formed from the electrically conductive material including the polymer material 3 and the electrically conductive particles in this order; and the embodiment in which, as shown in FIG. 2, the current collector 10 is formed by laminating the layer (2) formed from the metal thin film layer, the layer (1) formed from the electrically conductive material including the polymer material 1 and the electrically conductive particles 1, and the layer (3) formed from the electrically conductive material including the polymer material 3 and the electrically conductive particles in this order. In the latter embodiment, the metal thin film layer, or the layer (2) formed from the electrically conductive material including the polymer material and the electrically conductive particles may be further formed between the layer (1) formed from the electrically conductive material including the polymer material 1 and the electrically conductive particles 1 and the layer (3) formed from the electrically conductive material including the polymer material 3 and the electrically conductive particles.

In that case, it is also preferable that the components of the polymer material of the layer (1) and the layer (3), and the electrically conductive particles are converted into a complex, and an electrically conductive material is previously prepared. The production of the complex of the polymer component and the electrically conductive particles can be performed in the known, industrially utilizable method such as methods (i) to (iv) described above.

The method for forming each layer in the current collector wherein the layer (2) is formed from the metal thin film layer which is one of the preferable embodiments of the present invention are shown below.

Examples may include:

(A): A method in which first, a film, which turns out the layer (3) is formed, and then a complex of the polymer material 1 and the electrically conductive particles 1, which is dissolved or melted, is coated on the film, which turns out the layer (3), and, if necessary, it is dried and cured to form the layer (1).

(B): A method in which first, a film, which turns out the layer (1) is formed, and then a complex of the polymer material 3 and the electrically conductive particles, which is dissolved or melted, is coated on the film, which turns out the layer (1), and, if necessary, it is dried and cured to form the layer (3).

(C): A method in which the polymer material 1 and the electrically conductive particles 1 or the precursor thereof, which form the layer (1), and the polymer material 3 and the electrically conductive particles or the precursor thereof, which form the layer (3), are coated on a substrate by a co-extrusion method, it is dried, and if necessary, the precursor is reacted.

(D): A method in which a metal thin film layer is formed on one surface of the film-shaped layer (3) to provide the layer (2), and then the complex of the polymer material 1 and the electrically conductive particles 1 is formed on the layer (2) in a coating or extrusion method, and, if necessary the solvent drying is performed to provide the layer (1).

(E): A method in which a film, which turns out the layer (1), and a film, which turns out the layer (3), are separately produced, and they are bonded to each other by thermocompression bonding or the like, to obtain a multi-layer.

It is possible to appropriately combine them. In order to improve the adhesion, it is also possible to perform the corona treatment, plasma treatment, or the like.

A composite film including the layer (1) and the layer (3) is formed in a method such as the method (A), (B), (C), or (E), and then a metal thin film layer is formed on the surface of the layer (1) in the method already described, thereby obtaining the current collector of the present invention for a battery. As for the collector in which a composite film, wherein the metal thin film layer, or the layer (2) formed from the electrically conductive material including the polymer material 2 and the electrically conductive carbon particles 2 is disposed between the layer (1) and the layer (3), is formed, of course, the metal thin film layer may be similarly formed on the surface of the layer (1).

The formation of the layer (1) and the layer (3), and the like, may be performed in the same manner as described in the item "Method (1) of Forming Current Collector."

Other Layer

It is only necessary that the current collector of the present invention for a battery has the layer (1) to the layer (3) described above, and the current collector may also have further additional layers from the viewpoint of the improvement of the strength and the heat resistance, and the number of layers formed is not questioned within a range in which the electrical conductivity is not impaired.

For example, an adhesive resin layer may be used from the viewpoint of the improvement of the adhesion between the layers.

The adhesive resin in the present invention is preferably a resin capable of bonding the layer (1) to the layer (3), and it is possible to use a known adhesive polymer. Elastomers, modified polyolefins, and ethylene-vinyl acetate copolymers are preferable, because they show a high adhesiveness to the layer (1) to the layer (3), and the elastomers and ethylene-vinyl acetate copolymers are more preferable. The resins may be used alone or as a mixture of two or more kinds. The elastomer and ethylene-vinyl acetate copolymer may include examples listed in the polymer material 2 described above, and they are preferably applied in the adhesive resin layer, as similar to the above.

The adhesive resin layer may be added with another polymer compound, silane coupling agent, tackifier, or plasticizer, in order to improve the adhesiveness.

The adhesive resin layer may be added with, if necessary, electrically conductive particles or an electrical conductivity polymer to appropriately control the electric resistance in a thickness direction.

The electrically conductive particles which can be added to the adhesive resin layer are not particularly limited so long as they are particles of a material having the electrical conductivity, and, for example, particles which are used as the electrically conductive particles in the layer (1) can be similarly used.

A blending ratio of the electrically conductive particles is within a range of preferably 0 to 500 parts by weight, more preferably 0 to 150 parts by weight, and still more preferably 0 to 100 parts by weight, based on 100 parts by weight of the adhesive resin. If the electric resistance in a thickness direction can be controlled to a low level, it is not necessary to blend the adhesive resin with the electrically conductive particles, but when it is desire to control the electric resistance in the thickness direction to a lower level, it is preferable to blend with the electrically conductive particles. When the electrically conductive particles are blended, the minimum value is preferably 1 part by weight, more preferably 2 parts by weight, and still more preferably 5 parts by weight, in the blending ratio of the electrically conductive particles described above. When the electrically conductive carbon particles are blended as the electrically conductive particles, the maximum value is preferably 100 parts by weight and more preferably 40 parts by weight, in the blending ratio of the electrically conductive particles described above. On the other hand, when the electrically conductive carbon particles are blended, the minimum value is preferably 1 part by weight and more preferably 5 parts by weight, in the blending ratio described above. When the blending ratio is within the ranges described above, the strength of the bonded layer is secured, and the handling is easy.

In the formation of the layer (1) and/or the layer (3), when, as the solvent capable of dissolving or dispersing the polymer component, a solvent capable of dissolving the adhesive resin is used, if an electrically conductive material of another layer is coated on the adhesive resin to laminate, it, then the adhesive resin is dissolved in the solvent, and the electrically conductive particles flow into the adhesive layer from the other layer. When the adhesive resin has a thickness of 4 μm or less, the electrical conductivity in the adhesive resin part can be secured, even if the electrically conductive particles are not previously dispersed in the adhesive resin, and the electricity flow in a thickness direction of the laminate. When the adhesive resin has a thickness of more than 4 μm, it is preferable to add the electrically conductive particles, in order to secure the electrical conductivity in the thickness direction.

Thickness of Current Collector for Battery

The current collector of the present invention for a battery has a whole of preferably 1 to 100 μm. When the thickness is more than 100 μm, the performance such as the power density of the battery may sometimes be reduced, or the resistance in the thickness direction of the current collector may sometimes be increased, which leads to the increased internal resistance of the battery. On the other hand, when the thickness is less than 1 μm, the handling may sometimes be difficult. The whole thickness is more preferably from 1.5 to 100 μm, still more preferably from 2 to 70 μm, and particularly preferably from 2 to 50 μm, because of the excellent balance between the strength and the softness of the current collector.

The thickness structure of the layer (1) and the layer (3) in the current collector of the present invention for a battery may be appropriately controlled, considering the balance in the strength and softness, the electrical conductivity the power density and the like in the overall current collector. When the layer (2) is the metal thin film layer, the thickness thereof is preferably 10 to 500 nm and more preferably from 50 to 200 nm. When the thickness of the layer (2) is thinner than the range described above, sufficient effects cannot sometimes be obtained because the exposure of the layer (1) and/or the layer (3) to the surface is increased. On the other hand, when the thickness of the metal thin film layer is thicker than the range described above, the treatment cost is undesirably increased. In addition, a stress acting on an interface between the layer (2), and the layer (1) and/or the layer (3) is strengthened, it tends to easily peel the layer (2) off from the layer (1) and/or the layer (3).

Electric Resistance of Current Collector for Battery

The current collector of the present invention for a battery has an electric resistance, per unit area in the thickness direction, of preferably 10 $\Omega \cdot cm^2$ or less. When the resistance is more than 10 $\Omega \cdot cm^2$, the internal resistance of the battery may sometimes be increased, and the power density may sometimes be reduced, when it is used in a battery.

The current collector of the present invention for a battery has a surface resistivity of preferably 100Ω/□ or less. The resistivity is more than 100Ω/□, the internal resistance of the battery may sometimes be increased, and the power density may sometimes be reduced, when it is used in a battery.

Protective Film

In order to prevent adhesion of a foreign substance to the current collector of the present invention for a battery, or maintain the physical properties, it is possible to provide a peelable protective film on the surface of the current collector. The peelable film is not particularly limited, and a known film can be used. Examples thereof may include PET films, polytetrafluoroethylene, polyethylene, polypropylene, and the like.

Surface Treatment of Current Collector for Battery

The current collector of the present invention for a battery is preferably subjected to a surface treatment, in order to improve the adhesion to the electrode and the electrical contact. The surface treatment is not particularly limited, and may include, for example, a corona treatment, a plasma treatment, a blast treatment, and the like.

The current collector of the present invention for a battery is applicable to a thin film type or bipolar, and it is preferably used as the current collector of the bipolar battery. Specifically, it is preferable that a positive electrode active material layer (a positive electrode), which is electrically connected to the surface on the layer (3) side, is formed, and a negative electrode active material layer (a negative electrode), which is electrically connected to the other surface (the surface on the side at which the layer (1) or the layer (2) is disposed), is formed, whereby the electrode for a bipolar battery can be formed. The electrode for a bipolar battery is preferably applied to a bipolar battery having a structure in which electrolyte layers are alternatively laminated.

Concrete Structure of Battery

The structure of the positive electrode and the negative electrode are not particularly limited, and known positive electrode and negative electrode are applicable. As for the electrode, the positive electrode includes a positive electrode active material, and a negative electrode includes a negative electrode active material. The positive electrode active material and the negative electrode active material may be appropriately selected depending on the kind of a battery. For example, when the battery is a lithium secondary battery, the positive electrode active material may include Li—Co composite oxides such as $LiCoO_2$, Li—Ni composite oxides such as $LiNiO_2$, Li—Mn composite oxides such as spinel $LiMn_2O_4$, Li—Fe composite oxides such as $LiFeO_2$, and the like. In addition to those oxides, it may include phosphoric acid compounds or sulfuric acid compounds of transition metal and lithium such as $LiFePO_4$: transition metal oxides or sulfides such as $V_2O_5$, $MnO_2$, $TiS_2$, $MoS_2$, and $MoO_3$; $PbO_2$, AgO, NiOOH, and the like. In some cases, two or more positive electrode active materials may be used together.

The negative electrode active material may include carbon materials (carbon) such as crystalline carbon materials and amorphous carbon materials; and metal materials including composite oxides of lithium and a transition metal such as $Li_4Ti_5O_{12}$. It may include specifically natural graphite, artificial graphite, carbon black, active carbon, carbon fiber, coke, soft carbon, hard carbon, and the like. In some cases, two or more negative electrode active materials may be used together.

The electrode may include other components such as a conductive assistant, a ion-conductive polymer, and a supporting electrolyte. The conductive assistant may include acetylene black, carbon black, graphite, and the like. When the conductive assistant is included, the conductivity of electrons generated at the electrode is increased, whereby the battery performance can be improved. The ion-conductive polymer may include polyethylene oxide (PEO), polypropylene oxide (PPO), and the like. The supporting electrolyte may be selected depending on the kind of a battery. When the battery is a lithium battery, it may include $LiBF_4$, $LiPF_6$, $Li(SO_2CF_3)_2N$, $LiN(SO_2C_2F_5)_2$, and the like.

Blending amounts of the materials forming the electrode, such as the active material, the lithium salt, and the conductive assistant are preferably decided considering the application purpose of the battery (considering that an output is important, or an energy is important, or the like), and the ion-conductivity.

When the active material is used as a simple substance, the resulting film is brittle, and an electrode having a strength capable of withstanding use cannot be formed. For that reason, in usual, a binder resin is added thereto to secure the necessary strength. The polymer used as the binder resin may include PEO, PPO, polyvinylidene fluoride (PVDF), polyvinylidene fluoride hexafluoropropylene copolymer (PVDF-HFP), polyacrylonitrile (PAN), polymethyl acrylate (PMA), polymethyl methacrylate (PMMA)), and the like. Of these, PVDF is generally used. It is preferable that the binder is dissolved or dispersed in nonaqueous solvent or water, in terms of the easy production of the electrode. The nonaqueous solvent is not particularly limited, and examples thereof may include N-methyl-2-pyrrolidone (NMP), dimethyl formamide, dimethyl acetamide, methyl ethyl, ketone, methyl acetate, ethyl acetate, tetrahydrofuran, and the like. A dispersant or a thickener may be added thereto.

The electrolyte layer may be either of a liquid, gel, and solid layers. The solvent of the electrolyte layer includes preferably a cyclic aprotonic solvent and/or a linear aprotonic solvent. The cyclic aprotonic solvent is exemplified by cyclic carbonates, cyclic esters, cyclic sulfones, cyclic ethers, and the like. The linear aprotonic solvent is exemplified by linear carbonates, linear carboxylic acid esters, linear ethers, and the like. In addition to the compounds described above, a solvent which is generally used as a solvent of a nonaqueous electrolyte, such as acetonitrile, may be used. More specifically, dimethyl carbonate, methyl ethyl carbonate, dimethyl carbonate, dipropyl carbonate, methyl propyl carbonate, ethylene carbonate, propylene carbonate, butylene carbonate, γ-butyrolactone, 1,2-dimethoxyethane, sulfolane, dioxolane and methyl propionate may be used. The solvents may be used alone or as a mixture of two or more kinds, and it is preferable to use a solvent in which two or more kinds thereof are mixed, because it is easy to dissolve the supporting electrolyte described below, and the conductivity of lithium ions is high.

The electrolyte layer may be either of liquid, gel, and solid phases, and the electrolyte layer is preferably a gel polymer electrolyte layer or an all solid electrolyte layer, considering the safety when the battery is broken and the prevention of liquid junction. On the other hand, when considering that the battery performance is important, the electrolyte layer is preferably liquid having a high ion-conductivity. The current collector of the present invention has the blocking property to a solvent in an electrolytic solution, and thus it is preferably used when the electrolyte layer is liquid.

When the gel polymer electrolyte layer is used as the electrolyte, the fluidity of the electrolyte disappears, the outflow of the electrolyte to the current collector is suppressed, and it is possible to cut off the induction of ions between layers. The host polymer of the gel electrolyte may include PEO, PPO, polyvinylidene fluoride (PVDF), polyvinylidene fluoride hexafluoropropylene copolymer (PVDF-HFP), polyacrylonitrile (PAN), polymethyl acrylate (PMA), polymethyl methacrylate (PMMA), and the like. As the plasticizer, it is possible to use an electrolytic solution, which is usually used in a lithium ion battery.

When the all solid electrolyte layer is used as the electrolyte, the electrolyte does not flow out to the current collector because the fluidity of the electrolyte disappears, and thus it is possible to cut off the conduction of ions between layers.

The gel polymer electrolyte is produced by holding the electrolytic solution, which is usually used in a lithium ion battery, in the all solid polymer electrolyte such as PEO or PPO. If may also be produced by holding the electrolytic solution in a backbone of a polymer having no lithium ion-conductivity such as PVDF, PAN, or PMMA. A ratio of the polymer and the electrolytic solution, forming the gel polymer electrolyte, is not particularly limited, and when 100% polymer is considered as the all solid polymer electrolyte and 100% electrolytic solution is considered as the liquid electrolyte, intermediates thereof are all included in a concept of the gel polymer electrolyte. The all solid electrolyte includes all electrolytes having the Li ion-conductivity such as polymers and inorganic solid substances.

The electrolyte layer includes preferably the supporting electrolyte, in order to secure the ion-conductivity. When the battery is a lithium secondary battery, it is possible to use $LiBF_4$, $LiPF_6$, $LiN(SO_2CF_3)_2$, $LiN(SO_2C_2F_5)_2$, or a mixture thereof as the supporting electrolyte. However, the supporting electrolyte is not limited thereto. The polyalkylene oxide polymers such as PEO and PPO can, as described above, dissolve well the lithium salts such as $LiBF_4$, $LiPF_6$, $LiN(SO_2CF_3)_2$, and $LiN(SO_2C_2F_5)_2$. When a cross-linking structure is formed, the excellent mechanical strength is exhibited.

EXAMPLE

In current collectors obtained in Examples and Comparative Examples, an electric resistance per unit area in a thickness direction, a blocking property to a solvent in an electrolytic solution, a durability to a negative electrode potential (a negative electrode potential durability), a durability to a positive electrode potential (positive electrode potential durability), a capacity retention rate, a blocking property to a component (lithium element) included in an electrolytic solution, an adhesion to a negative electrode, and a rate of increase in an electric resistance per unit area in a thickness direction (confirmation of formation of a high-resistance coating film) were measured and evaluated by the following methods.

Measurement of Electric Resistance Per Unit Area in Thickness Direction

A produced current collector was cut out into a size of 15 mm-square, and gold thin films were formed on the area of 10 mm-square in the center parts of both sides of the current collector by a sputtering method. A copper foil was closely attached to each gold thin film by applying a pressure of 1 MPa. A potential V way measured when a current I was applied between the two copper foils, and a value V/I was defined as an electric resistance per unit area in a thickness direction.

Blocking Property to Solvent of Electrolytic Solution

A current collector or a film for evaluation, produced in each Example or each Comparative Example, was cut out into a circle with a diameter of 8 cm, which was used as a film sample.

In a test of the blocking property to the solvent, the following tools (each number in parentheses shows a number in FIG. 3) were used.

Teflon Block (1): A cylindrical Teflon block having a diameter of 10 cm and a height of 2 cm, which has a circular groove having a diameter of 4 cm and a depth of 1 cm on one side ("Teflon" is a registered trademark).

O-ring (2): An O-ring having an inner diameter of 4.44 cm and a thickness of 0.31 cm.

Film Weight (4): A film weight made of SUS 304, and having an inner diameter of 4 cm, an outer diameter of 10 cm, and a thickness of 0.2 mm.

A solvent permeation amount was measured according to the following procedures:

In the groove of the Teflon block (1) was put 0.5 g of a carbonate solvent (5), and the O-ring (2), the film sample (3), and the film weight (4) were stacked on the solvent in this order. A pressure was applied to between the film weight (4) and the Teflon block (1) so that the carbonate solvent (5) was not leaked from between the O-ring (2) and the film sample (3), and between the O-ring (2) and the Teflon block (1). It was turned upside down so that the film weight (4) was located downward (FIG. 3), and the total weight was measured. After that, it was allowed to stand in a 25° C. atmosphere of dry air for 2 weeks in the state shown in FIG. 3, and then the weight was measured again. A different in the weight at this time was defined as a solvent permeation amount. If the solvent permeation amount is 100 mg or less, the blocking property to the solvent in the electrolytic solution is excellent.

In this measurement, the film brought into contact with the solvent has an area of 16.6 cm².

Measurement of Durability to Negative Electrode Potential

A flat cell (manufactured by Hohsen Corp.) was used as an electrode cell. A cylindrical Li foil having a diameter of 15 mm and a thickness of 0.5 mm as a counter electrode, Celgard 2500 (made of polypropylene, manufactured by Celgard Inc.) which was cut into a diameter of 19 mm as a separator, a current collector produced in Example or Comparative Example which cut into a diameter of 30 mm as a working electrode, and a 1 mol/L of $LiPF_6$ in ethylene carbonate and diethyl carbonate mixed solution (a volume ratio 3:7, a trademark being LBG-96533, Kishida Chemical Co., Ltd.) as an electrolytic solution, were used.

The cell was produced in an argon atmosphere according to the following procedures: The counter electrode, the separator impregnated with the electrolytic solution, and the working electrode [the layer (2), or the layer (1) in the current collector in which the layer (2) was not formed on its surface faces the separator] were stacked in this order in the cell. At that time, the counter electrode and the separator were brought into contact with each other only at a circular area having a diameter of 15 mm, and the working electrode and the separator were brought into contact with each other only at a circular area having a diameter of 16 mm, so that the working electrode and the counter electrode were not brought into contact with each other. Then, the SUS 304 electrode was connected to the counter electrode and the working electrode (which are referred to as "electrode A" and "electrode B" respectively), whereby the cell was sealed so that gas did not go in and out of the cell.

The measurement was performed according to the following procedures: The cell was put in a thermostatic chamber having a temperature of 55° C., which was allowed to stand for one hour, and the electrodes A and B of the cell were connected to Multistat 1470E, manufactured by Solartron Inc. Then, while the potential difference between the electrode A and the electrode B was measured, a constant current of 20.1 µA was applied from the electrode B to the electrode A. At that time, a time until the potential difference between the electrode A and the electrode B reached 5 mV was measured. The time to reach 5 mV, measured by using a copper foil (a thickness of 20 µm), which is generally used as the current collector of the lithium ion battery, was assumed as 1, and a time to reach 5 mV using a sample for measurement was assumed as a time to reached the negative electrode potential comparing the copper foil. If the time to reach the negative electrode potential comparing the copper foil is 10 or less, it was judged that the durability to the negative electrode potential was excellent.

Measurement of Durability to Positive Electrode Potential

A cell structure and production procedures were set the same as those in the test method of "Measurement of Durability to Negative Electrode Potential" described above, except that the working electrode was provided to be opposed to the layer (3).

The measurement was performed according to the following procedures: The cell was put in a thermostatic chamber having a temperature of 55° C., which was allowed to stand for one hour, and the electrodes A and B of the cell were connected to Multistat 1470 E, manufactured by Solartron Inc. Then, it was held at a certain potential so that a potential of the electrode A to the electrode B was 4.2 V. A current a after one minute and a current b after one day were measured, and a value b/a was calculated. When the value b/a is ½ or less, it was judged that there is the durability to the positive electrode potential.

Capacity Retention Rate

1. Production of Slurry of Negative Electrode Active Material

To 95 parts by weight of artificial graphite as the negative electrode active material and 5 parts by weight of polyvinylidene fluoride (KF 9130 manufactured by Kureha Corporation) as the binder was added 95 parts by weight of N-methyl-2-pyrrolidone (manufactured by Wako Pure Chemical Industries, Ltd.), and the mixture was stirred and degased to obtain slurry of a negative electrode active material.

2. Production of Negative Electrode

The current collector produced in each Example or each Comparative Example was cut out into a circle having a diameter of 15 mm. Then, the slurry of the negative electrode active material, produced in the item 1, above, was coated on the center of a first layer on the surface of the current collector [the layer (2), or the layer (1) in the current collector in which the layer (2) as not formed on its surface] using a doctor blade to form a circle having a diameter of 13 mm, and drying the pressing were performed to obtain a negative electrode having a negative electrode active material layer.

3. Production of Slurry of Positive Electrode Active Material

To 88 parts by weight of lithium cobaltate as the positive electrode active material, 6 parts by weight of polyvinylidene fluoride (KF9130 manufactured by Kureha Corporation) as the binder, and 6 parts by weight of acetylene black as the conductive assistant was added 95 parts by weight of N-methyl-2-pyrrolidone (manufactured by Wako Pure Chemical Industries, Ltd.), and the mixture was stirred and degased to obtain slurry of a positive electrode active material.

4. Production of Positive Electrode

A 20 μm-thick aluminum foil was cut out into a circle having a diameter of 15 mm. Then, the slurry of the positive electrode active material, produced in the item 3. above, was coated on the center of the aluminum foil using a doctor blade to form a circle having a diameter of 12 mm, and drying and pressing were performed to obtain a positive electrode having a positive electrode active material layer.

5. Production of Battery

A flat cell (manufactured by Hohsen Corp.) was used as the electrode cell. Celgard 2500 (made of polypropylene, manufactured by Celgard Inc.), which was cut out into a circle having a diameter of 19 mm was used as the separator: the negative electrode, produced in the item 2. above, was used as the negative electrode; the positive electrode, produced in the item 4. above, was used as the positive electrode; and a 1 mol/L of $LiPF_6$ in ethylene carbonate and diethyl carbonate mixed solution (volume ratio 3:7, a trademark: LBG-96533, Kishida Chemical Co., Ltd.) was used as the electrolytic solution.

The production of the cell was performed in an argon atmosphere according to the following procedures: The positive electrode, the separator impregnated with the electrolytic solution, and the negative electrode were stacked in this order in the cell. At that time, the positive electrode active material was brought into contact with the separator, and the negative electrode active material layer was brought into contact with the separator. In the film for measurement, the layer (3) was not brought into contact with electrolytic solution. Then, the SUS 304 electrode was connected to the positive electrode and the negative electrode (which are referred to as "electrode A" and "electrode B" respectively), whereby the cell was sealed so that gas did not go in and out of the cell.

6. Charge/Discharge Measurement

The measurement was performed according to the following procedures: The cell was put in a thermostatic chamber having a temperature of 45° C., and it was allowed to stand for 24 hours.

The charge was performed at 45° C. for 10 hours according to a constant current and constant voltage method (CCCV, a current of 0.1 C and a voltage of 4.2 V). After that, discharge was performed until the constant current (CC, a current of 0.1 C) reached 2.5 V. This charge and discharge process, which was defined as one cycle, was repeated 5 cycles.

Next, the charge was performed at 45° C. for one hour according to the constant current and constant voltage method (CCCV, a current of 1 C and a voltage of 4.2 V). After that, the discharge was performed until the constant current (CC, a current of 1 C) reached 2.5 V. This charge and discharge process, which was defined as one cycle, was repeated 50 cycles.

Similarly, the charge and discharge was repeated 5 cycles at a current of 0.1 C, repeated 50 cycles at a current of 1 C, repeated 5 at a current of 0.1 C, and repeated 100 cycles at a current of 1 C.

Focusing on a discharge capacity at a current of 1 C, the first discharge capacity was defined as 100, and a discharge capacity retention rate was calculated as a relative value from a discharge capacity after the charge and discharge at a current of 1 C was repeated total 200 cycles. A discharge capacity retention rate of 35% or more can be evaluated as success, and a discharge capacity retention rate of 45% or more can be evaluated as good.

Blocking Property to Component Included in Electrolytic Solution

A flat cell (manufactured by Hohsen Corp.) was used as the electrode cell. A cylindrical Li foil having a diameter of 15 mm and a thickness of 0.5 mm as a counter electrode, Celgard 2500 (made of polypropylene, manufactured by Celgard Inc.) which was cut into a diameter of 19 mm as a separator, a current collector produced in Example or Comparative Example which cut into a diameter of 30 mm as a working electrode, and a 1 mol/L of $LiPF_6$ in ethylene carbonate and diethyl carbonate mixed solution (a volume ratio 3:7, a trademark being LBG-96533, Kishida Chemical Co., Ltd.) as an electrolytic solution, were used.

The cell was produced in an argon atmosphere according to the following procedures: The counter electrode, the separator impregnated with the electrolytic solution, and the working electrode (the layer (2) or the layer (1) faces the separator) were stacked in this order in the cell. At that time, the counter electrode and the separator were brought into contact with each other only at a circular area having a diameter of 15 mm, and the working electrode and the separator were brought into contact with each other only at a circular area having a diameter of 16 mm, so that the working electrode and the counter electrode were not brought into contact with each other. Then, the SUS 304 electrode was connected to the counter electrode and the working electrode (which are referred to as "electrode A" and "electrode B" respectively), whereby the cell as sealed so that gas did not go in and out of the cell.

A sample for analysis was produced according to the following procedures: The cell was put in a thermostatic chamber having a temperature of 55° C., which was allowed to stand for one hour, and the electrodes A and B of the cell were connected to Multistate 1470E, manufactured by Solartron Inc. Then, while the potential difference between the electrode A and the electrode B was measured, a constant current of 20.1 μA was continuously applied from the electrode B to the electrode A until the potential difference between the electrode A and the electrode B reached 5 mV, and the current was continuously controlled for one week so that the potential difference between the electrode A and the electrode B was maintained at 5 mV. After that, the working electrode (current collector) was taken out from the cell, and the adhering electrolytic solution was removed. Then, embedding in resin was performed, a cross-section was exposed with a microtome, a distribution of lithium element on the cross-section was observed according to a time-of-flight secondary ion mass spectroscopy using TOF.SIMS 5, manufactured by ION-TOF GmbH, and a permeation depth of the lithium element from the surface of the current collector was measured. When the permeation depth of the lithium element was 5 μm or less, it was judged that the blocking property to the component included in the electrolytic solution was excellent.

Adhesion to Negative Electrode

In the adhesion to the negative electrode, an adhesion to a negative electrode binder resin was utilised.

A PVdF solution (a trademark: KF 9130, solvent: N-methyl-2-pyrrolidone, a solid concentration of 13%, manufactured by Kureha Corporation) was coated on a first layer [the metal thin film layer of the layer (2), or the layer (1) in the current collector in which the metal thin film layer of the layer (2) was not formed on its surface] on the surface of the current collector produced in Example or Comparative Example, in a dry thickness of 10 μm, and then it was dried at 80° C. for 5 minutes and at 120° C. for 10 minutes. An aluminum tape (a trademark: AT-50 manufactured by Nitto Denko Corporation) was stuck to the surface of the formed PVdF layer, which was processed into a rectangle having a width of 20 mm, and the edge of the aluminum tape and the edge of the current collector were fixed on an attachment. The evaluation was performed by pull-inserting the both edges, and measuring a strength when the PVdF layer was peeled from the first layer in a shape of T. The pull-insertion speed, upon the peeling, was 60 mm/min, and a digital force gauge (type: DS2-20N manufactured by Imada Co., Ltd.) was used for the measurement. An adhesion strength at the copper foil/PVdF interface was defined as 100, and 80 or more in intercomparison was evaluated as good.

Rate of Increase in Electric Resistance Per Unit Area in Thickness Direction

A cell structure and production procedures were set the same as those in "Measurement of Durability to Negative Electrode Potential."

The measurement was performed according to the following procedures: The cell was put in a thermostatic chamber having a temperature of 55° C., which was allowed to stand for one hour, and the electrodes A and B of the cell were connected to Multistate 1470E, manufactured by Solartron Inc. Then, while the potential difference between the electrode A and the electrode B was measured, a constant current of 20.1 μA continuously applied from the electrode B to the electrode A. The current was continuously applied at the constant voltage even after the potential difference between the electrode A and the electrode B reached 5 mV. The application of the current was stopped at the time when the total amount of the current applied reached 2.9 C, then the cell was decomposed, the current collector was taken out, and the surface thereof was washed with diethyl carbonate. After the current collector was dried to evaporate the washing solvent, measurement of the electric resistance per unit area in a thickness direction was performed.

A case where a copper foil was used as the current collector was defined as a standard (100), and a rate of increase in an electric resistance per unit area in a thickness direction, obtained in before and after the test, was 300 or less was evaluated as success.

Synthetic Example 1

As starting materials, 3,3',4,4'-biphenyl tetracarboxylic acid dianhydride (hereinafter "BPDA"), which was a tetracarboxylic acid dianhydride, and 4,4'-oxydianiline (hereinafter "ODA"), which was a diamine, were used, and N,N-dimethyl acetamide (hereinafter "DMAc") was used as a solvent.

In a gate flask having a volume of 2000 ml were put 735 g of DMAc and 54.66 g of ODA, and the mixture was stirred to dissolve ODA, to which 78.73 g of BPDA was added, and the stirring was further continued. Separately, slurry of 30 g of DMAc and 1.61 g of BPDA was prepared. The slurry was added to the reaction solution described above while paying attention to a viscosity, and the addition and the stirring were stopped at the time when the viscosity reached 200 Pa·s, thereby obtaining a polyamide acid solution having a resin solid concentration 15%.

The obtained polyamide acid solution, Ketjen black (EC 600JD manufactured by Lion Corporation) and N,N-dimethyl formamide (hereinafter "DMF") were mixed in a weight ratio of 10:1:20, and the mixture was dispersed in ball mill using 5 mmΦ zirconia balls to obtain a dispersion. The dispersion condition was: 150 g of the batch and 500 g of the zirconia balls were used, and the dispersion was performed at the rotation speed of 600 rpm for 30 minutes.

The dispersion and the polyamide acid solution were mixed in a weight ratio of 100:183, and the mixture was stirred until it was uniform, thereby obtaining a polyamide acid solution in which the electrically conductive carbon particles were dispersed.

To 50 g of the obtained polyamide acid solution in which the electrically conductive carbon particles were dispersed were added the whole amount of a curing solvent including 2.5 g of isoquinoline, 9.52 g of acetic anhydride, and 2.5 g of DMF, and the mixture was thoroughly stirred in an ice bath. The resulting product was flow-casted on a 40 μm-aluminum foil in a final thickness of 25 μm, which was dried at 160° C. for 70 seconds. After the drying, the self-supporting film was peeled off from the aluminum foil, and then it was fixed on a metal pin frame. It was dried at 300° C. for 11 seconds, subsequently at 450° C. for one minute to perform imidation, whereby a film of layer (3) in which the carbon particles were dispersed in polyimide.

Synthetic Example 2

In 30 g of ethyl cyclohexane was dissolved 10 g of a cyclic polyolefin (a trademark: ZEONOR 1410R manufactured by Zeon Corporation), to which 10 g of a copper powder (a trademark: MF-D1, average particle size of 5.9 μm, manufactured by Mitsui Mining & Smelting Co., Ltd.) was added, and the mixture was dispersed and degased using a planetary centrifugal mixer (a product name: "Awatorine-ritaro (a registered trademark)" ARE-310 manufactured by Thinky Corporation) to obtain a dispersion of an electrically conductive material for the layer (1). The dispersion condition was: It was performed at an orbital speed of 2000 rpm for 90 seconds.

Synthetic Example 3

A dispersion of an electrically conductive material for the layer (1) was obtained in the same manner as in Synthetic Example 2, except that the copper powder (a trademark: MF-D1, an average particle size of 5.9 μm, manufactured by Mitsui Mining & Smelting Co., Ltd.) in Synthetic Example 2 was changed to a nickel powder (a trademark: Ni-255, an average particle size of 2.2 μm, manufactured by Fukuda Metal Foil & Powder Co., Ltd.).

Synthetic Example 4

A dispersion of an electrically conductive material for the layer (1) was obtained in the same manner as in Synthetic Example 2, except that the copper powder (a trademark: MF-D1, an average particle size of 5.9 μm, manufactured by Mitsui Mining & Smelting Co., Ltd.) in Synthetic Example 2 was changed to a carbonized titanium powder (TiC, a particle size of 1 to 2 μm, manufactured by Japan New Metals Co., Ltd.).

Synthetic Example 5

In 30 g of pure water was dissolved 10 g of polyvinyl alcohol (a trademark: N-type Gohsenol (a registered trademark) N-300 manufactured by Nippon Synthetic Chemical Industry Co., Ltd.), to which 10 g of a copper powder (a trademark: MF-D1, an average particle size of 5.9 μm, manufactured by Mitsui Mining & Smelting Co., Ltd.) was added, and the mixture was dispersed and degased by using a planetary centrifugal mixer (a produce name: "Awatori-neritaro (a registered trademark)" ARE-310 manufactured by Thinky Corporation) to obtain a dispersion of an electrically conductive material for the layer (1). The dispersion condition was: It was performed at an orbital speed of 2000 rpm for 90 seconds.

Example 1

Film formation was performed on the film surface of the layer (3) obtained in Synthetic Example 1 at a sputtering gas pressure of 13.5 Pa (argon gas) and under an output of 900 W for 30 seconds using a sputtering apparatus (a product name: NSP-6, manufactured by Showa Shinku Co., Ltd.) and a target of copper (a simple substance) to form a metal thin film layer of the layer (2) having a thickness of 40 nm.

The dispersion of the electrically conductive material for the layer (1), obtained in Synthetic Example 2, was uniformly flow-casted on the metal thin film layer of the layer (2) in a final total thickness of 43 μm, which was dried at 80° C. for 4 minutes, and subsequently heated at 120° C. for 4 minutes, at 180° C. for 4 minutes, and at 230° C. for 4 minutes to form a layer (1), thereby obtaining a current collector.

Comparative Example 1

The dispersion of the electrically conductive material for the layer (1), obtained in Synthetic Example 2, was uniformly flow-casted on the film surface of the layer (3), obtained in Synthetic Example 1, in a final total thickness of 43 μm, which was dried at 80° C. for 4 minutes, and subsequently heated at 120° C. for 4 minutes, at 180° C. for 4 minutes, and at 230° C. for 4 minutes to form a layer (1), thereby obtaining a current collector.

Example 2

A current collector was obtained in the same manner as in Example 1 except that the dispersion of the electrically conductive material for the layer (1) obtained in Synthetic Example 2, in Example 1, was changed to the dispersion of the electrically conductive material for the layer (1) obtained in Synthetic Example 3.

Comparative Example 2

A current collector was obtained in the same manner as in Comparative Example 1, except that the dispersion of the electrically conductive material for the layer (1) obtained in Synthetic Example 2, in Comparative Example 1, was changed to the dispersion of the electrically conductive material for the layer (1) obtained in Synthetic Example 3.

Example 3

A current collector was obtained in the same manner as in Example 1, except that the dispersion of the electrically conductive material for the layer (1) obtained in Synthetic Example 2, in Example 1, was changed to the dispersion of the electrically conductive material for the layer (1) obtained in Synthetic Example 4

Comparative Example 3

A current collector was obtained in the same manner as in Comparative Example 1 except that the dispersion of the electrically conductive material for the layer (1) obtained in Synthetic Example 2, in Comparative Example 1, was changed to the dispersion of the electrically conductive material for the layer (1) obtained in Synthetic Example 4.

Example 4

A current collector was obtained in the same manner as in Example 1, except that the dispersion of the electrically conductive material for the layer (1) obtained in Synthetic Example 1, in Example 1, was changed to the dispersion of the electrically conductive material for the layer (1) obtained in Synthetic Example 5.

Comparative Example 4

A current collector was obtained in the same manner as in Comparative Example 1, except that the dispersion of the electrically conductive material for the layer (1) obtained in Synthetic Example 2, in Comparative Example 1, was changed to the dispersion of the electrically conductive material for the layer (1) obtained in Synthetic Example 5.

Example 5

Film formation was performed on the film surface of the layer (3) obtained in Synthetic Example 1 at a sputtering gas pressure of 13.5 Pa (argon gas) and under an output of 900 W for 60 seconds, using a sputtering apparatus (a product name: NSP-6, manufactured by Showa Shinku Co., Ltd.) and a target of nickel (a simple substance) to form a metal thin film layer of the layer (2) having a thickness of 40 nm.

The dispersion of the electrically conductive material for the layer (1), obtained in Synthetic Example 2, was uniformly flow-casted on the metal thin film layer of layer (2) in a final total thickness of 43 μm, which was dried at 80° C. for 4 minutes, and subsequently heated at 120° C. for 4 minutes, at 180° C. for 4 minutes, and at 230° C. for 4 minutes to form a layer (1), thereby obtaining a current collector.

Example 6

Film formation was performed on the film surface of the layer (3) obtained in Synthetic Example 1 at a sputtering gas pressure of 15 Pa (the air) and under a 40 mA current condition for 90 seconds, using a sputtering apparatus (a product name: JFC-1600 manufactured by JEOL Ltd.) and a target of gold (a simple substance) to form a metal thin film layer of the layer (2) having a thickness of 20 nm.

The dispersion of the electrically conductive material for the layer (1), obtained in Synthetic Example 2, was uniformly flow-casted on the metal thin film layer of the layer (2) in a final total thickness of 43 μm, which was dried at 80° C. for 4 minutes, and subsequently heated at 120° C. for 4 minutes, at 180° C. for 4 minutes, and at 230° C. for 4 minutes to form a layer (1), thereby obtaining a current collector.

For the current collectors obtained in Examples 1 to 6 and Comparative Examples 1 to 4, results of measurement and evaluations of the electric resistance per unit area in a thickness direction, the surface resistivity, the test of the adhesion between layers by the T-peeling test, the measurement of the durability to the negative electrode potential, the durability to the positive electrode potential, and the capacity retention rate are shown in Table 1.

The surface resistivity, and the adhesion between the layers by the T-peeling test were measured and evaluated according to the following methods.

Measurement of Surface Resistivity

A low resistivity measuring device LORESTA-GP (MCP-T610 manufactured by Mitsubishi Chemical Analytic Co., Ltd.) was used for the measurement, and a surface resistivity was measured by pressing a 4-point probe to the surface of the layer (1) of the produced current collector.

Test of Adhesion Between Layers by T-Peeling Test

An aluminum tape (a trademark: AT-50 manufactured by Nitto Denko Corporation) was stuck to the layer (1) of the produced current collector, which was processed into a rectangle having a width of 20 mm, and the edge of the aluminum tape and the edge of the electrically conductive multilayer film were fixed on an attachment. The evaluation was performed by pull-inserting the both edges, and measuring a strength when peeling occurred in the shape of T between the aluminum tape and the layer (1), between the layer (1) and the layer (2), or between the layer (3) and the layer (2). The pull-insertion speed of the peeling was 60 mm/min, and a digital force gauge (type: DS2-20N manufactured by Imada Co., Ltd.) was used for the measurement.

TABLE 1

| | Layer (1) | | | Layer (3) | | Electric resistance per unit area in thickness direction (mΩ·cm²) | Surface resistivity (Ω/□) | T peeling strength (N/mm) | Durability of layer (1) to negative electrode potential | Durability of layer (2) to positive electrode potential (b/a) | Capacity retention rate (%) |
|---|---|---|---|---|---|---|---|---|---|---|---|
| | Polymer material 1 | Electrically conductive particles 1 | Layer (2) Metal thin film layer | Polymer material 3 | Electrically conductive particles | | | | | | |
| Example 1 | Cyclic polyolefin | Copper powder | Copper (sputtering) | Polyimide | Carbon particles | 140 | 1.8 | 0.3 | 3 | 0.02 | 44 |
| Example 2 | Cyclic polyolefin | Nickel powder | Copper (sputtering) | Polyimide | Carbon particles | 150 | 4 | 0.37 | 3 | 0.02 | 43 |
| Example 3 | Cyclic polyolefin | Titanium carbide powder | Copper (sputtering) | Polyimide | Carbon particles | 420 | 3.5 | 0.2 | 2 | 0.02 | 40 |
| Example 4 | Polyvinyl alcohol | Copper powder | Copper (sputtering) | Polyimide | Carbon particles | 150 | 4.1 | 0.3 | 3 | 0.02 | 40 |
| Example 5 | Cyclic polyolefin | Copper powder | Nickel (sputtering) | Polyimide | Carbon particles | 300 | 7 | 0.35 | 3 | 0.02 | 44 |
| Example 6 | Cyclic polyolefin | Copper powder | Gold (sputtering) | Polyimide | Carbon particles | 250 | 3.2 | 0.05 | 3 | 0.02 | 43 |
| Comparative Example 1 | Cyclic polyolefin | Copper powder | None | Polyimide | Carbon particles | 450000 | 1300 | 0.01 | 3 | 0.02 | 0.1 |
| Comparative Example 2 | Cyclic polyolefin | Nickel powder | None | Polyimide | Carbon particles | 15000 | 1100 | 0.005 | 2 | 0.02 | 0.5 |
| Comparative Example 3 | Cyclic polyolefin | Titanium carbide powder | None | Polyimide | Carbon particles | 300000 | 1100 | 0.006 | 3 | 0.02 | 0.2 |
| Comparative Example 4 | Polyvinyl alcohol | Copper powder | None | Polyimide | Carbon particles | 400000 | 1300 | 0.02 | 3 | 0.02 | 0.1 |

As shown in Table 1, in the current collectors in which the metal thin film layer of copper was formed as the layer (2) between the layer (1) and the layer (3), as in Examples 1 to 4, it was found that not only the electric resistance per unit area in the thickness direction and the surface resistance were significantly reduced, but also the adhesion between the layers was improved. In addition, in the case where the nickel or gold was used for the metal thin film layer as in Examples 5 and 8, it was found that the current collectors having the low electric resistance per unit area in the thickness direction and surface resistance and the high adhesion between the layers could be obtained, similar to Example 1. From the foregoing, it is clear that the current collector of the present indention for a battery is excellent in the electric resistance per unit area in the thickness direction, the surface resistance, and the adhesion between the layers. Furthermore, the cells using the current collectors from Examples were all good in the capacity retention rate, and thus it is clear that the durability of the battery is improved.

Synthetic Example 6

In a zirconia vessel were put 44 g of a cyclic polyolefin (a trademark: ZEONOR 141R manufactured by Zeon Corporation), 6.6 g of Ketjen black (a trademark: EC 600JD manufactured by Lion Corporation), 176 g of ethyl cyclohexane, and 450 g of 5 mmΦ zirconia balls, and the mixture was dispersed in a ball mill, thereby obtaining a dispersion of an electrically conductive material for the layer (1). The dispersion condition was: It was performed at the rotation speed of 500 rpm for 45 minutes.

Synthetic Example 7

The film obtained in Synthetic Example 1 was subjected to a surface corona treatment to obtain a film of the layer (3).

Synthetic Example 8

A mixture of polymethyl alcohol (a trademark: N-type Gohsenol (a registered trademark) N-300 manufactured by Nippon Synthetic Chemical Industry Co., Ltd.), Ketjen black (a trademark: ECP 600JD manufactured by Lion Corporation), and pure water in a weight ratio of 20:3:180 was dispersed in a ball mill, thereby obtaining a dispersion of an electrically conductive material for the layer (1). 5 mmΦ Zirconia balls were used for the dispersion, and 30 minutes was taken for the dispersion at the rotation speed of 500 rpm.

Synthetic Example 9

A mixture of a phenoxy resin (a trademark: YP-50S manufactured by Nippon Steel & Sumikin Chemical Co., Ltd., a weight average molecular weight of 50000 to 70000 and a hydroxyl equivalent of 280 to 290 g/eq), Ketjen black (a trademark: ECP 600JD manufactured by Lion Corporation), and cyclohexanone in a weight ratio of 38:3.8:140 was dispersed in a ball mill, thereby obtaining a carbon dispersion. 5 mmΦ Zirconia balls were used for the dispersion, and 30 minutes was taken for the dispersion at the rotation speed of 500 rpm.

The carbon dispersion described above, an epoxy resin (a trademark: jER 630 manufactured by Mitsubishi Chemical Corporation, a number average molecular weight of 277 and an epoxy equivalent of 90 to 105 g/eq), and 2,4,6-tris (dimethylaminomethyl)phenol (a trademark: DMP-30 manufactured by Nisshin EM Corporation) were mixed in a weight ratio of 171.8:10:2 to obtain a dispersion of an electrically conductive material for the layer (1).

Synthetic Example 10

A mixture of a phenoxy resin (YP-50S manufactured by Nippon Steel & Sumikin chemical Co., Ltd., a weight average molecular weight of 50000 to 70000 and a hydroxy equivalent of 280 to 290 g/eq), Ketjen black (a trademark: ECP 600JD manufactured by Lion Corporation), and cyclohexanone in a weight ratio of 28.5:12.1:280 was dispersed in a ball mill, thereby obtaining a carbon dispersion. 5 mmΦ Zirconia balls were used for the dispersion, and 30 minutes was taken for the dispersion at the rotation speed of 500 rpm.

The carbon dispersion described above, an epoxy resin (a trademark: jER 1004AF manufactured by Mitsubishi Chemical Corporation, a number average molecular weight of 1650 and an epoxy equivalent of 280 to 290 g/eq), and 2,4,6-tris(dimethylaminomethyl)phenol (a trademark: DMP-30 manufactured by Nisshin EM Corporation) were mixed in a weight ratio of 320.6:92.5:10 to obtain a dispersion of an electrically conductive material for the layer (1).

Synthetic Example 11

A mixture of an epoxy resin (a trademark: jER 828 manufactured by Mitsubishi Chemical Corporation, an epoxy equivalent of 184 to 194 g/eq), Ketjen black (a trademark: ECP 600JD manufactured by Lion Corporation), and xylene in a weight ratio of 29.2:3.3:67.4 was dispersed in a ball mill, thereby obtaining a carbon dispersion. 5 mmΦ Zirconia balls were used for the dispersion, and 30 minutes was taken for the dispersion at the rotation speed of 500 rpm.

The carbon dispersion described above and triethylene tetramine (TETA, an amine equivalent 24.4 g/eq) were mixed in a weight ratio of 10:1.6 to obtain a dispersion of an electrically conductive material for the layer (1).

Synthetic Example 12

Polyisobutylene (EP 400 manufactured by Kanaka Corporation), Ketjen black (EC 600JD manufactured by Lion Corporation), and toluene were mixed in a weight ratio of 9.07:1:30, and the mixture was dispersed in a ball mill using 5 mmΦ zirconia balls. The dispersion condition was: 250 g of the batch and 500 g of the zirconia balls were used, and the dispersion was performed at the rotation speed of 600 rpm for 30 minutes. Further, a curing agent (a compound obtained by adding 2 equivalents, of the total amount of hydrosilyl groups, of an α-olefin to methyl hydrogen silicone having 7.5, on average, of (—Si—O—) repeating units in the presence of a platinum catalyst, and having about 5.5, on average, of hydrosilyl groups in one molecule. The compound had an Si—H group content of 6 mmol/g) in an weight ratio of 0.93 based on the weight ratio described above; a curing retarder (Surfynol 61 manufactured by Nissin Chemical Industry Co., Ltd.) in a weight ratio of 0.017 based on the weight ratio described above; and a curing catalyst (Pt-VTS-3.0X Umicore Japan KK) in a weight ratio of 0.012 based on the weight ratio described above, were added thereto, and the mixture was stirred and degased, thereby obtaining a dispersion of an electrically conductive material for the layer (1).

Example 7

The dispersion, obtained in Synthetic Example 6, was flow-casted on the film (a thickness of 25 μm) of the layer (3), obtained in Synthetic Example 7, in a final total thickness of 43 μm using a coating apparatus (a trademark: Comma Coater (a registered trademark) manufactured by Hirano Tecseed Co., Ltd.), which was dried at 80° C. for 4 minutes, and subsequently heated at 120° C. for 4 minutes, at 180° C. for 4 minutes, and at 230° C. for 4 minutes to form the layer (1) on the layer (3), thereby obtaining a laminate film.

On the surface of the layer (1) of the obtained laminate film, film formation was performed at a sputtering gas pressure of 13.5 Pa (argon gas) under an output of 900 W using a sputtering gas pressure of 13.5 Pa (argon gas) NSP-6 manufactured by Showa Shinku Co., Ltd.) and a target of copper (a simple substance) to form a copper thin film layer of the layer (2) having a thickness of 100 nm, thereby obtaining a current collector.

On the other hand, using an aluminum foil (a thickness of 30 μm) instead of the film (the layer (3)) obtained in Synthetic Example 7, the dispersion, obtained in Synthetic Example 6, was flow-casted thereon, which was dried at 80° C. for 4 minutes, and then the aluminum foil was removed by peeling-off. Subsequently, the heating at 120° C. for 4 minutes, at 180° C. for 4 minutes, and at 230° C. for 4 minutes was performed to obtain a film for evaluation of the blocking property to the solvent in the electrolytic solution.

As for the obtained current collector, measurements of the electric resistance per unit area in the thickness direction, the durability to the negative electrode potential, the durability to the positive electrode potential the blocking property to the solvent in the electrolytic solution, and the adhesion to the negative electrode (the negative electrode binder resin), and measurement of the rate of increase in an electric resistance per unit area in a thickness direction (confirmation of formation of the high-resistance coating film) were performed. In the test of the durability to the negative electrode potential, the measurement was performed by setting the working electrode so that the separator was brought into contact with the copper thin film layer of the layer (2). In the test of the durability to the positive electrode potential, a value b/a was calculated when the working electrode was set so that the separator was brought into contact with the layer (3).

Example 8

A current collector was obtained in the same manner as in Example 7, except that the thickness of the copper foil film layer was changed to 200 nm.

Example 9

A current collector was obtained in the same manner as in Example 7, except that a vacuum-deposition apparatus (a product name: EBH-6 manufactured by ULVAC Inc.) was used instead of the sputtering apparatus to form the copper thin film layer of the layer (2).

Example 10

A current collector was obtained in the same manner as in Example 9, except that the thickness of the copper foil film layer of the layer (2) was changed to 200 nm.

Example 11

A current collector was obtained in the same manner as in Example 7, except that as the metal thin film layer of the layer (2), a 2 nm thick-chromium thin film layer as formed using a target of chromium (a simple substance), and then a 100 nm-thick copper thin film layer was formed using a target of copper (a simple substance).

Example 12

A current collector was obtained in the same manner as in Example 7, except that as the metal thin film layer of the layer (2), a 2 nm thick-nickel thin film layer was formed using a target of nickel (a simple substance), and then a 100 nm thick-copper thin film layer was formed using a target of copper (a simple substance).

Example 13

The dispersion, obtained in Synthetic Example 8, was flow-casted on the layer (3) in a final total thickness of 15 μm using a coating apparatus (a trademark: Comma Coater (a registered trademark) manufactured by Hirano Tecseed Co., Ltd.), which was heated at 30° C. for one hour and at 150° C. for 5 minutes to form the layer (1) on the layer (3), thereby obtaining a laminate film. Using the obtained laminate film, the layer (2) was formed in the same manner as in Example 7, thereby obtaining a current collector.

On the other hand, using an aluminum foil (a thickness of 30 μm) instead of the film obtained in Synthetic Example 7, the dispersion, obtained in Synthetic Example 8, was flow-casted thereon, which was dried at 30° C. for one hour, and then the aluminum foil was removed by peeling-off. Subsequently, the heating at 150° C. for 5 minutes was performed to obtain a film for evaluation of the blocking property to the solvent in the electrolytic solution.

Example 14

The dispersion obtained, in Synthetic Example 9, was flow-casted on the layer (3) in a final total thickness of 15 μm using a coating apparatus (a trademark: Comma Coater (a registered trademark) manufactured by Hirano Tecseed Co., Ltd.), which was heat-cured at 50° C. for one hour, at 150° C. for one hour, and at 180° C. for one hour to form the layer (1) on the layer (3), thereby obtaining a laminate film. Using the obtained laminate film, the layer (2) was formed in the same manner as in Example 7, thereby obtaining a current collector.

On the other hand, using a PET film (a trademark: Lumirror manufactured by Toray Industries, Inc. having a thickness of 125 μm) instead of the film obtained in Synthetic Example 7, the dispersion, obtained in Synthetic Example 9, was flow-casted thereon, which was dried at 50° C. for one hour, and then the PET film was removed by peeling-off. Subsequently, the heating at 150° C. for one hour and at 180° C. for one hour was performed to cure it, thereby obtaining a film for evaluation of the blocking property to the solvent in the electrolytic solution.

Example 15

The dispersion obtained, in Synthetic Example 10, was flow-casted on the layer (3) in a final total thickness of 15 μm using a coating apparatus (a trademark: Comma Coater (a registered trademark) manufactured by Hirano Tecseed Co., Ltd.), which was heat-cured at 50° C. for one hour, at 150° C. for one hour, and at 180° C. for one hour to form the layer (1) on the layer (3), thereby obtaining a laminate film. Using the obtained laminate film, the layer (2) was formed in the same manner as in Example 7, thereby obtaining a current collector.

On the other hand, using a PET film (a trademark: Lumirror manufactured by Toray Industries, Inc. having a thickness of 125 μm) instead of the film obtained in Synthetic Example 7, the dispersion, obtained in Synthetic Example 10, was flow-casted thereon, which was dried at 50° C. for one hour, and then the PET film was removed by peeling-off. Subsequently, the heating at 150° C. for one hour and at 180° C. for one hour was performed to cure it, thereby obtaining a film for evaluation of the blocking property to the solvent in the electrolytic solution.

Example 16

The dispersion obtained, in Synthetic Example 11, was flow-casted on the layer (3) in a final total thickness of 15 μm using a coating apparatus (a trademark: Comma Coater (a registered trademark) manufactured by Hirano Tecseed Co., Ltd.), which was heat-cured at 150° C. for 3 hours to form the layer (1) on the layer (3), thereby obtaining a laminate film. Using the obtained laminate film, the layer (2) was formed in the same manner as in Example 7, thereby obtaining a current collector.

On the other hand, using a PET film (a trademark: Lumirror manufactured by Toray Industries, Inc. having a thickness of 125 μm) instead of the film, obtained in Synthetic Example 7, the dispersion, obtained in Synthetic Example 11, was flow-casted thereon, which was dried at 50° C. for one hour, and then the PET film was removed by peeling-off. Subsequently, the heating at 150° C. for 3 hours was performed to cure it, thereby obtaining a film for evaluation of the blocking property to the solvent in the electrolytic solution.

Comparative Example 5

A current collector was obtained in the same manner as in Example 7, except that the copper thin film layer of the layer (2) was not formed.

Comparative Example 6

A current collector was obtained in the same manner as in Example 13, except that the copper thin film layer of the layer (2) was not formed.

Comparative Example 7

A current collector was obtained in the same manner as in Example 14, except that the copper thin film layer of the layer (2) was not formed.

Comparative Example 8

A current collector was obtained in the same manner as in Example 15, except that the copper thin film layer of the layer (2) was not formed.

Comparative Example 9

A current collector was obtained in the same manner as in Example 16, except that the copper thin film layer of the layer (2) was not formed.

Comparative Example 10

The dispersion, obtained in Synthetic Example 12, was flow-casted on the layer (3) in a final total thickness of 40 μm using a wire bar (Rod No. 30, a coating speed of 1 cm/second), which was dried and cured at 150° C. for 10 minutes to form the layer (2) on the layer (3), thereby obtaining a laminate film. Various physical properties were evaluated using the obtained laminate film as the current collector.

On the other hand, using Teflon (a registered trademark) instead of the film obtained in Synthetic Example 7, the dispersion, obtained in Synthetic Example 12, was flow-casted thereon, which was dried and cured at 150° C. for 10 minutes, and then Teflon was removed by peeling-off, thereby obtaining a film for evaluation of the blocking property to the solvent in the electrolytic solution.

Comparative Example 11

Using the laminate film obtained in Comparative Example 10, the layer (2) was formed in the same manner as in Example 7 to obtain a current collector.

Evaluation results of the films and current collectors obtained in Examples 7 to 16 and Comparative Examples 5 to 11 are shown in Table 2.

TABLE 2

|  | Example | | | | | | | | | |
| --- | --- | --- | --- | --- | --- | --- | --- | --- | --- | --- |
|  | 7 | 8 | 9 | 10 | 11 | 12 | 13 | 14 | 15 | 16 |
| Blocking property to solvent in electrolytic solution (mg) | 1.3 | 1.3 | 1.3 | 1.3 | 1.3 | 1.3 | 2.0 | 1.0 | 90 | 0.8 |
| Electric resistance per unit area in thickness direction (mΩ · cm$^2$) | 60 | 60 | 60 | 60 | 60 | 60 | 60 | 60 | 60 | 60 |
| Durability to negative electrode | 2 | 2 | 2 | 2 | 2 | 2 | 2 | 2 | 2 | 7 |
| Durability to positive electrode (b/a) | 0.02 | 0.02 | 0.02 | 0.02 | 0.02 | 0.02 | 0.02 | 0.02 | 0.02 | 0.02 |
| Adhesion to negative electrode | 90 | 100 | 90 | 100 | 100 | 100 | 100 | 100 | 100 | 100 |

TABLE 2-continued

| | | 200 | 150 | 200 | 150 | 150 | 200 | 200 | 200 | 200 | 200 |
|---|---|---|---|---|---|---|---|---|---|---|---|
| Rate of increase in electric resistance per unit area in thickness direction | | | | | | | | | | | |

| | | Comparative Example | | | | | | |
|---|---|---|---|---|---|---|---|---|
| | | 5 | 6 | 7 | 8 | 9 | 10 | 11 |
| Blocking property to solvent in electrolytic solution (mg) | | 1.3 | 2.0 | 1.0 | 90 | 0.8 | 4000 | 4000 |
| Electric resistance per unit area in thickness direction (mΩ · cm$^2$) | | 70 | 70 | 70 | 70 | 70 | 170 | 180 |
| Durability to negative electrode | | 2 | 2 | 2 | 2 | 7 | 6 | 6 |
| Durability to positive electrode (b/a) | | 0.02 | 0.02 | 0.02 | 0.02 | 0.02 | 0.02 | 0.02 |
| Adhesion to negative electrode | | 1 | 1 | 10 | 20 | 20 | 200 | 100 |
| Rate of increase in electric resistance per unit area in thickness direction | | 15000 | 14000 | 10000 | 10000 | 15000 | 20000 | 1000 |

As shown in Table 2, in the current collectors from Comparative Examples 5 to 11, which had no metal thin film layer of the layer (2) on the surface of the layer (1) an the side of the negative electrode, even if the polymer substrate itself had the durability to the positive electrode and the negative electrode, the high resistance coating film was formed, thus resulting in the insufficient adhesion to the negative electrode. In Comparative Example 10 in which the polymer substrate itself had no blocking property to the solvent, and in Comparative Example 11 in which the metal thin film layer was added to the surface of the substrate on the negative electrode side, the result was formation of the high resistance coating film. On the other hand, in the current collectors from Examples 7 to 16, in which the metal thin film layer of the layer (2) was formed, the adhesion to the negative electrode was improved, thus resulting in solving the problems described above. From the foregoing, it is clear that the current collector of the present invention for a battery has the stability to the equilibrium potential environment in the negative electrode and the low electric resistance. Furthermore, it was apparent that the current collector had the adhesion to the negative electrode and the formation of the high resistance coating film was suppressed therein, and thus, in the current collector of the present invention for a battery, the increase in the electric resistance is suppressed during charge and discharge.

Synthetic Example 13

In a zirconia vessel were put 40 g of a cyclic polyolefin (a trademark: ZEONOR 1410R manufactured by Zeon Corporation), 4 g of Ketjen black (a trademark: ECP 600JD manufactured by Lion Corporation) 24 g of platy talc (a trademark: SG-95 manufactured by Nippon Talc Co., Ltd.), 193 g of ethyl cyclohexane, and 450 g of 5 mmΦ zirconia balls, and the mixture was dispersed in a ball mill, thereby obtaining a dispersion at an electrically conductive material for the layer (1). The dispersion condition was: It was performed at the rotation speed of 500 rpm for 45 minutes.

Synthetic Example 14

An acid-modified polyolefin solution (a trademark: UNISTOLE (a registered trademark) H-100 manufactured by Mitsui Chemicals, Inc.) was diluted with methyl cyclohexane so that a solid concentration was 10 wt %, thereby obtaining a primer solution.

Synthetic Example 15

In a zirconia vessel were put 10 g of an ethylene-vinyl acetate copolymer (a trademark: Sumitate (a registered trademark) KA-30 manufactured by Sumitomo Chemical Co., Ltd.), 1 g of Ketjen black (a trademark: ECP600JD manufactured by Lion Corporation), 190 g of toluene, and 450 g of 5 mmΦ zirconia balls, and the mixture was dispersed in a ball mill, thereby obtaining a primer solution. The dispersion condition was performed at the rotation speed of 500 rpm for 45 minutes.

Synthetic Example 16

In a zirconia vessel were put 10 g of a modified polyolefin (a trademark: ADMER (a registered trademark) QF 500 manufactured by Mitsui Chemicals, Inc.), 10 g of Ketjen black, 1 g of Ketjen black (a trademark: ECP 600JD manufactured by Lion Corporation), 190 g of ortho-dichlorobenzene, and 450 g of 5 mmΦ zirconia balls, and the mixture was dispersed in a ball mill, thereby obtaining a primer solution. The dispersion condition was: It was performed at the rotation speed of 500 rpm for 45 minutes.

Synthetic Example 1

In 90 g of ethyl cyclohexane was dissolved 10 g of an acid-modified SEBS (a trademark: TAFTEC (a registered trademark) M1943 manufactured by Asahi Kasei Corporation) at 50° C. while they were stirred, thereby obtaining a primer solution.

Synthetic Example 18

An amine-modified SEBS primer solution was obtained in the same manner as in Synthetic Example 17, except that the acid-modified SEBS, in Synthetic Example 17, was changed to an amine-modified SEBS (a trademark: f-DYNARON (a registered trademark) 8630P manufactured by JSR Corporation).

Synthetic Example 19

In a zirconia vessel were put 20 g of an amine-modified SEBS (a trademark: f-DYNARON (a registered trademark) 8630P manufactured by JSR Corporation), 2 g of Ketjen black (a trademark: ECP 600JD manufactured by Lion Corporation), 180 g of ethyl cyclohexane, and 450 g of 5 mmΦ zirconia balls, and the mixture was dispersed in a ball mill, thereby obtaining amine-modified SEBS primer solution to which carbon was added. The dispersion condition was: It was performed at the rotation speed of 500 rpm for 45 minutes.

Example 17

One side of the monolayer film of the layer (3), obtained in Synthetic Example 1, was subjected to a corona treatment. The surface to which the corona treatment was subjected was coated with the primer solution from Synthetic Example 14 with a wire bar (Rod No. 5, a coating speed of about 3 cm/second), which was dried at 80° C. for 4 minutes, at 120° C. for 4 minutes, and at 180° C. for 4 minutes, thereby obtaining the layer (3) on which an adhesive layer was laminated. Subsequently, the dispersion, obtained in Synthetic Example 13, was coated on the adhesive layer in a dry film thickness of 18 µm, which was dried at 80° C. for 4 minutes, at 120° C. for 4 minutes, and at 180° C. for 4 minutes to form the layer (1).

Film formation was performed on the surface, on which the dispersion obtained in Synthetic Example 13 was coated, of the layer (1) in the obtained laminate film at a sputtering gas pressure of 13.5 Pa (argon gas) under an output of 900 W using a sputtering apparatus (a product name:NSP-6 manufactured by Showa Shinku Co., Ltd.) and a target of copper (a simple substance) to form a copper thin film layer of the layer (2) having a thickness of 200 nm, thereby obtaining a current collector.

As for the obtained current collector, measurement of the electric resistance per unit area in the thickness direction, the adhesion strengths of the current collector before and after the charge and discharge test, and the adhesion to the negative electrode (the negative electrode hinder resin), and measurement of the rate of increase in an electric resistance per unit area in a thickness direction (confirmation of formation of the high-resistance coating film) were performed.

The adhesion of the current collector (the adhesion between the layers on laminating) was measured and evaluated according to the following method.

Adhesion Strength Between Layers on Laminating

The produced current collector (the current collector before the charge and discharge test) and a current collector after the charge and discharge test, described below, were each cut out into a size of 2 cm×4 cm; a pressure sensitive adhesive aluminum tape having a strong adhesive strength (a trademark: AT-50 manufactured by Nitto Denko Corporation) was stuck on the copper thin film layer of the layer (2); and the aluminum tape stuck to the layer (2) and the layer (3) were pulled by using a tensile tester while the T-shape was kept in a longitudinal direction, thereby evaluating an adhesion between the layer in the current collector. A digital force gauge (type: DS2-20N manufactured by Imada Co., Ltd.) was used for the measurement. When the adhesion strength between the layers is 1.0 N/20 mm or more, then it can be said that the adhesion strength is excellent.

Current Collector after Charge and Discharge Test

1. Production of Slurry of Negative Electrode Active Material

To 95 parts by weight of artificial graphite as the negative electrode active material and 5 parts by weight of polyvinylidene fluoride (KF 9130 manufactured by Kureha Corporation) as the binder was added 95 parts by weight of N-methyl-2-pyrrolidone (manufactured by Wako Pure Chemical Industries, Ltd.), and the mixture was stirred and degased to obtain slurry of negative electrode active material.

2. Production of Negative Electrode

The first layer [the metal thin film layer of the layer (2), or the layer (1) in the current collector in which the metal thin film layer of the layer (2) was not formed on the surface thereof] on the surface of the current collector, produced in each Example or Comparative Example, was coated with the slurry of the negative electrode active material, produced in the item 1. above, using a doctor blade, which was dried and pressed to obtain a negative electrode having a negative electrode active material layer.

3. Production of Slurry of Positive Electrode Active Material

To 88 parts by weight of lithium cobaltate as the positive electrode active material, 6 parts by weight of polyvinylidene fluoride (KF 9130: manufactured by Kureha Corporation) as the binder, and 6 parts by weight of acetylene black as the conductive assistant was added 95 parts by weight of N-methyl-2-pyrrolidone (manufactured by Wako Pure Chemical Industries, Ltd.), and the mixture was stirred and degased to obtain slurry of the positive electrode active material.

4. Product of Positive Electrode

The slurry of the positive electrode active material, produced in the item 3. above, was coated on an aluminum foil having the same area as that of the negative electrode current collector and a thickness of 20 µm using a doctor blade, which was dried and pressed to obtain a positive electrode having a positive electrode active material layer.

5. Production of Battery

A battery cell was produced using the negative electrode produced in the item 2. above, a polypropylene separator (Celgard 2500 manufactured by Celgard Inc.), which was cut out into a size larger than those of the positive electrode and the negative electrode, the positive electrode produced in the item 4. above, and an electrolytic solution, which was a 1 mol/L of $LiPF_6$ ethylene carbonate and diethyl carbonate mixed solution (a volume ratio of 3:7, a trademark: LBG-96533, Kishida Chemical Co., Ltd.).

The battery cell was produced in an argon atmosphere according to the following procedures: The positive electrode, the separator impregnated with the electrolytic solution, and the negative electrode were stuck in this order in the cell. At that time, the positive electrode active material layer and the separator were brought into contact with each other, and the negative electrode active material layer and the separator were brought into contact with each other. As for the current collector, the layer (3) was not brought into contact with the electrolytic solution. Then, the positive electrode and the negative electrode were put between two SUS 304 plate electrodes (which are referred to as the "electrode A" and the "electrode B") and a pressure was applied thereto, whereby the battery cell was sealed so that gas did not go in and out of the cell.

6. Charge and Discharge Measurement

The measurement was performed according to the following procedures: The battery cell was put in a thermostatic chamber having a temperature of 45° C., and it was allowed to stand for 24 hours. The charge was performed at 45° C. for 10 hours according to a constant current and constant voltage method (CCCV, a current of 0.1 C, and a voltage of 4.2 V). After that, the discharge was performed at a constant current (CC, a current of 0.1 C) up to 2.5 V. This charge and discharge process was defined as one cycle, and the charge and discharge was repeated 5 cycles.

Then, the charge was performed at 45° C. for one hour according to the constant current and constant voltage method (CCCV, a current of 1 C and a voltage of 4.2 V). After that, the discharge was performed at a constant current (CC, a current of 1 C) up to 2.5 V. This charge and discharge process was defined as one cycle, and the charge and discharge was repeated 300 cycles.

After that, the battery cell was decomposed, the electrode was taken out, and it was washed with dimethyl carbonate and N-methyl pyrrolidone. After it was dried, the active material layer was removed to obtain the current collector after the charge and discharge test.

Example 18

A current collector was obtained in the same manner as in Example 17, except that the primer solution from Synthetic Example 15 was used instead of the primer solution from Synthetic Example 14, in Example 17, the wire bar Rod No. 12 was used instead of the wire bar Rod No. 5 in coating of the primer solution, and the drying was performed at 80° C. for 4 minutes after coating the primer. Measurement of the electric resistance per unit area in the thickness direction, the adhesion strengths of the current collector before and after the charge and discharge test, and the adhesion to the negative electrode binder resin, and measurement of the rate of the increase in the electric resistance per unit area in the thickness direction (confirmation of the formation of the high-resistance coating film) were performed.

Example 19

A current collector was obtained in the same manner as in Example 18, except that the primer solution from Synthetic Example 15, in Example 18, was changed to the primer solution from Synthetic Example 16. Measurements of the electric resistance per unit area in the thickness direction, the adhesion strengths of the current collector before and after the charge and discharge test, and the adhesion to the negative electrode (the negative electrode binder resin), and measurement of the rate of the increase in the electric resistance per unit area in the thickness direction (confirmation of the formation of the high-resistance coating film) were performed.

Example 20

A current collector was obtained in the same manner as in Example 17, except that the primer solution from Synthetic Example 14, in Example 17, was changed to the primer solution from Synthetic Example 17, and the drying was performed at 80° C. for 4 minutes after coating the primer. Measurements of the electric resistance per unit area in the thickness direction, the adhesion strengths of the current collector before and after the charge and discharge test, and the adhesion to the negative electrode (the negative electrode binder resin), and measurement of the rate of the increase in the electric resistance per unit area in the thickness direction (confirmation of the formation of the high-resistance coating film) were performed.

Example 21

A current collector was obtained in the same manner as in Example 20, except that the primer solution from Synthetic Example 17, in Example 20, was changed to the primer solution from Synthetic Example 18. Measurements of the electric resistance per unit area in the thickness direction, the adhesion strengths of the current collector before and after the charge and discharge test, and the adhesion to the negative electrode (the negative electrode binder resin), and measurement of the rate of the increase in the electric resistance per unit area in the thickness direction (confirmation of the formation of the high-resistance coating film) were performed.

Example 22

A current collector was obtained in the same manner as in Example 20, except that the primer solution from Synthetic Example 17, in Example 20, was changed to the primer solution from Synthetic Example 19. Measurements of the electric resistance per unit area in the thickness direction, the adhesion strengths of the current collector before and after the charge and discharge test, and the adhesion to the negative electrode (the negative electrode binder resin), and measurement of the rate of the increase in the electric resistance per unit area in the thickness direction (confirmation of the formation of the high-resistance coating film) were performed.

Comparative Example 12

One side of the monolayer film of the electrical conductivity polymer layer of the layer (3), obtained in Synthetic Example 1, was subjected to a corona treatment. Then, the dispersion obtained in Synthetic Example 13 was coated in a dry film thickness of 18 μm, which was dried at 80° C. for 4 minutes, at 120° C. for 4 minutes, and at 180° C. for 4 minutes to obtain a current collector. As for the current collector, measurements of the electric resistance per unit area in the thickness direction, the adhesion strengths of the current collector before and after the charge and discharge test, and the adhesion to the negative electrode (the negative electrode binder resin), and measurement of the rate of the increase in the electric resistance per unit area in the thickness direction (confirmation of the formation of the high-resistance coating film) were performed.

Measurement results of Examples 17 to 22 and Comparative Example 12 are shown in Table 3.

TABLE 3

|  | Example 17 | Example 18 | Example 19 | Example 20 | Example 21 | Example 20 | Comparative Example 12 |
|---|---|---|---|---|---|---|---|
| Electric resistance per unit area before charge and discharge test (mΩ · cm$^2$) | 180 | 200 | 200 | 190 | 200 | 150 | 110 |
| Adhesion strengths of current collector before charge and discharge test (N/20 mm) | 3 | 2 | 3 | 2.5 | 2 | 3.5 | 0.3 |
| Adhesion strengths of current collector after charge and discharge test (N/20 mm) | 3 | 2 | 3 | 2.5 | 2 | 3.5 | 0.3 |
| Adhesion to negative electrode | 100 | 100 | 100 | 100 | 100 | 100 | 1 |
| Rate of increase in the electric resistance per unit area in thickness direction | 150 | 200 | 150 | 150 | 200 | 200 | 15000 |

Although the current collector obtained in Comparative Example 12 had the low electric resistance, the adhesion between layers was poor, and thus it was difficult to handle it. On the other hand, the current collectors obtained in Examples 17 to 22 had the excellent adhesion between layers both before and after the charge and discharge test, while they maintained the electric resistance at a low level. In addition, they had the excellent adhesion to the electrode binder resin (the negative electrode), and had the excellent battery performance due to the suppression of the formation of the high resistance coating film. The current collectors obtained in Examples 17, 20, and 21 could secure the electrical conductivity on the thickness direction in spite of no addition of the carbon black to the adhesive resin.

Synthetic Example 20

In a zirconia vessel were put 10 g of an ethylene-vinyl acetate copolymer (a trademark: Sumitate (a registered trademark) KA-30 manufactured by Sumitomo Chemical Co., Ltd.), 5 g of acetylene black (a trademark: Denka Black (a registered trademark) a powdery product, manufactured by Denki Kagaku Kogyo Kabushiki Kaisha), 200 g of toluene, and 450 g of 5 mmΦ zirconia balls, and the mixture was dispersed in a ball mill to obtain a dispersion of an electrically conductive material for the layer (2). The dispersion condition was performed at the rotation speed of 500 rpm for 45 minutes.

Synthetic Example 21

A dispersion of an electrically conductive material for the layer (2) was obtained in the same manner as in Synthetic Example 20, except that 5 g of the acetylene black, in Synthetic Example 20, was changed to 10 g of acetylene black.

Synthetic Example 22

A dispersion of an electrically conductive material for the layer (2) was obtained in the same manner as in Synthetic Example 20, except that 5 g of the acetylene black, in Synthetic Example 20, was changed to 20 g of acetylene black.

Example 23

The dispersion of the electrically conductive material for the layer (2), obtained in Synthetic Example 20, was uniformly flow-casted on the surface of the film of the layer (3), obtained in Synthetic Example 1, in a final thickness of the layer (2) of 1 µm, which was dried at 80° C. for 4 minutes to form a polymer layer of the layer (2) on the film of the layer (3).

The dispersion of the electrically conductive material for the layer (1) from Synthetic Example 2 was uniformly flow-casted on the polymer layer of the layer (2) in a final total thickness of 44 µm, which was dried at 80° C. for 4 minutes and subsequently heated at 120° C. for 4 minutes, at 180° C. for 4 minutes, and at 230° C. for 4 minutes to form a polymer layer of the layer (1), whereby a film current collector in which the polymer layer of the layer (1), the polymer layer of the layer (2) and the polymer layer of the layer (3) were laminated in this order was obtained.

Comparative Example 13

The dispersion of the electrically conductive material for the layer (1) from Synthetic Example 2 was uniformly flow-casted on the surface of the film of the layer (3) from Synthetic Example 1, in a final total thickness of 43 µm, which was dried at 80° C. for 4 minutes and subsequently heated at 120° C. for 4 minutes, at 180° C. for 4 minutes, and at 230° C. for 4 minutes to form a polymer layer of the layer (1), thereby obtaining a current collector.

Example 24

A current collector was obtained in the same manner as in Example 23, except that the dispersion of the electrically conductive material for the layer (1) from Synthetic Example 2, in Example 23, was changed to the dispersion of the electrically conductive material for the layer (1) from Synthetic Example 3.

Example 25

A current collector was obtained in the same manner as in Example 24, except that the dispersion of the electrically conductive material for the layer (2) from Synthetic Example 20, in Example 24, was changed to the dispersion of the electrically conductive material for the layer (2) obtained in Synthetic Example 21.

Example 26

A current collector was obtained in the same manner as in Example 24, except that the dispersion of the electrically conductive material for the layer (2) from Synthetic Example 20, in Example 24, was changed to the dispersion of the electrically conductive material for the layer (2) obtained in Synthetic Example 22.

Comparative Example 14

A current collector was obtained in the same manner as in Comparative Example 13, except that the dispersion of the electrically conductive material for the layer (1) from Synthetic Example 2, in Comparative Example 13, was changed to the dispersion of the electrically conductive material for the layer (1) from Synthetic Example 3.

Example 27

A current collector was obtained in the same manner as in Example 23, except that the dispersion of the electrically conductive material for the layer (1) from Synthetic Example 2, in Example 23, was changed to the dispersion of the electrically conductive material for the layer (1) from Synthetic Example 4.

Comparative Example 15

A current collector was obtained in the same manner as in Comparative Example 13, except that the dispersion of the electrically conductive material for the layer (1) from Synthetic Example 2, in Comparative Example 13, was changed to the dispersion of the electrically conductive material for the layer (1) from Synthetic Example 4.

Example 28

A current collector was obtained in the same manner as in Example 23, except that the dispersion of the electrically conductive material for the layer (1) from Synthetic Example 2, in Example 23, was changed to the dispersion of the electrically conductive material for the layer (1) from Synthetic Example 5.

Comparative Example 16

A current collector was obtained in the same manner as in Comparative Example 12, except that the dispersion of the electrically conductive material for the layer (1) from Synthetic Example 2, in Comparative Example 13, was changed to the dispersion of the electrically conductive material for the layer (1) from Synthetic Example 5.

Various measurement results of the current collector produced in Examples 23 to 28 and Comparative Examples 13 to 16 are shown in Table 4. An electrical conductivity in a plane direction was measured and evaluated according to the following method.

Electrical Conductivity in Plane Direction

A low resistivity measuring device Loresta-BP (MCP-T610 manufactured by Mitsubishi Analytech Co., Ltd.) was used for the measurement, and a surface resistivity was measured by pressing an LSP probe (MCP-TPLSP manufactured by Mitsubishi Chemical Analytech Co., Ltd.) to the surface of the layer (3) of the produced current collector.

TABLE 4

|  | Electric resistance per unit area in thickness direction (mΩ·cm$^2$) | Electrical conductivity in plane direction (Ω/□) | Blocking property to solvent to electrolytic solution (mg) | Durability to negative electrode potential | Durability to positive electrode potential | Blocking property to component included in electrolytic solution (μm) | Capacity retention rate (%) |
|---|---|---|---|---|---|---|---|
| Example 23 | 2000 | 700 | 0.7 | 3 | 0.03 | 1 or less | 40 |
| Example 24 | 1550 | 700 | 0.7 | 3 | 0.03 | 1 or less | 40 |
| Example 25 | 700 | 600 | 0.7 | 3 | 0.02 | 1 or less | 40 |
| Example 26 | 550 | 500 | 0.7 | 3 | 0.02 | 1 or less | 40 |
| Example 27 | 2000 | 700 | 0.7 | 3 | 0.02 | 1 or less | 40 |
| Example 28 | 2000 | 700 | 2 | 3 | 0.02 | 1 or less | 40 |
| Comparative Example 13 | 450000 | 1300 | 0.7 | 3 | 0.02 | 1 or less | 10 |
| Comparative Example 14 | 15000 | 1100 | 0.7 | 3 | 0.02 | 1 or less | 5 |
| Comparative Example 15 | 300000 | 1100 | 0.7 | 3 | 0.02 | 1 or less | 5 |
| Comparative Example 16 | 400000 | 1300 | 2 | 3 | 0.02 | 1 or less | 10 |

As shown in Table 4, the current collectors having no polymer layer of the layer (2) as those from Comparative Examples 13 to 16, has the blocking property to the electrolytic solution, the blocking property to the component (ions) included in the electrolytic solution, the stability to the equilibrium potential environment in the negative electrode, the stability to equilibrium potential environment in the positive electrode, and the high electrical conductivity in the plane direction, but their electric resistance per unit area in a thickness direction was high. In addition, the capacity retention rate was very low.

On the other hand, the current collectors in which the polymer layer of the layer (2) was formed between the polymer layer of the layer (1) and the polymer layer of the layer (3), as those from Examples 23 to 28, had the blocking property to the electrolytic solution, the blocking property to the component (ions) included in the electrolytic solution, the stability to the equilibrium potential environment in the negative electrode, and stability to equilibrium potential environment in the positive electrode, and are excellent in all of the electrical conductivity in the plane direction, the electric resistance per unit area in a thickness direction, and the capacity retention rate.

Synthetic Example 23

In 30 g of ethyl cyclohexane was dissolved 10 g of a cyclic polyolefin (a trademark: ZEONOR 1410R manufactured by Zeon Corporation), to which 10 g of a nickel powder (a trademark: Ni-255, an average particle size of 2.2 μm, manufactured by Fukuda Metal Foil & Powder Co., Ltd.) was added, and the mixture was dispersed and degased using a planetary centrifugal mixer (a product name: "Awatorineritaro (a registered trademark)" ARE-310 manufactured by Thinky Corporation) to obtain a dispersion. The dispersion condition was: It was performed at an orbital speed of 2000 rpm for 90 seconds.

Synthetic Example 24

In 180 g of pure water was dissolved 20 g of polyvinyl alcohol (a trademark: N-type Gohsenol (a registered trademark) N-300 manufactured by Nippon Synthetic Chemical Industry Co., Ltd.), to which 20 g of a nickel powder (a trademark: Ni-255, an average particle size of 2.2 μm, manufactured by Fukuda Metal Foil & Powder Co., Ltd.) was added, and the mixture was dispersed and degased using a planetary centrifugal mixer (a product name: "Awatorineritaro (a registered trademark)" ARE-310 manufactured by Thinky Corporation) to obtain a dispersion of an electrically conductive material for the layer (1). The dispersion condition was: It was performed at an orbital speed of 2000 rpm for 90 seconds.

Synthetic Example 25

In 140 g of cyclohexanone was dissolved 15 g of a phenoxy resin (a trademark: YP-50S manufactured by Nippon Steel & Sumikin Chemical Co., Ltd., a weight average molecular weight of 500000 to 700000 and a hydroxyl equivalent of 280 to 290 g/eq), to which 15 g of a nickel powder (a trademark: Ni-255, an average particle size of 2.2 μm, manufactured by Fukuda Metal Foil & Powder Co., Ltd.) was added, and the mixture was dispersed and degased using a planetary centrifugal mixer (a produce name: "Awatorineritaro (a registered trademark)" ARE-310 manufactured by Thinky Corporation) to obtain a dispersion. The dispersion condition was: It was performed at an orbital speed of 2000 rpm for 90 seconds.

The dispersion, an epoxy resin (a trademark: jER630 manufactured by Mitsubishi Chemical Corporation, a number average molecular weight of 277 and an epoxy group equivalent of 90 to 105 g/eq), and 2,4,6-tris(dimethyl aminomethyl)phenol (a trademark: DMP-30 manufactured by Nisshin EM Corporation) were mixed in a weight ratio of 320.7:10:1 to obtain a dispersion of an electrically conductive material for the layer (1).

Synthetic Example 26

In 280 g of cyclohexanone was dissolved 25 g of a phenoxy resin (a trademark: YP-50S manufactured by Nippon Steel & Sumikin Chemical Co., Ltd., a weight average molecular weight of 50,000 to 70,000 and a hydroxyl equivalent of 280 to 290 g/eq), to which 25 g of a nickel powder (a trademark: Ni-255, an average particle size of 2.2 μm, manufactured by Fukuda Metal Foil & Powder Co., Ltd.) was added, and the mixture was dispersed and degased using a planetary centrifugal mixer (a product name: "Awatorineritaro (a registered trademark)" ARE-310 manufactured by Thinky Corporation) to obtain a dispersion. The dispersion condition was: it was performed at an orbital speed of 2000 rpm for 90 seconds.

The dispersion, an epoxy resin (a trademark: jER 1004AF manufactured by Mitsubishi Chemical Corporation, a number average molecular weight of 1650 and an epoxy group equivalent of 280 to 290 g/eq), and 2,4,6-tris(dimethyl aminomethyl)phenol (a trademark: DMP-30 manufactured by Nisshin EM Corporation) was mixed in a weight ratio of 359.0:92.5:10 to obtain a dispersion of an electrically conductive material for the layer (1).

Synthetic Example 27

In 67.4 g of xylene was dissolved 29.2 g of an epoxy resin (a trademark: jER 828 manufactured by Mitsubishi Chemical Corporation, an epoxy group equivalent of 184 to 194 g/eq) was added, to which 29.2 g of a nickel powder (a trademark: Ni-255, an average particle size of 2.2 μm, manufactured by Fukuda Metal Foil & Powder Co., Ltd.) was added, and the mixture was dispersed and degased using a planetary centrifugal mixer (a product name: "Awatorineritaro (a registered trademark)" ARE-310 manufactured by Thinky Corporation) to obtain a dispersion. The dispersion condition was: It was performed at an orbital speed of 2000 rpm for 90 seconds.

The dispersion and triethylene tetramine (TETA, an amine equivalent of 24.4 g/eq) were mixed in a weight ratio of 10:1.6 to obtain a dispersion of an electrically conductive material for the layer (1).

Synthetic Example 28

A dispersion of an electrically conductive material for the layer (1) was obtained in the same manner as in Synthetic Example 23, except that the nickel powder was changed to a titanium nitride powder (TiN, an average particle size of 1.9 μm, manufactured by Japan New Metals Co., Ltd.).

Synthetic Example 29

In 30 g of toluene was dissolved 9.07 g of polyisobutylene (EP 400 manufactured by Kaneka Corporation), to which 9.07 g of a nickel powder (a trademark: Ni-255, an average particle size of 2.2 μm, manufactured by Fukuda Metal Foil & Powder Co., Ltd.) was added, and the mixture was dispersed and degased using a planetary centrifugal mixer (a product name: "Awatorineritaro (a registered trademark)" ARE-310 manufactured by Thinky Corporation) to obtain a dispersion. The dispersion condition was: It was performed at an orbital speed of 2000 rpm for 90 seconds. Further a curing agent (a compound obtained by adding 2 equivalents, of the total amount of hydrosilyl groups, of an α-olefin to methyl hydrogen silicone having 7.5, on average, of (—Si—O—) repeating units in the presence of a platinum catalyst, and having about 5.5, on average, of hydrosilyl groups in one molecule. The compound had an Si—H group content of 6 mmol/g) in an weight ratio of 0.93 based on the weight ratio described above: a curing retarder (Surfynol 61 manufactured by Nissin Chemical Industry Co., Ltd.) in a weight ratio of 0.017 based on the weight ratio described above: and a curing catalyst (Pt-VTS-3.0X Umicore Japan KK) in a weight ratio of 0.012 based on the weight ratio described above, were added thereto, and the mixture was stirred and degased, thereby obtaining a dispersion of an electrically conductive material for the layer (1).

Example 29

A copper thin film layer of the layer (2), having a thickness of 40 nm, was formed on one surface of the film for the layer (3), obtained in Synthetic Example 1, using a vacuum deposition apparatus (a product name: EBH-6 manufactured by ULVAC Inc.).

The dispersion obtained in Synthetic Example 23 was flow-casted on the surface of the copper thin film layer of the layer (2) formed on the layer (3) in a final total thickness of 43 μm using a coating apparatus (a trademark: Comma Coater (a registered trademark) manufactured by Hirano Tecseed Co., Ltd.), which was dried at 80° C. for 4 minutes and subsequently heated at 120° C. for 4 minutes, at 180° C. for 4 minutes and at 230° C. for 4 minutes to form the layer (1), thereby obtaining a laminate film.

On the surface of the layer (1) of the obtained laminate film, film formation was performed at a sputtering gas pressure of 13.5 Pa (argon gas) under an output of 900 W using a sputtering apparatus (a product name: NSP-6 manufactured by Showa Shinku Co., Ltd.) and a target of copper (a simple substance) to form a copper thin film layer of the layer (2) having a thickness of 100 nm, thereby obtaining a current collector.

On the other hand, using an aluminum foil (a thickness of 30 μm) instead of the film for the layer (3) obtained in Synthetic Example 1, the dispersion, obtained in Synthetic Example 23, was flow-casted thereon, which was dried at 80° C. for 4 minutes, and then the aluminum foil was removed by peeling-off. Subsequently, the heating at 120° C. for 4 minutes, at 180° C. for 4 minutes, and at 230° C. for 4 minutes, were performed to obtain a film for evaluation of the blocking property to the solvent in the electrolytic solution.

As for the obtained current collector, the electric resistance per unit area in the thickness direction, the blocking property to the solvent in an electrolytic solution, the blocking property to the component included in the electrolytic solution, the durability to the negative electrode potential, the durability to the positive electrode potential, the adhesion to the negative electrode (the binder resin), and the capacity retention rate were measured. In the test of the durability to the negative electrode potential, the measurement was performed by setting the working electrode so that the separator was brought into contact with the metal thin film layer of the layer (2) on the surface of the layer (1). In the test of the durability to the positive electrode potential, a value b/a was calculated when the working electrode was set so that the separator was brought into contact with the layer (3).

Example 30

A current collector was obtained in the same manner as in Example 29, except that the dispersion obtained in Synthetic Example 23 was changed to the dispersion obtained in Synthetic Example 24. On the other hand, using an aluminum foil (a thickness of 80 μm) instead of the film for the layer (3) obtained in Synthetic Example 1, the dispersion, obtained in Synthetic Example 24, was flow-casted thereon, which was dried at 30° C. for one hour and then the aluminum foil was removed by peeling-off. Subsequently, the heating at 150° C. for 5 minutes was performed to obtain a film for evaluation of the blocking property to a solvent in an electrolytic solution.

Example 31

A current collector was obtained in the same manner as in Example 29, except that the dispersion obtained in Synthetic Example 23 was changed to the dispersion obtained in Synthetic Example 25. On the other hand, using a PET film (a trademark: Lumirror manufactured by Toray Industries, Inc., a thickness of 125 μm) instead of the film for the layer (3) obtained in Synthetic Example 1, the dispersion, obtained in Synthetic Example 25, was flow-casted thereon, which was dried at 50° C. for one hour and then the PET film was removed by peeling-off. Subsequently, the heating at 150° C. for one hour and at 180° C. for one hour were performed to cure it, thereby obtaining a film for evaluation of the blocking property to a solvent in an electrolytic solution.

Example 32

A current collector was obtained in the same manner as in Example 29, except that the dispersion obtained in Synthetic Example 23 was changed to the dispersion obtained in Synthetic Example 26. On the other hand, using a PET film (a trademark: Lumirror manufactured by Toray Industries, Inc., a thickness of 125 μm) instead of the film for the layer (3) obtained in Synthetic Example 1, the dispersion, obtained in Synthetic Example 26, was flow-casted thereon, which was dried at 50° C. for one hour and then the PET film was removed by peeling-off. Subsequently the heating at 150° C. for one hour and at 180° C. for one hour were performed to cure it, thereby obtaining a film for evaluation of the blocking property to a solvent in an electrolytic solution.

Example 33

A current collector was obtained in the same manner as in Example 29, except that the dispersion obtained in Synthetic Example 23 was changed to the dispersion obtained in Synthetic Example 27. On the other hand, using a PET film (a trademark: Lumirror manufactured by Toray Industries, Inc., a thickness of 125 μm) instead of the film for the layer (3) obtained in Synthetic Example 1, the dispersion, obtained in Synthetic Example 27, was flow-casted thereon, which was dried at 50° C. for one hour and then the PET film was removed by peeling-off. Subsequently, the heating at 150° C. for 3 hours was performed to cure it, thereby obtaining a film for evaluation of the blocking property to a solvent in an electrolytic solution.

Example 34

A current collector was obtained. In the same manner as in Example 29, except that for forming the metal thin film layer of the layer (2) on the surface of the layer (1), a vacuum deposition apparatus (a product name: EBH-6 manufactured by ULVAC Inc.) was used instead of the sputtering apparatus to form a copper thin film layer of the layer (2).

Example 35

A current collector was obtained in the same manner as in Example 29, except that the dispersion obtained in Synthetic Example 23 was changed to the dispersion obtained in Synthetic Example 28.

Example 36

A current collector was obtained in the same manner as in Example 29, except that the copper thin film layer of the layer (2) was not formed on the surface of the layer (1).

Example 37

A current collector was obtained in the same manner as in Example 30, except that the copper thin film layer of the layer (2) was not formed on the surface of the layer (1).

Example 38

A current collector was obtained in the same manner as in Example 31, except that the copper thin film layer of the layer (2) was not formed on the surface of the layer (1).

Example 39

A current collector was obtained in the same manner as in Example 32, except that the copper thin film layer of the layer (2) was not formed on the surface of the layer (1).

Example 40

A current collector was obtained in the same manner as in Example 33, except that the copper thin film layer of the layer (2) was not formed on the surface of the layer (1).

Comparative Example 17

A copper thin film layer of the layer (2), having a thickness of 40 nm, was formed on one surface of the film for the layer (3), obtained in Synthetic Example 1, using a vacuum deposition apparatus (a product name: EBH-6 manufactured by ULVAC Inc.).

The dispersion obtained in Synthetic Example 29 was flow-casted on the surface of the copper thin film layer formed on the layer (3) in a final total thickness of 40 μm using a wire bar (Rod No. 30, a coating speed of 1 cm/second), which was dried and cured at 150° C. for 10 minutes to form the layer (1), thereby obtaining a laminate film.

On the surface of the layer (1) of the obtained laminate film, film formation was performed at a sputtering gas pressure of 13.5 Pa (argon gas) under an output of 900 W using a sputtering apparatus (a product name: NSP-6 manufactured by Showa Shinku Co., Ltd.) and a target of copper (a simple substance) to form a copper thin film layer of the layer (2) having a thickness of 100 nm, thereby obtaining a current collector.

On the other hand, using Teflon (a registered trademark) instead of the film for the layer (3) obtained in Synthetic Example 1, the dispersion, obtained in Synthetic Example 20, was flow-casted thereon, which was dried and cured at 150° C. for 10 minutes, and then Teflon was removed by peeling-off to obtain a film for evaluation of the blocking property to the solvent in the electrolytic solution.

Comparative Example 18

On one surface of the film for the layer (3), obtained in Synthetic Example 1, film formation was performed at a sputtering gas pressure of 13.5 Pa (argon gas) under an output of 900 W using a sputtering apparatus (a product name: NSP-6 manufactured by Showa Shinku Co., Ltd.) and a target of copper (a simple substance) to form a copper thin film layer of the layer (2) having a thickness of 100 nm, thereby obtaining a current collector. As for the obtained current collector, the electric resistance per unit area in the thickness direction, the blocking property to the solvent in the electrolytic solution, the blocking property to the component included in the electrolytic solution, the durability to a negative electrode potential, the durability to a positive electrode potential, the adhesion to the negative electrode (the negative electrode binder resin), and the capacity retention rate were confirmed. In the test of the durability to the negative electrode potential, the measurement was performed by setting the working electrode so that the separator was brought into contact with the copper thin film layer in a state in which the copper thin film layer was formed on the current collector. At for the blocking property to a solvent in an electrolytic solution, the measurement was performed in a state in which the copper thin film layer was formed.

As for the confirmations of the blocking property to the component included in the electrolytic solution, the disability to a negative electrode potential, and the capacity retention rate, the current collector was decomposed during the test, and thus the evaluation could not be normally performed.

Comparative Example 19

The film for the layer (3), obtained in Synthetic Example 1 was used as the current collector, and the electric resistance per unit area in a thickness direction, the blocking property to a solvent in an electrolytic solution, the blocking property to the component included in the electrolytic solution, the durability to a negative electrode potential, the durability to a positive electrode potential the adhesion to the negative electrode (the negative electrode binder resin), and the capacity retention rate were confirmed.

As for the confirmations of the blocking property to the component included in the electrolytic solution, the durability to a negative electrode potential and the capacity retention rate, the current collector was decomposed during the test, and thus the evaluation could not be normally performed.

Reference Example

A copper foil having a thickness of 20 μm was used as the current collector, and the capacity retention rate was confirmed.

Various results in the evaluation and measurement in Examples 29 to 40, Comparative Examples 17 to 19, and Reference Example are shown in Table 5.

TABLE 5

|  | Example |  |  |  |  |  |  |  |  |
|---|---|---|---|---|---|---|---|---|---|
|  | 29 | 30 | 31 | 32 | 33 | 34 | 35 | 36 | 37 |
| Electric resistance per unit area in thickness direction (mΩ · cm$^2$) | 70 | 70 | 70 | 70 | 70 | 70 | 120 | 85 | 85 |
| Blocking property to solvent in electrolytic solution (mg) | 1.3 | 2 | 1 | 90 | 0.8 | 1.3 | 1.3 | 1.3 | 2 |
| Blocking property to component included in electrolytic solution (μm) | ≤1 | ≤1 | ≤1 | ≤1 | ≤1 | ≤1 | ≤1 | ≤1 | ≤1 |
| Durability to negative electrode potiential | 2 | 2 | 2 | 2 | 7 | 2 | 2 | 2 | 2 |
| Durabilty to positive electrode potential (%) | 0.02 | 0.02 | 0.02 | 0.02 | 0.02 | 0.02 | 0.02 | 0.02 | 0.02 |
| Adhesion to negative electrode | 100 | 100 | 100 | 100 | 100 | 100 | 90 | 60 | 60 |
| Capacity retention rate (%) | 65 | 65 | 60 | 60 | 60 | 65 | 55 | 40 | 40 |

|  | Example |  |  | Comparative Example |  |  | Reference |
|---|---|---|---|---|---|---|---|
|  | 38 | 39 | 40 | 17 | 18 | 19 | Example |
| Electric resistance per unit area in thickness direction (mΩ · cm$^2$) | 85 | 85 | 160 | 180 | 70 | 70 | — |
| Blocking property to solvent in electrolytic solution (mg) | 1 | 90 | 0.8 | 4000 | 1 | 1 | — |
| Blocking property to component included in electrolytic solution (μm) | ≤1 | ≤1 | ≤1 | 18 | Evaluation impossible | Evaluation impossible | — |
| Durability to negative electrode potiential | 2 | 2 | 2 | 6 | Evaluation impossible | Evaluation impossible | — |
| Durabilty to positive electrode potential (%) | 0.02 | 0.02 | 0.02 | 0.02 | 0.02 | 0.02 | — |
| Adhesion to negative electrode | 60 | 60 | 50 | 100 | 100 | 50 | — |
| Capacity retention rate (%) | 40 | 40 | 35 | 10 | Evaluation impossible | Evaluation impossible | 60 |

As shown in Table 5, in Comparative Example 17 in which the polymer substrate itself did not have the blocking property to the solvent, the results was the insufficient capacity retention rate, even if the metal thin film layer was formed on the surface on the negative electrode side. In Comparative Example 18 having no layer (1), which is the resin layer having the durability to the negative electrode potential, the material was decomposed even if the metal thin film layer was provided on the surface on the negative electrode side, and thus the battery test could not be performed. In Comparative Example 19, in which the metal thin film layer was deleted from Comparative Example 18, the material was decomposed when the durability to the negative electrode potential was evaluated, and thus the battery test could not be performed.

On the other hand, as shown in Table 5, the current collectors from Examples 29 to 40 in which the metal thin film layer of the layer (2) was formed solved the problems described above. From the foregoing, it is clear that the current collector of the present invention has the stability to the equilibrium potential environment in the negative electrode and the low electric resistance. In addition, as shown in Examples 29 to 35, the adhesion to the negative electrode was excellent, and the reduction of the capacity retention rate was suppressed, and thus the current collector of the present invention can maintain the electrical contact to the negative electrode active material during the charge and discharge, and can suppress the in-plane variation in the reaction of the active material.

Synthetic Example 30

On one surface of the film, for the layer (3), obtained in Synthetic Example 1, film formation was performed at a sputtering gas pressure of 13.5 Pa (argon gas) under an output of 900 W for 30 seconds using a sputtering apparatus (a product name: NSP-6 manufactured by Showa Shinku Co., Ltd.) and a target of copper (a simple substance), thereby forming a metal thin film layer of the layer (2) having a thickness of 40 nm.

Example 41

10 g of approximately spherical nickel particles (a trademark: Ni255, an average particle size of 2.2 μm, manufactured by Fakuda Metal Foil & Powder Co., Ltd.) were prepared, and treated for 60 minutes in a high speed stamp mill (type: ANS-143PL manufactured by Nitto Kagaku Co., Ltd.), thereby obtaining platy nickel particles having an aspect ratio of 15 and an average thickness of 0.6 μm.

Using a planetary centrifugal mixer (a product name: "Awatorineritaro (a registered trademark)" ARE-310 manufactured by Thinky Corporation), 10 g of the platy nickel particles, 10 g of a cyclic polyolefin resin (a trademark: ZEONOR 1410R manufactured by Zeon Corporation), and 30 g of ethyl cyclohexane were dispersed and degased to obtain a dispersion. The dispersion condition was: It was performed at an orbital speed of 2000 rpm for 90 seconds.

The dispersion was flow-casted on the metal thin film layer of the layer (2), obtained in Synthetic Example 30, in a final thickness of 12 μm using a coating apparatus (a trademark: Comma Coater (a registered trademark) manufactured by Hirano Tecseed Co., Ltd.), which as dried at 80° C. for 4 minutes, and subsequently heated at 180° C. for 4 minutes to form the layer (1), thereby obtaining a laminate film (a thickness of 37 μm).

On the surface of (1) of the obtained laminate film, film formation was performed at a sputtering gas pressure of 13.5 Pa (argon gas) under an output of 900 W using a sputtering apparatus (a product name: NSP-6 manufactured by Showa Shinku Co., Ltd.) and a target of copper (a simple substance) to form a copper thin film layer of the layer (2) having a thickness of 100 nm, thereby obtaining a current collector.

As for the film of the obtained current collector, the electric resistance per unit area in the thickness direction, the durability to the negative electrode potential, the durability to the positive electrode potential, the surface smoothness, the degree of warping of the current collector, and the capacity retention rate were measured.

The surface smoothness, the degree of warping of the current collector, the aspect ratio of the electrically conductive particles, and the average thickness were measured as follows:

Surface Smoothness

The maximum height Rz (in accordance with JIS 2001) of the surface of the layer (1) of the current collector obtained in Example was measured before the layer (2) was formed. When the value Rz was 10 μm or less, it was judged that the surface smoothness was excellent. A laser scanning confocal microscope (type: VK-8700 manufactured by Keyence Corporation) was used for the measurement.

Degree of Warping of Current Collector

The current collector obtained in Example (which was stored by sealing in an aluminum zipper bag immediately after the production) was cut out into a 5 cm-square in a dry room having a dew point of −40° C. When square was allowed to stand on a horizontal plate, distances from the tops thereof to the plate were averaged, which was defined as a warping of the current collector. The warping was measured in a condition in which the square was allowed to stand in a direction to raise the tops from the plate. When the square was warped too large so that it was rounded one or more circles, it was expressed as ×(NG). The warping was measured in a low humidity environment after drying. When the warping of the current collector is 5 mm or less, it can be said that the degree of warping is excellent.

Methods of Measuring Aspect Ratio and Average Thickness of Electrically Conductive Particles The electrically conductive particles 1, obtained in Example, were observed with a scanning electron microscope (S-4800 manufactured by Hitachi, Ltd.) at a magnification of 30,000 to 100,000 times, and the thickness (the minimum diameter) and the maximum diameter for 10 random particles were measured. A value of the maximum diameter/the thickness thereof was calculated, and the arithmetical average thereof was calculated to obtain an aspect ratio. The average thickness was obtained in the same way as above.

Example 42

10 g of approximately spherical nickel particles (a trademark: Ni255, an average particle size of 2.2 μm, manufactured by Fukuda Metal Foil & Powder Co., Ltd.) were prepared and treated for 60 minutes in a high speed stamp mill (type: ANS-143PL manufactured by Nitto Kagaku Co., Ltd.), thereby obtaining platy nickel particles having an aspect ratio of 15 and an average thickness of 0.6 μm. Using a planetary centrifugal mixer (a produce name: "Awatori-neritaro (a registered trademark)" ARE-310 manufactured by Thinky Corporation), 10 g of the platy nickel particles, 8.7 g of an epoxy resin (a trademark: jER 828 manufactured by Mitsubishi Chemical Corporation, an epoxy equivalent of 184 to 194 g/eq), 1.3 g of triethylene tetramine (TETA), and 30 g of xylene were dispersed and degased to obtain a dispersion. The dispersion condition was: It was performed at an orbital speed of 2000 rpm for 90 seconds.

A current collector was obtained in the same manner as in Example 41, except that the dispersion in Example 41 was changed to the dispersion described above, and the heating was performed at 150° C. for 3 hours to cure.

As for the obtained current collector, the electric resistance per unit area in the thickness direction, the durability to the negative electrode potential, the durability to the positive electrode potential, the surface smoothness, the degree of warping of the current collector, and the capacity retention rate were measured.

Example 43

10 g of approximately spherical nickel particles (a trademark: Ni255, an average particle size of 2.2 μm, manufactured by Fukuda Metal Foil & Powder Co., Ltd.) were prepared, and treated for 30 minutes in a high speed stamp mill (type: ANS-143PL manufactured by Nitto Kagaku Co., Ltd.), thereby obtaining platy nickel particles having an aspect ratio of 10 and an average thickness of 1 μm. Using a planetary centrifugal mixer (a product name: "Awatorine-ritaro (a registered trademark)" ARE-310 manufactured by Thinky Corporation), 10 g of the platy nickel particles, 7.4 g of a phenoxy resin (a trademark: YP-50S manufactured by Nippon Steel & Sumikin Chemical Co., Ltd., a weight average molecular weight of 50000 to 70000 and a hydroxyl equivalent of 280 to 290 g/ep), and 40 g of cyclohexanone were dispersed and degased to obtain a dispersion.

A film of the current collector was obtained in the same manner as in Example 41 except that to the dispersion were added 2.6 g of an epoxy resin (a trademark: jER 630 manufactured by Mitsubishi Chemical Corporation, a number average molecular weight of 277 and an epoxy equivalent of 90 to 105 g/eq) and 0.5 g of 2,4,6-tri(dimethylaminomethyl)phenol (a trademark: DMP-30 manufactured by Nisshin EM Corporation), and the mixture was coated on the metal thin film layer of the layer (2) obtained in Synthetic Example 30 in a final thickness of 12 μm to form a film, which was heat-cured at 50° C. for one hour, at 100° C. for one hour, and at 150° C. for one hour in this order to form the layer (1).

As for the obtained film of the current collector, the electric resistance per unit area in the thickness direction, the durability to the negative electrode potential, the durability to the positive electrode potential, the surface smoothness, the degree of warping of the current collector, and the capacity retention rate were measured.

Example 44

10 g of approximately spherical nickel particles (a trademark: Ni255, an average particle size of 2.2 μm, manufactured by Fukuda Metal Foil & Powder Co., Ltd.) were prepared, and treated for 10 minutes in a high speed stamp mill (type: ANS-143PL manufactured by Nitto Kagaku Co., Ltd.), thereby obtaining platy nickel particles having an aspect ratio of 5 and an average thickness of 3 μm.

Using a planetary centrifugal mixer (a product name: "Awatorineritaro (a registered trademark)" ARE-310 manufactured by Thinky Corporation), 10 g of the platy nickel particles, 10 g of polyvinyl alcohol (a trademark: N-type Gohsenol (a registered trademark) N-300 manufactured by Nippon Synthetic Chemical Industry Co., Ltd.), and 40 g of pure water were dispersed and degased to obtain a dispersion.

A current collector was obtained in the same manner as in Example 41, except that the dispersion in Example 41 was changed to the dispersion described above, and the drying was performed at 30° C. for one hour and at 150° C. for 5 minutes.

As for the obtained current collector, the electric resistance per unit area in the thickness direction, the durability to the negative electrode potential, the durability to the positive electrode potential, the surface smoothness, the degree of warping of the current collector, and the capacity retention rate were measured.

Values measured in Examples 41 to 44 are shown in Table 6.

TABLE 6

|  | Example | | | |
| --- | --- | --- | --- | --- |
|  | 41 | 42 | 43 | 44 |
| Electric resistance per unit area in thickness direction (mΩ · cm$^2$) | 80 | 110 | 95 | 95 |
| Durability to negative electrode potential | 3 | 3 | 3 | 3 |
| Durability in positive electrode potential (b/a) | 0.03 | 0.03 | 0.03 | 0.03 |
| Surface smoothness (μm) | 1.5 | 1.5 | 3 | 5 |
| Degree of warping of current collector (mm) | 3 | 2 | 2 | 3 |
| Capacity retention rate (%) | 55 | 53 | 53 | 55 |

As shown in Table 6, it is clear that the current collectors of the present invention, having the metal thin film layer on the surface on the negative electrode side, have the stability to the equilibrium potential environment in the negative electrode and the blocking property to a solvent in an electrolytic solution, and are low in the electric resistance per unit area in the thickness direction. It is also clear that the high capacity retention rate is shown, and the durability of the battery is excellent. In addition, it is possible to reduce the linear expansion coefficient of the polymer material owing to the platy electrically conductive particles, and thus the occurrence of warping can be suppressed even in a current collector having a multi-layer structure in which polymer materials, whose linear expansion coefficients are significantly different from each other, are laminated. When the current collector of the present invention is used, accordingly, the weight reduction of the battery can be realised, and furthermore the current collector has the excellent surface smoothness and the warping can be suppressed even in the multi-layer structure; as a result a battery having a stable quality can be obtained.

Production Example 1

The dispersion of the electrically conductive material for the layer (1), obtained in Synthetic Example 2, was uniformly flow-coated on the metal thin film layer of the layer (2), obtained in Synthetic Example 30, in a final total thickness of 43 μm, which was dried at 80° C. for 4 minutes, and subsequently heated at 120° C. for 4 minutes, at 180° C. for 4 minutes, and at 230° C. for 4 minutes to form a polymer electrical conductivity layer of the layer (1), thereby obtaining a multilayer film including the metal thin film layer of the layer (2) and the layer (3).

Production Example 2

A polymer electrical conductivity layer of the layer (1) was formed in the same manner as in Production Example 1, except that the dispersion from Synthetic Example 2, in Production Example 1, was changed to the dispersion of the electrically conductive material for the layer (1) obtained in Synthetic Example 3, and a multi-layer film including the polymer electrical conductivity layer of the layer (1), the metal thin film layer of the layer (2), and the layer (3) was obtained.

Example 45

The surface of the layer (1) of the multi-layer film obtained in Production Example 1 was subjected to a corona treatment (700 W·min/m$^2$) to obtain a current collector.

The obtained current collector had an electric resistance per unit area in the thickness direction of 130 mΩ·cm$^2$, a solvent permeation amount of 0.7 mg, a durability to the negative electrode potential of 3, a durability to the positive electrode potential of 0.03, a permeation depth of lithium element of 1 μm or less, an abundance of the metal element on the surface of the surface layer of 0.8%, and a capacity retention rate of 45%.

The abundance of the metal element on the surface of the surface layer was measured as follows:

Abundance of Metal Element on Surface of Surface Layer

An elementary analysis of the surface of the layer (1) of the current collector was performed using an X-ray photoelectron spectroscopy apparatus (Quantum 2000 manufactured by ULVAC-PHI, Incorporated, an X-ray source: AlKα, an output of 25 W). At that time, an atomic weight ratio of the metal elements to all detected elements was defined as the abundance of the metal element.

Example 46

The surface of the layer (1) of the multilayer film obtained in Production Example 1 was ground 20 times with a sandpaper (#1000 manufactured by Sankyo-Rikagaku Co., Ltd.) to obtain a current collector.

The obtained current collector had an electric resistance per unit area in the thickness direction of 125 mΩ·cm$^2$, a solvent permeation amount of 0.7 mg, a durability to the negative electrode potential of 3, a durability to the positive electrode potential of 0.03, a permeation depth of lithium element of 1 μm or less, an abundance of the metal element on the surface of the surface layer of 1.0%, and a capacity retention rate of 50%.

Example 47

A current collector was obtained in the same manner as in Example 45, except that multi-layer film obtained in Production Example 1, in Example 45, was changed to the multi-layer film obtained in Production Example 2.

The obtained current collector had an electric resistance per unit area in the thickness direction of 140 mΩ·cm², a solvent permeation amount of 0.7 mg, a durability to the negative electrode potential of 3, a durability to the positive electrode potential of 0.03, a permeation depth of lithium element of 1 μm or less, an abundance of the metal element on the surface of the surface layer of 0.7%, and a capacity retention rate of 35%.

Example 48

A current collector was obtained in the same manner as in Example 46, except that multi-layer film obtained in Production Example 1, in Example 46, was changed to the multi-layer film obtained in Production Example 2.

The obtained current collector had an electric resistance per unit area in the thickness direction of 130 mΩ·cm², a solvent permeation amount of 0.7 mg, a durability to the negative electrode potential of 3, a durability to the positive electrode potential of 0.03, a permeation depth of lithium element of 1 μm or less, an abundance of the metal element on the surface of the surface layer of 1.1%, and a capacity retention rate of 50%.

Synthetic Example 31

On the surface of the film of the layer (3) obtained in Synthetic Example 1, film formation was performed at a sputtering gas pressure of 13.5 Pa (argon gas) under an output of 900 W for 30 seconds using a sputtering apparatus (a product name: NSP-6 manufactured by Showa Shinku Co., Ltd.) and a target of copper (a simple substance), thereby forming a metal thin film layer of the layer (2) having a thickness of 40 nm.

Synthetic Example 32

In 30 g of ethyl cyclohexane was dissolved 10 g of a cyclic polyolefin (a trademark: ZEONOR 1410R manufactured by Zeon Corporation), to which 10 g of a copper powder (a trademark: MF-D1, an average particle size of 5.9 μm, manufactured by Mitsui Mining & Smelting Co., Ltd.) was added, and the mixture was dispersed and degased using a planetary centrifugal mixer (a product name: "Awatorineritaro (a registered trademark)" ARE-310 manufactured by Thinky Corporation) to obtain a dispersion for an area B on the layer (1). The dispersion condition was: It was performed at an orbital speed of 2000 rpm for 90 seconds.

Synthetic Example 33

A dispersion for an area B on the layer (1) was obtained in the same manner as in Synthetic Example 32, except that the copper powder (a trademark: MF-D1, an average particle size of 5.9 μm, manufactured by Mitsui Mining & Smelting Co., Ltd.) in Synthetic Example 32 was changed to a nickel powder (a trademark: Ni-255, an average particle size of 2.2 μm, manufactured by Fukuda Metal Foil & Powder Co., Ltd.).

Synthetic Example 34

In 30 g of pure water was dissolved 10 g of polyvinyl alcohol (a trademark: N-type Gohsenol (a registered trademark) N-300 manufactured by Nippon Synthetic Chemical Industry Co., Ltd.), to which 10 g of a copper powder (a trademark: MF-D1, an average particle size of 5.9 μm, manufactured by Mitsui Mining & Smelting Co., Ltd.) was added, and the mixture was dispersed and degased using a planetary centrifugal mixer (a product name: "Awatorineritaro (a registered trademark)" ARE-310 manufactured by Thinky Corporation) to obtain a dispersion for an area B on the layer (1). The dispersion condition was: It was performed at an orbital speed of 2000 rpm for 90 seconds.

Synthetic Example 35

In a 30 g of ethyl cyclohexane was dissolved 10 g of a cyclic polyolefin (a trademark: ZEONOR 1410R, manufactured by Zeon Corporation), to which 40 g of a nickel powder (a trademark: a trademark: Ni-255, an average particle size of 2.2 μm, manufactured by Fukuda Metal Foil & Powder Co., Ltd.) was added, and the mixture was dispersed and degased using a planetary centrifugal mixer (a product name: "Awatorineritaro (a registered trademark)" ARE-310 manufactured by Thinky Corporation) to obtain a dispersion for an area A on the layer (1). The dispersion condition was: It was performed at an orbital speed of 2000 rpm for 90 seconds.

Synthetic Example 36

A dispersion for an area A on the layer (1) was obtained in the same manner as in Synthetic Example 35, except that the nickel powder (a trademark: Ni-255, an average particle size of 2.2 μm, manufactured by Fukuda Metal Foil & Powder Co., Ltd.), in Synthetic Example 35, was changed to acetylene black (a trademark: Denka Black (a registered trademark) powdery product manufactured by Denki Kagaku Kogyo Kabushiki Kaisha).

Synthetic Example 37

A dispersion for an area A on the layer (1) was obtained in the same manner as in Synthetic Example 36, except that 40 g of the acetylene black, in Synthetic Example 36, was changed to 10 g of the acetylene black.

Synthetic Example 38

A dispersion for an area A on the layer (1) was obtained in the same manner as in Synthetic Example 35, except that the nickel powder (a trademark: Ni-255, an average particle size of 2.2 μm, manufactured by Fukuda Metal Foil & Powder Co., Ltd.), in Synthetic Example 35, was changed to carbon nanotube (VGCF-H (a registered trademark) manufactured by Showa Denko K.K.).

Synthetic Example 39

In a zirconia vessel were put 10 g of an ethylene-vinyl acetate copolymer (a trademark: Sumitate (a registered trademark) KA-30 manufactured by Sumitomo chemical Co., Ltd.), 40 g of acetylene black (a trademark: Denka Black (a registered trademark) powdery product manufactured by Denki Kagaku Kogyo Kabushiki Kaisha), 200 g of toluene, and 450 g of 5 mmΦ zirconia balls, and the mixture was dispersed in a ball mill to obtain a dispersion of an electrically conductive material for the layer (2). The dispersion condition was: It was performed at the rotation speed of 500 rpm for 45 minutes.

Example 49

The dispersion for an area B on the layer (1) obtained in Synthetic Example 32 was uniformly flow-casted on the metal thin film layer of the layer (2) of the film obtained in Synthetic Example 31 in a final total thickness of 43 μm, which was dried at 80° C. for 4 minutes, and subsequently heated at 120° C. for 4 minutes, at 180° C. for 4 minutes, and at 230° C. for 4 minutes.

The dispersion for an area A on the layer (1) obtained in Synthetic Example 35 was uniformly flow-casted thereon in a final total thickness of 44 μm, which was dried at 80° C. for 4 minutes, and subsequently heated at 120° C. for 4 minutes, at 180° C. for 4 minutes, and at 230° C. for 4 minutes, thereby obtaining a current collector including a multi-layer film of the layer (1), the metal thin film layer of the layer (2), and the layer (3).

Example 50

A current collector was obtained in the same manner as in Example 49, except that the dispersion for an area A on the layer (1) obtained in Synthetic Example 35, in Example 49, was changed to the dispersion for an area A on the layer (1) obtained in Synthetic Example 36.

Example 51

A current collector was obtained in the same manner as in Example 49, except that the dispersion for an area A on the layer (1) obtained in Synthetic Example 35, in Example 49, was changed to the dispersion for an area A on the layer (1) obtained in Synthetic Example 37.

Example 52

A current collector was obtained in the same manner as in Example 49, except that the dispersion for an area A on the layer (1) obtained in Synthetic Example 35, in Example 49, was changed to the dispersion for an area A on the layer (1) obtained in Synthetic Example 38.

Example 53

A current collector was obtained in the same manner as in Example 49, except that the dispersion for an area B on the layer (1) obtained in Synthetic Example 32, in Example 49, was changed to the dispersion for an area B on the layer (1) obtained in Synthetic Example 33.

Example 54

A current collector was obtained in the same manner as in Example 53, except that the dispersion for an area A on the layer (1) obtained in Synthetic Example 35, in Example 53, was changed to the dispersion for an area A on the layer (1) obtained in Synthetic Example 36.

Example 55

A current collector was obtained in the same manner as in Example 53, except that the dispersion for an area A on the layer (1) obtained in Synthetic Example 35, in Example 53, was changed to the dispersion for an area A on the layer (1) obtained in Synthetic Example 37.

Example 56

A current collector was obtained in the same manner as in Example 53, except that the dispersion for an area A on the layer (1) obtained in Synthetic Example 35, in Example 53, was changed to the dispersion for an area A on the layer (1) obtained in Synthetic Example 38.

Example 57

A current collector was obtained in the same manner as in Example 49, except that the dispersion for an area B on the layer (1) obtained in Synthetic Example 32, in Example 49, was changed to the dispersion for an area B on the layer (1) obtained in Synthetic Example 34.

Example 58

A current collector was obtained in the same manner as in Example 57, except that the dispersion for an area A on the layer (1) obtained in Synthetic Example 35, in Example 57, was changed to the dispersion for an electrically conductive material for the layer (2) obtained in Synthetic Example 39.

As for the current collectors obtained in Examples 49 to 58, various measurement and evaluation results are shown in Table 7.

TABLE 7

|  |  | Example 49 | Example 50 | Example 51 | Example 52 | Example 53 | Example 54 | Example 55 | Example 56 | Example 57 | Example 58 |
|---|---|---|---|---|---|---|---|---|---|---|---|
| Polymer Layer 1 | Electrically conductive particles in area A | Nickel powder | Acetylene black | Acetylene black | VGCF-H | Nickel powder | Acetylene black | Acetylene black | VGCF-H | Nickel powder | Acetylene black |
|  | Concentration of electrically conductive particles in area A (% by weight) | 80 | 80 | 50 | 80 | 80 | 80 | 50 | 80 | 80 | 80 |
|  | Electrically conductive particles in area B | Copper powder | Copper powder | Copper powder | Copper powder | Nickel powder | Nickel powder | Nickel powder | Nickel powder | Copper powder | Copper powder |
|  | Concentration of electrically conductive particles in area B (% by weight) | 50 | 50 | 50 | 50 | 50 | 50 | 50 | 50 | 50 | 50 |

TABLE 7-continued

|  | Example 49 | Example 50 | Example 51 | Example 52 | Example 53 | Example 54 | Example 55 | Example 56 | Example 57 | Example 58 |
|---|---|---|---|---|---|---|---|---|---|---|
| Electric resistance per unit area in thickness direction (mΩ·cm$^2$) | 150 | 200 | 1000 | 200 | 160 | 240 | 1200 | 250 | 160 | 160 |
| Capacity retention rate (%) | 45 | 50 | 40 | 50 | 45 | 50 | 35 | 30 | 45 | 45 |
| Blocking property to solvent in electrolytic solution (mg) | 0.7 | 0.7 | 0.7 | 0.7 | 0.7 | 0.7 | 0.7 | 0.7 | 0.7 | 0.7 |
| Durability to negative electrode potiential | 3 | 8 | 5 | 7 | 3 | 8 | 5 | 7 | 3 | 8 |
| Durabilty to positive electrode potential | 0.03 | 0.03 | 0.03 | 0.03 | 0.03 | 0.03 | 0.03 | 0.03 | 0.03 | 0.03 |
| Blocking property to component included in elctrolytic solution (μm) | 2 or less | 2 or less | 2 or less | 2 or less | 2 or less | 2 or less | 2 or less | 2 or less | 2 or less | 2 or less |

As shown in Table 7, the current collector in which the electrically conductive carbon particles are included on the surface of the area B including the electrically conductive particles including a metal element of the layer (1), or which has the area A including the electrically conductive particles including a metal element and whose concentration is higher than that in the area B, as Examples 49 to 57, had the high capacity retention rate, and thus it was found that the electrical contact and the in-plane variation in the reaction of the active material were improved. The current collector having the layer (2) on its surface, as Example 58, had the same results.

REFERENCE SIGNS LIST

1 Teflon block
2 O-ring
3 Film sample
4 Film weight
5 Carbonate solvent
10 Current collector for battery

The invention claimed is:

1. A current collector for a battery comprising:
   (1) a layer (1) formed from an electrically conductive material including a first polymer material including (a) polymer compound having an alicyclic structure and first electrically conductive particles,
      (a) the polymer compound having the alicyclic structure selected from the group consisting of (i) ring-opened polymers of a norbornene monomer and hydrogenated products thereof, (ii) addition polymers of the norbornene monomer and a vinyl monomer, (iii) monocyclic olefin polymers, (iv) cyclic conjugated diene polymers, (v) vinyl alicyclic hydrocarbon polymers, and (vi) hydrogenated products of (iii) to (v),
   (2) a layer (2) which is formed on at least one surface of the layer (1), and which is a metal thin film layer formed by a sputtering method; and
   (3) a layer (3) formed from an electrically conductive material including a third polymer material and electrically conductive particles, the third polymer material being at least one compound selected from the group consisting of polyvinyl acetate, polyamide, polyamide imide, polyimide, polycarbonate, polyethylene terephthalate, polybutylene terephthalate, cyclic polyolefin, polyphenylene sulfide, polytetrafluoroethylene, polyether ether ketone, silicone, nylon, vinylon, polyethylene, polypropylene, and polyphenylene ether,
   wherein the layer (2) is disposed between the layer (1) and the layer (3) and a thickness of the layer (2) is in a range of 20 nm to 40 nm.

2. The current collector for a battery according to claim 1, wherein the third polymer material has a durability to a positive electrode potential.

3. The current collector for a battery according to claim 1, wherein the polymer compound (a) having an alicyclic structure has structural units derived from a cyclic olefin in its backbone.

4. The current collector for a battery according to claim 1, wherein the polymer compound (a) having an alicyclic structure has an alicyclic condensed ring structure.

5. The current collector for a battery according to claim 1, wherein the polymer compound (a) having an alicyclic structure is a norbornene polymer and/or a hydrogenated product thereof.

6. The current collector for a battery according to claim 1, wherein the first electrically conductive particle is an electrically conductive carbon particle.

7. The current collector for a battery according to claim 1, wherein the first electrically conductive particle is an electrically conductive particle including a metal element.

8. The current collector for a battery according to claim 1, wherein the first electrically conductive particle is a platy electrically conductive particle having a metal element and an aspect ratio of 5 or more.

9. The current collector for a battery according to claim 7, wherein the metal element is at least one element selected from the group consisting of platinum, gold, silver, copper, nickel, chromium, zirconium, and titanium.

10. The current collector for a battery according to claim 1, wherein the layer (1) is a surface layer, and an abundance of the metal elements on at least one surface of the surface layers is 0.5% or more in terms of an atomic ratio to the total elements.

11. The current collector for a battery according to claim 1, wherein the layer (1) is a surface layer, and the electrically conductive particles, which include the metal element, are exposed by removing the polymer, on at least one of the surface layers.

12. The current collector for a battery according to claim 11, wherein a surface of the surface layer is subjected to any one of a corona treatment, a plasma treatment, a blast treatment, a polishing treatment, brushing treatment, and an ion beam treatment, thereby removing the polymer.

13. The current collector for a battery according to claim 1, wherein the layer (1) has the following area A and area B:
area A:
an area which is located on one surface of the layer (1) and includes the electrically conductive carbon particles, or which includes the electrically conductive particles including a metal element, the concentration thereof being higher than that in the area B; and
area B:
an area which has the electrically conductive particles including the metal element.

14. The current collector for a battery according to claim 1, wherein the metal thin film layer of the layer (2) is formed from at least one metal element selected from the group consisting of copper, nickel, chromium, titanium, platinum, iron, aluminum, zirconium, gold, and silver, or any one of an alloy, an oxide, a carbide, a nitride, a silicide, a boride, and a phosphide thereof.

15. The current collector for a battery according to claim 1, wherein the current collector has the metal thin film layer of the layer (2) on at least one surface thereof.

16. The current collector for a battery according to claim 1, wherein the layer (1) includes the first electrically conductive particles and the first polymer material in a weight ratio of first electrically conductive particles polymer material within a range of 1:99 to 99:1.

17. The current collector for a battery according to claim 1, wherein the layer (3) includes the third polymer material and the electrically conductive particles in a weight ratio of the third polymer material electrically conductive particles within a range of 1:99 to 99:1.

18. The current collector for a battery according to claim 1, wherein the electrically conductive particles in the layer (3) include electrically conductive carbon particles.

19. The current collector for a battery according to claim 1, wherein the current collector for a battery has a thickness of 1 to 100 μm.

20. The current collector for a battery according to claim 1, which has an electric resistance per unit area in a thickness direction of 10 $\Omega \cdot cm^2$ or less.

21. The current collector for a battery according to claim 1, which has a surface resistivity of 100Ω/□ or less.

22. A battery comprising the current collector for a battery according to claim 1.

23. The battery according to claim 22, wherein the battery is a bipolar battery.

24. The battery according to claim 22, wherein the metal thin film layer of the layer (2) in the current collector for a battery is brought into contact with the negative electrode active material layer.

* * * * *